US009601133B2

(12) United States Patent
Taenzer et al.

(10) Patent No.: US 9,601,133 B2
(45) **Date of Patent: *Mar. 21, 2017**

(54) VECTOR NOISE CANCELLATION

(71) Applicant: Dolby Laboratories Licensing Corporation, San Francisco, CA (US)

(72) Inventors: Jon C. Taenzer, Los Altos, CA (US); Steven H. Puthuff, Saratoga, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/982,461

(22) Filed: Dec. 29, 2015

(65) Prior Publication Data

US 2016/0180864 A1 Jun. 23, 2016

Related U.S. Application Data

(63) Continuation of application No. 13/366,160, filed on Feb. 3, 2012, now Pat. No. 9,253,566.

(60) Provisional application No. 61/441,397, filed on Feb. 10, 2011.

(51) Int. Cl.

| | |
|---|---|
| ***H04B 15/00*** | (2006.01) |
| ***G10L 21/0388*** | (2013.01) |
| ***H04R 3/00*** | (2006.01) |
| ***G10L 19/022*** | (2013.01) |
| ***G10L 21/034*** | (2013.01) |
| ***G10L 25/06*** | (2013.01) |
| ***G10L 25/21*** | (2013.01) |
| *H04R 25/00* | (2006.01) |
| *G10L 21/0216* | (2013.01) |

(52) U.S. Cl.

CPC ........ *G10L 21/0388* (2013.01); *G10L 19/022* (2013.01); *G10L 21/034* (2013.01); *G10L 25/06* (2013.01); *G10L 25/21* (2013.01); *H04R 3/005* (2013.01); *G10L 2021/02166* (2013.01); *H04R 25/407* (2013.01); *H04R 2410/05* (2013.01); *H04R 2430/25* (2013.01)

(58) Field of Classification Search

CPC .. H04R 3/005; H04R 25/407; H04R 2410/05; H04R 2430/25; H03G 3/32; G10L 21/0208; G10L 2021/02165; G10L 21/034; G10L 21/0388; G10L 25/06; G10L 25/21; G10L 19/022; G10L 2021/02166

USPC ... 381/94.7, 91, 92, 71.1–71.9, 71.11–71.14, 381/94.1–94.6, 120, 122; 375/224; 330/10; 700/94

See application file for complete search history.

(56) References Cited

U.S. PATENT DOCUMENTS

| | | | |
|---|---|---|---|
| 5,602,962 | A | 2/1997 | Kellermann |
| 9,100,735 | B1 | 8/2015 | Taenzer |
| 9,253,566 | B1 | 2/2016 | Taenzer et al. |
| 2003/0147538 | A1 | 8/2003 | Elko |

(Continued)

*Primary Examiner* — Vivian Chin
*Assistant Examiner* — Con P Tran
(74) *Attorney, Agent, or Firm* — Zhichong Gu; Wong & Rees LLP

(57) ABSTRACT

Techniques are provided for vector noise cancellation. Different value combinations for a plurality of weighting factors may be established for a plurality of selection regions. Each value combination for the plurality of weighting factors may correspond to a different combination of a set of input signals. One or more characteristics of input signals may be used to select a particular selection region. A particular value combination of the set of weighting factors may be chosen to attenuate or amplify the input signals to generate one or more output signals.

26 Claims, 32 Drawing Sheets

(56) References Cited

U.S. PATENT DOCUMENTS

| | | | |
|---|---|---|---|
| 2006/0222184 | A1 | 10/2006 | Buck et al. |
| 2007/0047742 | A1 | 3/2007 | Taenzer et al. |
| 2007/0050161 | A1 | 3/2007 | Taenzer et al. |
| 2009/0190769 | A1 | 7/2009 | Wang et al. |
| 2009/0232330 | A1 | 9/2009 | Kim et al. |
| 2011/0311080 | A1 | 12/2011 | Jaar et al. |
| 2013/0138435 | A1 | 5/2013 | Weber |
| 2015/0279388 | A1 | 10/2015 | Taenzer |

(BROADSIDE)

(ENDFIRE)

(VECTOR NOISE
CANCELLATION)

(BROADSIDE)

(ENDFIRE)

(VECTOR NOISE CANCELLATION)

(BROADSIDE)

(ENDFIRE)

(VECTOR NOISE CANCELLATION)

(BROADSIDE)

(Vector Noise
Cancellation)

VECTOR NOISE CANCELLATION

RELATED UNITED STATES APPLICATIONS

This application claims benefit as a Continuation of U.S. patent application Ser. No. 13/366,160, filed on Feb. 3, 2012, which claims the benefit of prior provisional application 61/441,397, filed on Feb. 10, 2011, under 35 U.S.C. 120. U.S.C. §120. The above-mentioned patent applications are assigned to the assignee of the present application and are hereby incorporated by reference as if fully set forth herein. The applicant(s) hereby rescind any disclaimer of claim scope in the parent application(s) or the prosecution history thereof and advise the USPTO that the claims in this application may be broader than any claim in the parent application(s).

This application is related to Provisional U.S. Patent Application No. 61/441,611 entitled "COMBINED SUPPRESSION OF NOISE, ECHO, AND OUT-OF-LOCATION SIGNALS" by GLENN N. DICKINS, TIMOTHY J. NEAL, and MARK S. VINTON; and to Provisional U.S. Patent Application No. 61/441,528 entitled "MULTI-CHANNEL WIND NOISE SUPPRESSION SYSTEM AND METHOD" by JON C. TAENZER; and to Provisional U.S. Patent Application No. 61/441,551 entitled "SYSTEM AND METHOD FOR WIND DETECTION AND SUPPRESSION" by GLENN N. DICKINS and LEIF JONAS SAMUELSSON; and to Provisional U.S. Patent Application No. 61/441,633 entitled "SPATIAL ADAPTATION FOR MULTI-MICROPHONE SOUND CAPTURE" by LEIF JONAS SAMUELSSON; and to U.S. patent application Ser. No. 13/366,148 entitled "VECTOR NOISE CANCELLATION" by JON C. TAENZER, filed on Feb. 3, 2012.

TECHNOLOGY

The present invention relates generally to noise cancellation, and in particular, to vector noise cancellation (VNC).

BACKGROUND

In many noise reduction systems, an input signal may be a combination of an interesting signal and unwanted noises. For example, in a crowded, noisy game room, a particular game player's voice may be regarded as the interesting signal, while other sounds in the game room are unwanted noises.

Under some existing techniques, single channel spectral subtraction may be used to produce an output signal with reduced noises. However, these techniques typically require distorting waveforms of input signals to remove the noises in the input signals. The integrity of the interesting signal under these techniques may be compromised as the waveforms comprising the interesting signal are distorted. In addition, to perform spectral subtraction reliably, many initial noise samples may have to be collected and processed to determine the characteristics of the interesting signal and the noises. As result, these techniques require a long adaptation time and may not be responsive to rapidly changing noise conditions. In applications with stringent timing requirement such as telecommunications and command-and-controls, these techniques may not be able to produce clean output signals in a timely manner for other related systems to perform related and subsequent operations such as voice recognition on the output signals.

In non-single-channel systems such as those using beamforming, multiple sensor elements may be spatially separated (e.g., at a half-wave-length) and form sensor arrays. Multiple input signals from a sensor array may be used to perform beamforming noise cancellation. However, these techniques typically require intensive calculations in order to form beams that may cancel noises from various sources. These techniques may also require determining magnitudes in input signals. Thus, like spectral subtraction systems, noise cancellation systems under these multi-channel beamforming techniques typically require a long adaptation time. If the sensitivities of the sensor elements vary, then the efficiency of the systems in noise cancellation may be further severely degraded.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF DRAWINGS

The present invention is illustrated by way of example, and not by way of limitation, in the figures of the accompanying drawings and in which like reference numerals refer to similar elements and in which.

DESCRIPTION OF EXAMPLE EMBODIMENTS

Figure 1A:
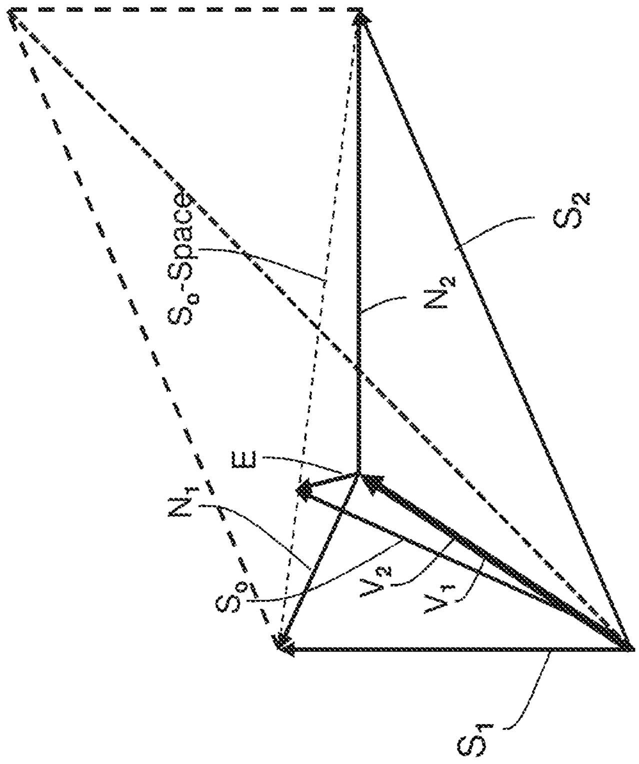
FIG. 1A and FIG. 1B illustrate example vector representations of signals according to possible embodiments of the present invention.

Example embodiments, which relate to providing vector noise cancellation, are described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily including, obscuring, or obfuscating the present invention.

Example embodiments are described herein according to the following outline (outline section headings are for reference purposes only and shall not in any way control the scope of the present invention):

1. GENERAL OVERVIEW
2. VECTOR NOISE CANCELLATION
3. INTEGRITY OF TARGET SIGNAL UNDER VNC
4. VNC SYSTEMS
5. VNC PROCESSORS
6. VNC WITH SIGNAL MAGNITUDES
7. VNC WITH OTHER SIGNAL DATA
8. LOW CORRELATION NOISES
9. EFFICACY OF VNC WITH UNCORRELATED NOISES
10. PHASE MODIFICATION
11. CORRELATED NOISES
12. ARRAY TECHNOLOGIES
13. DIRECTIONALITY CHARACTERISTICS—BROADSIDE ARRAY
14. DIRECTIONALITY CHARACTERISTICS—ENDFIRE ARRAY
15. DIRECTIONALITY CHARACTERISTICS—VNC SENSOR ARRAY
16. NULL-STEERED ARRAY
17. BOUNDARY MICROPHONES
18. 3-DIMENSIONAL BEAM PATTERNS
19. EXAMPLE VNC APPLICATIONS
20. ENHANCEMENTS INCLUDING VIRTUAL BARRIERS
21. USING BEAMFORMING/BEAMSTEERING IN PRE-PROCESSING STAGE
22. BOOMLESS HEADSETS
23. HIGH AVAILABILITY OPERATIONS
24. MULTIPLE SIGNALS
25. VNC WITH POWER OR ENERGY
26. EXAMPLE PROCESS FLOW
27. ADDITIONAL FEATURES
28. IMPLEMENTATION MECHANISMS—HARDWARE OVERVIEW
29. EQUIVALENTS, EXTENSIONS, ALTERNATIVES AND MISCELLANEOUS

1. GENERAL OVERVIEW

This overview presents a basic description of some aspects of a possible embodiment of the present invention. It should be noted that this overview is not an extensive or exhaustive summary of aspects of the possible embodiment. Moreover, it should be noted that this overview is not intended to be understood as identifying any particularly significant aspects or elements of the possible embodiment, nor as delineating any scope of the possible embodiment in particular, nor the invention in general. This overview merely presents some concepts that relate to the example embodiment in a condensed and simplified format, and should be understood as merely a conceptual prelude to a more detailed description of example embodiments that follows below.

Vector noise cancellation (VNC) techniques are provided for picking up or enhancing a target signal from input signals with noises, creating a significantly higher signal-to-background-noise ratio in an output signal than that in input signals, and thus converting the target signal to one with higher intelligibility. In particular, target signals after VNC processing significantly broadens the usability of target signals in noisy environments. These techniques may be implemented in a manner that requires little complex processing and exhibits excellent characteristics in terms of adaptation times and implementation costs, and may be implemented in either analog or digital form. The VNC techniques are compatible with and complementary to other signal processing techniques, e.g., spectral subtraction, downward expansion, beamforming, voice recognition, sensor arrays, etc., and may be implemented standalone, in conjunction with, in addition to, or in place of, these other signal processing techniques.

Fundamentally, the VNC technologies include several processes by which signals are combined with methods that weight and add the signals in a novel manner in order to optimize the signal to noise relationship in the combined output signal. Alternate versions include both methods for generating multiple signal combinations and selecting the optimal signal as the output signal, and methods for determining the optimal parameters for calculating the output signal. Additionally techniques are provided for further removing noise from the output signal as a function of the pre-combined signals, and in some possible embodiments, based upon both the pre-combined signals and output signals of the VNC signal combining process.

Behind the concept of signal combination in novel ways to reduce noise is an understanding as to what are used as input signals, specifically how they differ from each other, and how the differences are used to separate target signal from noise. In some possible embodiments, a VNC process may be applied to signals produced by respective sensors, with some form of physical or virtual barrier between them, and configured such that they each receive similar amounts of a target signal (e.g., a particular speaker's voice), but different amounts of noise. A particular possible example embodiment comprises a microphone at each ear of a user, each picking up the user's voice similarly, but each having different amounts of head shadow (or more correctly, determined by the Inter-Aural Difference (IAD), which is a Head-Related Transfer Function (HRTF) characteristic, with respect to noises not directly in front of or behind the user. An alternate embodiment is two directional microphones, or microphone systems, with overlap of high sensitivity regions in the direction of the desired signal source, but significantly different overall areas of high sensitivity. A significant feature of VNC is that wind noise, which generally exhibits low correlation in the signals from multiple spaced-apart microphones, can produce signals similar to having a nearly infinite barrier between the transducers. This makes VNC particularly beneficial for applications where microphone sound inlet ports can be subject to wind.

In some possible embodiments, to create an all-at-the-ear voice pickup system, VNC techniques as described herein improve the voice-to-noise ratio of the system and thereby eliminate the need to incorporate any boom microphone in the system. This creates a two-way headset of extreme comfort, with a lack of obtrusiveness and an increase in robustness. This may be accomplished by selectively picking up the user's own voice (e.g., a target signal) while rejecting the pickup of background noise through multi-microphone sensing and signal processing for minimum residual noise. In some possible embodiments, VNC techniques as described herein are applied to processing multiple, e.g., two, input signals in vector space in order to derive a resultant vector with the minimum residual noise power. This may be done simultaneously and independently at many individual frequencies, with an instantaneous adaptation time.

In some possible embodiments, VNC techniques may be implemented as methods performed by one or more computing devices. In some possible embodiments, mechanisms such as the signal processing system as described herein form a part of a communication system, including but not limited to: a server, studio system, a theater system, movie studio system, broadcast system, media recording device, media playing device, television, laptop computer, netbook computer, cellular radiotelephone, electronic book reader, point of sale terminal, battlefield communication system, pilot communication device, mining communication device, voice recognition system, vehicular communication system, desktop computer, computer workstation, computer kiosk, headsets, telephones, and various other kinds of terminals and signal processing units.

Various modifications to the preferred embodiments and the generic principles and features described herein will be readily apparent to those skilled in the art. Thus, the disclosure is not intended to be limited to the possible embodiments shown, but is to be accorded the widest scope consistent with the principles and features described herein.

2. VECTOR NOISE CANCELLATION

Physical signals may be described herein with reference to one or more example media, including sound, electric current, electromagnetic waves, heat, atomic radiation, light, neutrinos, gravitational waves, radio frequency waves, etc. The selection of an example medium in this description may be made for simplicity and concise unity and, unless expressly stated to the contrary, should not be construed as limiting a possible embodiment to a particular medium as embodiments of the present invention are well suited to function with any physical media that provide input, intermediate, or output signals as processed by systems and methods implementing techniques as described herein. Various embodiments of the present invention may include waves beyond the voice/sound application primarily discussed. Additional potential applications may include, but are not limited to, sonar, medical imaging, and particle waves.

In some possible embodiments, input signals and output signals may be represented as vectors. For example, as FIG. 1A illustrates, the first input signal $S_1$, the second input signal $S_2$ and the output signal $S_o$ may be expressed as vectors. Each of these vectors has its magnitude (e.g., the vector length) and direction (e.g., an angle such as a polar angle if the vectors are graphed against a polar coordinate system). In some embodiments, a set of weighting factors may be used to multiply with the input signals for the purpose of producing the output signal $S_o$. In various possible embodiments, each of the weighting factors may be used to attenuate or amplify an input signal. All possible $S_o$ corresponding to all possible values of the weighting factors forms $S_o$-Space. For the purpose of the present invention, a weighting factor herein may be any real or complex number. In some possible embodiments (such as headsets), allowing weighting factors greater than unity or less than zero may be very beneficial. Thus, it should be noted that, in some possible embodiments, a weighting factor is not limited to only a value between 0 and 1. FIG. 1A illustrates a particular possible embodiment in which each of two weighting factors for two input signals is limited to a value between 0 and 1 and the sum of the weighting factors is constrained to be unity, as illustrated in expression (1):

$$S_o=\alpha*S_1+(1-\alpha)*S_2 \qquad \text{expression (1)}$$

where $S_1$ is multiplied with a weighting factor $\alpha$, while $S_2$ is multiplied with another weighting factor $(1-\alpha)$.

In some possible embodiments, each of the weighting factors (e.g., $\alpha$ or $1-\alpha$ above) may be limited to any value between zero (0) and one (1). The section of $S_o$-Space corresponding to (1) limiting each of the weighting factors to a value between zero (0) and one (1) and (2) constraining the sum of the weighting factors to be 1 is represented as a broken line in FIG. 1A. $S_o$ as illustrated in FIG. 1A corresponds to particular values of the weighting factors $\alpha$ and $(1-\alpha)$.

In some possible embodiments, the first input signal $S_1$ may be a vector sum of two vectors $V_1$ and $N_1$ (i.e., $S_1=V_1+N_1$), respectively representing a first target signal vector and a first noise vector. The first input signal $S_1$ comprising the first target signal vector $V_1$ and the first noise vector $N_1$ may be provided by a first sensor element. Likewise, the second input signal $S_2$ may be a vector sum of two other vectors $V_2$ and $N_2$ (i.e., $S_2=V_2+N_2$), respectively representing a second target signal vector and a second noise vector. The second input signal $S_2$ comprising the second target signal vector $V_2$ and the second noise vector $N_2$ may be provided by a second sensor element. In some embodiments, the first target signal vector $V_1$ and the second target signal vector $V_2$ may be highly correlated as they may originate from an identical source symmetric to the sensor elements (e.g., a user's voice as the target signal received by two microphones, one at each ear on a headset which the user wears). Alternatively, correlation of the target signal vectors $V_1$ and $V_2$ may be achieved by the use of well known signal matching methods applied prior to VNC, for example when the target source is not symmetrically located. As shown, the magnitudes and angles of the first target signal vector $V_1$ and the second target signal vector $V_2$ thus may substantially coincide (e.g., within an example range of $<n$ % difference in magnitude and/or angle, wherein n may be a small number such as 1, 2, 5, or another value).

Under the approach of vector noise cancellation, all possible values of the weighting factor α for one (e.g., the right input signal) of the two input signals forms a set of discrete numbers, ($\alpha_1$, $\alpha_2$, . . . $\alpha_i$, . . . $\alpha_{n-1}$, and $\alpha_n$, where n is an integer greater than 1. Furthermore, under the VNC approach, a particular value of the weighting factor, e.g., $\alpha_1$, is chosen in a manner such that the remaining error (E of FIG. 1A) is minimized, as will be described in detail in connection with FIG. 3A through FIG. 3C and FIG. 4A through FIG. 4E.

In some possible embodiments, weighting factors may be computed based on the input signals. The first input signal $S_1$, the second input signal $S_2$, and the output signal $S_o$, may comprise real and imaginary parts, respectively, as follows:

$$S_1=R_1+iI_1 \quad \text{expression (2)}$$

$$S_2=R_2+iI_2 \quad \text{expression (3)}$$

$$S_o=R_o+iI_o \quad \text{expression (4)}$$

In a particular embodiment, a weighting factor α for one of two input signals may be determined as follows:

$$\alpha = \frac{(I_2 - I_1)\cdot(I_2\cdot R_1 - I_1\cdot R_2)}{(R_2 - R_1)\cdot[(R_1 - R_2)^2 + (I_1 - I_2)^2]} - \frac{R_2}{(R_2 - R_1)} \quad \text{expression (5)}$$

The weighting factor for the other of the two input signals may be chosen as (1−α).

With these weighting factors, an optimized value of the output signal $S_o$ under the VNC techniques may be computed based on expression (1) and determined as follows:

$$R_o = \frac{(I_2 - I_1)\cdot(I_2\cdot R_1 - I_1\cdot R_2)}{[(R_1 - R_2)^2 + (I_1 - I_2)^2]} \quad \text{expression (6)}$$

$$I_o = \frac{(R_1 - R_2)\cdot(I_2\cdot R_1 - I_1\cdot R_2)}{[(R_1 - R_2)^2 + (I_1 - I_2)^2]} \quad \text{expression (7)}$$

With this output signal $S_o$, the error E of FIG. 1A becomes perpendicular to the $S_o$-Space line of FIG. 1A, and represents the minimum distance from the tip of the output signal vector to the $S_o$-Space line of FIG. 1A.

Figure 1B:
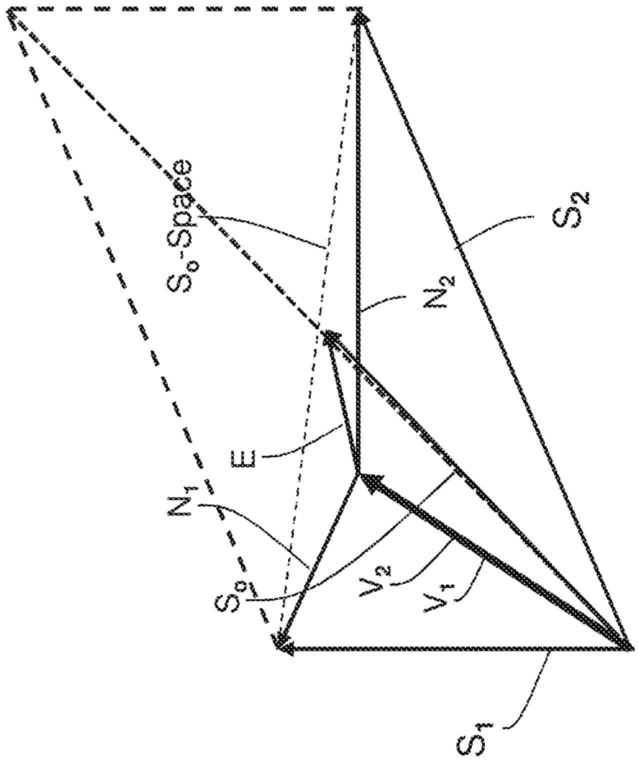

FIG. 1B illustrates an example vector relationship between input and output signals under delay and sum beamforming techniques. Particularly when the target signal is correlated and no delay is required, these techniques may use one half of the vector sum of the input signals—as the output signal. Thus, the output signal $S_o$ is one half of one of the diagonals in the parallelogram formed by the input signals $S_1$ and $S_2$ and their parallels. These beamforming techniques may introduce more errors than the vector noise cancellation techniques. For example, when the target signal vectors $V_1$ and $V_2$ are near the diagonal of the parallelogram, the remaining error E may be relatively small under the beamforming techniques. On the other hand, when the target signal vectors $V_1$ and $V_2$ are not near the diagonal of the parallelogram, the remaining error E may be relatively large under the beamforming techniques.

In contrast, as shown in FIG. 1A, under the vector noise cancellation techniques, the output signal $S_o$ is closer to the quieter input signal of the input signals $S_1$ and $S_2$, (rather than at the diagonal of the parallelogram formed by the input signals $S_1$ and $S_2$ and their parallels,) resulting in a smaller remaining error after vector noise cancellation processing. In other words, the resulting VNC output signal is closer to the desired target signal, than is the resulting beamformer output signal.

For example, after determining the number of input signals and/or the sample rate of the input signals, a VNC process may generate or receive an N-sample audio window containing non-zero window weights. After separating the left and right channels, the VNC process may apply these window weights and convert samples in the left and right input signals from the time domain to the frequency domain. For every sample bin in the frequency domain, the VNC process may calculate differences between the two real parts and between the two imaginary parts of a sample pair in the frequency domain. The VNC process may compute a weighting factor value (e.g., a value of a weighting factor α) for the right input signal as given in expression (5). In some possible embodiments, this weighting factor value for the right input signal may be smoothed with a filter (e.g., a low pass filter, etc.). In some other possible embodiments, this weighting factor value for the right input signal may not be smoothed, but may be directly used in subsequent processing. A weighting factor for the left input signal may be given by (1−α). A sample for the output signal may be obtained from the sample pair in the two input signals, as given in expression (1), wherein $S_1$ may be the right input signal and $S_2$ may be the left input signal.

Subsequently, the VNC process may convert samples (e.g., with magnitudes determined in expressions (6) and (7)) for the output signal in the frequency domain to the time domain, for example, using an overlap-and-add, overlap-and-save or other reconstruction method.

3. INTEGRITY OF TARGET SIGNAL UNDER VNC

VNC techniques minimize distortion of the target signal while removing noises. In some possible embodiments, these techniques improve the signal-to-noise ratio without changing the purity of the target signal (such as a voice of a pilot in a cockpit, cellular phone user in a crowd, or a gamer in a game arcade), allowing for reliable use for command and control and voice recognition purposes. For example, in some embodiments, the target signal vectors $V_1$ and $V_2$ may be substantially the same vector V in the two input signals $S_1$ and $S_2$. In a particular embodiment, the input signals may be provided by microphones located on two sides of a headset that are configured to pick up the headset's wearer's voice as the target signal. Expression (1) may be used to derive the following expression (8) after substitutions of the input signals with the noise and target signals:

$$\begin{aligned} S_o &= \alpha\cdot(N_1 + V) + (1-\alpha)\cdot(N_2 + V) \\ &= \alpha\cdot N_1 + \alpha\cdot V + (1-\alpha)\cdot N_2 + (1-\alpha)\cdot V \\ &= V + \alpha\cdot N_1 + (1-\alpha)\cdot N_2 \end{aligned} \quad \text{expression (8)}$$

As expression (8) shows, while the stronger noise is attenuated more than the weaker noise under the VNC techniques in these embodiments, the target signal under these techniques remains unchanged, and identical to the target signal portion of the input signals, no matter what choice of value for the weighting factor α. Hence, the integrity of target signals is maintained under the VNC techniques.

4. VNC SYSTEMS

Figure 2A:
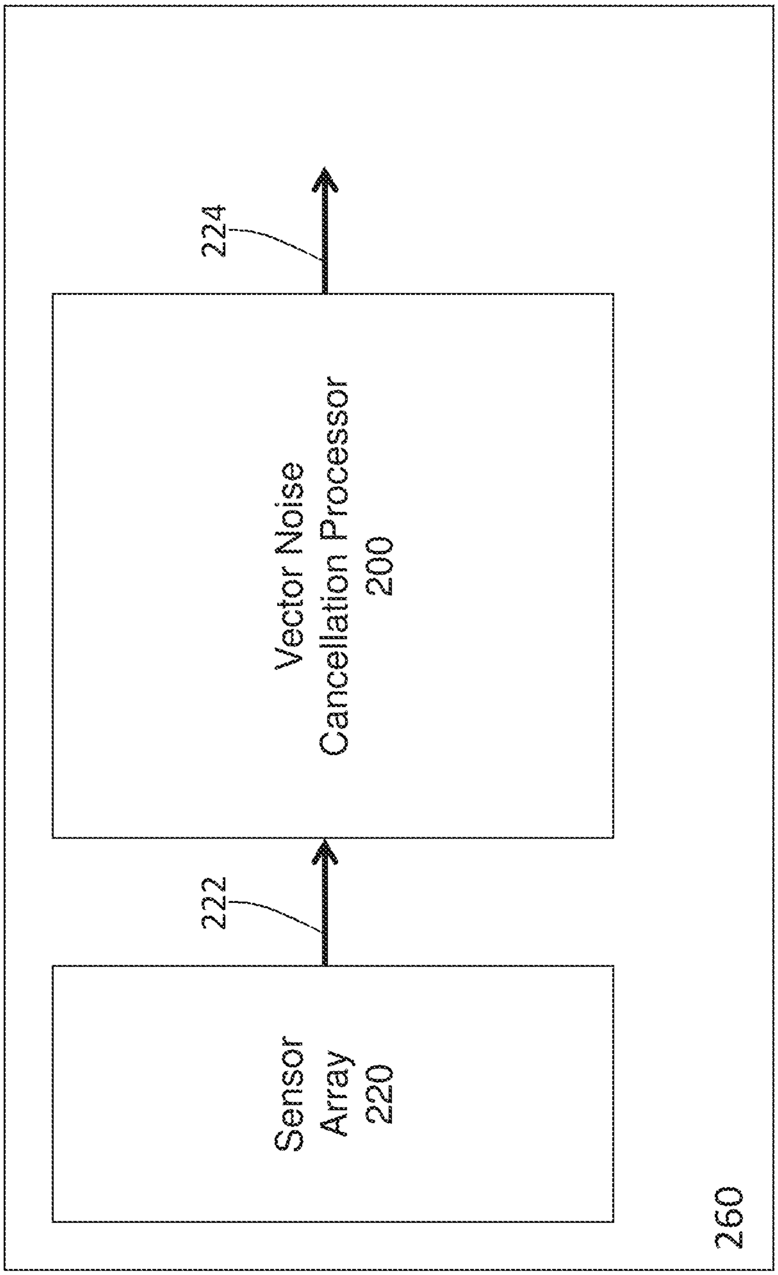
FIG. 2A through FIG. 2E illustrate example system configurations, according to possible embodiments of the present invention.

FIG. 2A illustrates an example VNC system (260) that comprises a VNC sensor array (220) and a VNC processor (200), according to some possible embodiments of the present invention. The VNC sensor array (220) may produce one, two or more input sensor signals (222) to the vector noise cancellation (VNC) processor (200). Each of the one, two, or more input sensor signals (222) may be either continuously or intermittently generated by a sensor element in the VNC sensor array (220) and may comprise a time-sequential series of time-domain signal frames that contains a target signal and/or noises, or portions thereof. As used herein, the VNC sensor array (220) comprises one, two, or more sensor elements that may respond to one or more physical quantities such as force, pressure, sound, electromagnetic wave, electric current, radiation, light, etc., and generate the input sensor signals (222) based on the sensor elements' sensory responses to the physical quantities. In some possible embodiments, the input sensor signals (222) may be in the forms of electric signals, either digital or analog, or a mixture of digital and analog. In some possible embodiments, the VNC sensor array (220) and the VNC processor (200) may be implemented in either separate systems operatively linked or in a single system (e.g., 260) as operatively linked parts in the system.

In some possible embodiments, instead of receiving the input sensor signals (e.g., 222) from a VNC sensor array (e.g., 220), the VNC processor (200) may additionally and/or alternatively receive one, two, or more input sensor signals (e.g., 222) through an intermediate system or device (not shown). In some possible embodiments, one or more of the input signals may be modified by an intermediate process, such as time alignment, target signal matching, beamforming or other process ahead of the VNC processor (200).

In some possible embodiments, instead of receiving input sensor signals, the VNC processor (200) may receive, for example, from the VNC sensor array (220), raw sensory responses to physical quantities. The VNC processor (200) may comprise sampling logic and/or analog-to-digital conversion logic to sample and convert the received raw responses to one, two, or more input sensor signals (222).

In some possible embodiments, the VNC processor (200) generally represents a single device or multiple devices configured to receive or generate one, two, or more input sensor signals (e.g., 222), and to generate one or more VNC processed signals (e.g., 224) by subjecting the one, two, or more input sensor signals to VNC processing. The VNC processed signals (224) may be one or more series of noise-reduced time domain signal information in analog, digital, or a mixture of analog and digital form.

In some possible embodiments, the VNC processor (200) may include components located on the same device (e.g., a server, mainframe, desktop PC, laptop, PDA, television, cable box, satellite box, kiosk, telephone, mobile phone, etc.) or may be located on separate devices communicatively coupled over a network (e.g., Internet, Intranet, Extranet, Local Area Network (LAN), Wide Area Network (WAN), etc.), with wire and/or wireless segments. In a possible embodiment, some, or all, of the VNC processor (200) may be implemented as a single IC chip, for example, as a system-on-chip (SOC) integrated circuit. In a possible embodiment, some, or all, of the VNC processor (200) may be implemented as a digital signal processor, for example, as a system-on-chip (SOC) integrated circuit. In one or more embodiments, the VNC processor (200) may be implemented using a client-server topology. The VNC processor (200) itself may be an enterprise application running on one or more servers, and in some embodiments could be a peer-to-peer system, or resident upon a single computing system. In addition, the VNC processor (200) may be accessible from other machines using one or more interfaces, web portals, or any other tool. In one or more embodiments, the VNC processor (200) is accessible over a network connection, such as the Internet, by one or more users. Information and/or services provided by the VNC processor (200) may also be stored and accessed over the network connection.

5. VNC PROCESSORS

Figure 2B:
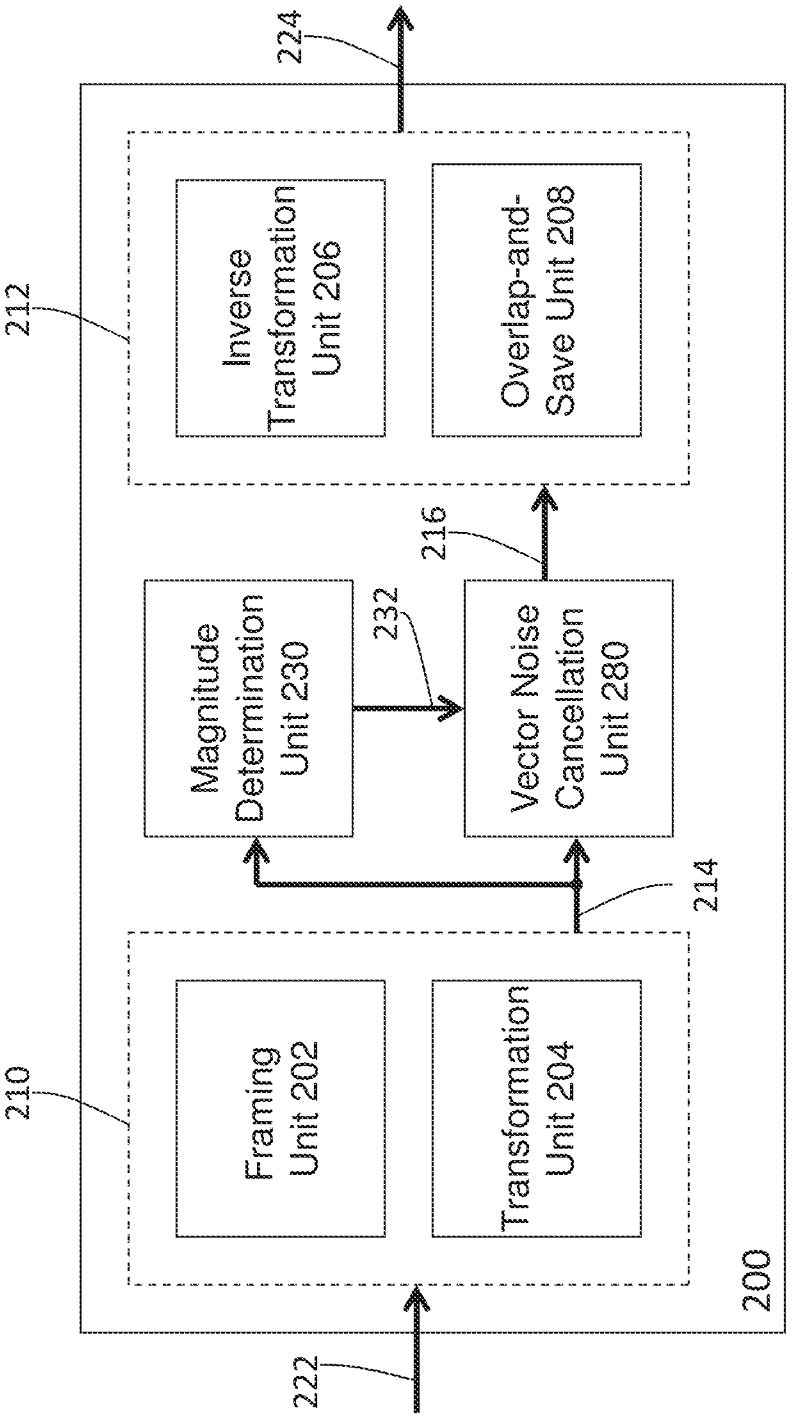

FIG. 2B illustrates an example configuration of a VNC processor (e.g., 200), in accordance with some possible embodiments of the present invention. In some possible embodiments, the VNC processor (200) comprises a signal decomposition subsystem (210), a magnitude determination unit (230), a VNC unit (e.g., 280 of FIG. 2B through FIG. 2E), and a signal reconstruction subsystem (212).

In some embodiments, the signal decomposition subsystem (210) may comprise a data framing unit (202) and a domain transformation unit (204). The data framing unit (202) may time-wise divide an input sensor signal, which may be a time-sequential series of time-domain signal frames (222), into blocks of data referred to as a time-sequential series of signal frames. As used herein, a signal frame refers to a block of time-domain signal information for a finite time interval; the finite time interval may be a plurality of seconds, a plurality of a fraction of a second, a plurality of milliseconds, microseconds, nanoseconds, etc. Finite time intervals for the time-domain signal frames in the same time-sequential series may be non-overlapping (for example, adjacent) or overlapping in time. In some embodiments, depending on what type of signal data in a signal frame, the signal frame may comprise only real numeric data with no imaginary part.

In some possible embodiments, for the purpose of reducing artifacts associated with transformations of time-domain signal frames for finite time intervals from time domain to frequency domain, the VNC processor (200) may be optionally configured to multiply numeric data in time-domain signal frames with a suitable type of analysis window function. The multiplication of analysis window function with signal data in a signal frame may be performed, for example, using a multiplication circuit. Examples of analysis window functions may be, but are not limited to, rectangular, Hann, Hamming, Tukey, Cosine, Lanczos, triangular, Gaussian, Bartlett-Hann, Blackman, Kaiser, Nuttal, Blackman-Harris, Blackman-Nuttal, Flat top, Bessel, Dolph-Chebyshev, Hann-Poisson, Exponential, etc.

In some possible embodiments, the domain transformation unit (204) may transform the one or more time-sequential series of signal frames from time domain to frequency domain. The resultant signal frames in the frequency domain may be provided as one, two, or more input signals (214) to a VNC unit (280) in the system and to magnitude determination unit (230). The domain transformation unit (204) may be configured to transform signal frames from time domain to frequency domain using a Fourier transform, Cosine transform, Hartley transform, Wavelet transform, or another time-domain-to-frequency-domain transform that transforms time-dependent numeric data in these frames to frequency-dependent numeric data. In some possible embodiments, the domain transformation unit (204) implements a Discrete Fourier Transform (DFT) algorithm. For example, the domain transformation unit (204) may implement a computationally efficient version of DFT, such as the Fast Fourier Transform (FFT), to transform signal frames as described herein from time-domain to frequency-domain.

Numeric data in a signal frame in frequency domain may be represented by complex numbers. Such a complex number, which may contain real and/or imaginary parts, may be used to derive a magnitude and phase for a frequency component of a signal frame in frequency domain. In some embodiments, the frequency domain may be partitioned into a plurality of frequency bins. A frequency bin may comprise a specific finite range of frequencies. An overall complex number may be computed for a frequency bin, for example, by averaging complex numbers for all the frequency components in the frequency bin from a signal frame in frequency domain.

In alternative embodiments, input sensor signals (222) received and processed by the VNC processor (200) may pass through a bank of band pass frequency discrimination filters (analog, digital, or a mix as appropriate) and may be thus decomposed into one, two, or more input signals (e.g., 214)) with different frequency ranges to the VNC unit (280). In these alternative embodiments, each of the one, two, or more input signals (214) may represent signal information from a single sensor element for a specific frequency bin in frequency domain. The input signals, after passing through the band pass frequency discrimination filters, may remain as time-dependent signal data, and/or frequency-dependent signal data.

Figure 3A:
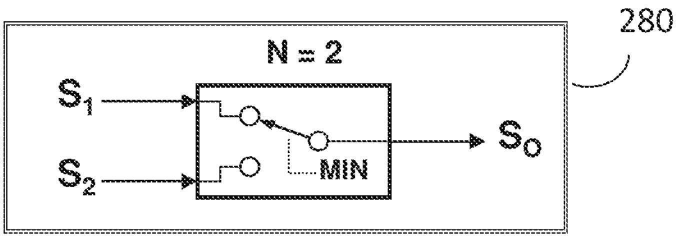
FIG. 3A through FIG. 3C illustrate example vector noise cancellation processing units, according to possible embodiments of the present invention.
Figure 3B:
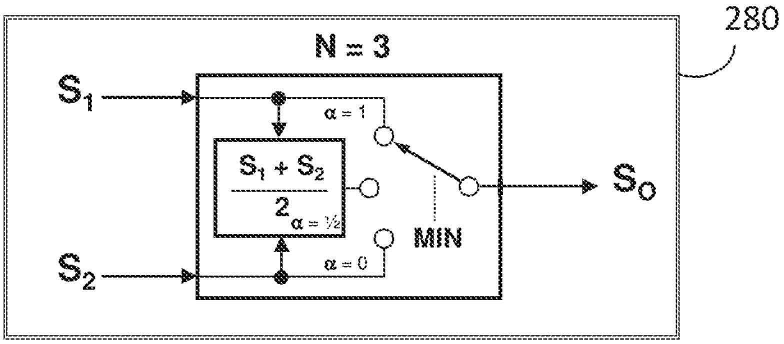
Figure 3C:
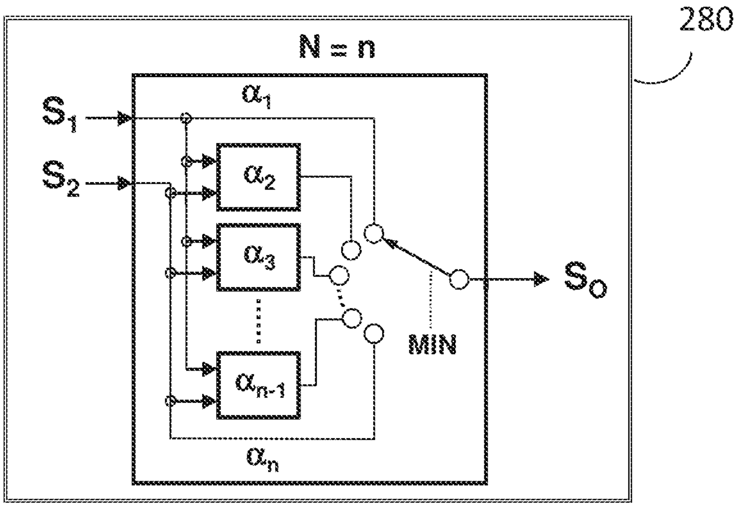

In some possible embodiments, a first input signal in the one, two, or more input signals (214) may be associated with a first sensor element, for example, $S_1$ of FIG. 3A through FIG. 3C. A second input signal in the one, two, or more input signals (214) may be associated with a second sensor element, for example, $S_2$ of FIG. 3A through FIG. 3C.

In some possible embodiments, the signal decomposition subsystem (210) may be configured to provide the one, two, or more input signals (214) to the VNC unit (280). In some possible embodiments, the signal decomposition subsystem (210), additionally and/or optionally, may be configured to provide the one, two, or more input signals (214) to the magnitude determination unit (230). The magnitude determination unit (230) may be configured to determine a magnitude for each of the input signals (214). A magnitude in an input signal may vary with time and/or frequency. The magnitude determination unit (230) may be configured to provide magnitudes (232) in the one, two, or more input signals (214) to the VNC unit (280).

In some possible embodiments as illustrated in FIG. 2B, the VNC unit (280) receives one, two, or more input signals (e.g., 214)) from the signal decomposition subsystem (210), receives magnitudes (232) for the one, two, or more input signals (214) as determined by the magnitude determination unit (230), calculates ratios of the magnitudes in the one, two, or more input signals (214), selects weighting factors to be applied to attenuate or amplify the one, two, or more input signals (214), and generates, based on the one, two, or more input signals (214) and the weighting factors, one or more output signals (216). As used herein, the term "the VNC unit selects weighting factors" may include, but is not limited a meaning that the VNC unit selects a particular combination of the input signals and that the particular combination automatically comprises application of the weighting factors to the input signals. Thus, in some possible embodiments, the VNC unit or a VNC process may not actually determine values of the weighting factors and then apply these values to the input signal. Rather, the application of these values of the weighting factors is automatic, once the VNC process selects a particular combination of the input signals as the output signal. For example, the weighting factors may be predetermined and stored in memory or a table, then all weighted output sums (one per weight) are created while the VNC process determines which one to select and send to the output. Upon selection, the selected one is sent out. As used herein, an example of the input signals (222) may be, but is not limited to, $S_1$ and $S_2$ of FIG. 3A through FIG. 3C. An example of the one or more output signals (216) may be, but is not limited to, $S_o$ of FIG. 3A through FIG. 3C.

In some embodiments, an output signal in the one or more output signals (216) is a time-sequential series of noise-reduced frames in the frequency domain. For example, the VNC unit (280) may process a first frame in a first input signal $S_1$ of the input signals (214), and a second frame in a second input signal $S_2$ of the input signals (214), select a particular weighted combination of the input signals with a selection based on magnitudes in input signals $S_1$ and $S_2$, and generate, based on the selection, a third frame as a noise-reduced frame in the output signal $S_o$ of the one or more output signals (216). It should be noted that, in various embodiments of the present invention, the above-mentioned selection may be based instead on phase difference, or on both phase difference and magnitude. Indeed, the selection may also be based upon other signal measures such as power, signal correlation, coherence, etc. For example, input signal portions contributed by a target signal as described herein may be highly correlated and/or coherent, relative to other input signal portions contributed by noise. Selection of one or more combinations of input signals as an output signal may be based on the degree of signal correlation and/or coherence in the input signals.

In some embodiments, the first frame in the first input signal $S_1$ and the second frame in the second input signal $S_2$ may originate from two separate sensor elements in the VNC sensor array (220), contemporaneous of each other. For example, the first frame may contain a first sensor element's signal data for a time interval of 3 milliseconds with an initial time t, while the second frame in $S_2$ may contain a second sensor element's signal data for the same time interval of 3 milliseconds with the same initial time t. Here, the initial time t may be one in a time-sequential sequence of discrete, consecutive time points; each time point in the sequence may be associated with one or more contemporaneous different signal frames in different input signals in the one, two, or more input signals (214). In some possible embodiments, the time alignment of the input signals may be performed with signal frames, while in some other possible embodiments, the time alignment of the input signals may be performed with samples and/or fractions of a sample.

The VNC unit (280) may be configured to process the signal frames in the input signals (214) using VNC techniques, and generate noise-reduced frames based on the signal frames in the input signals (214), and provide the noise-reduced frames in the one or more output signals (216) to the signal reconstruction subsystem (212).

In some possible embodiments, the signal reconstruction subsystem (212) may comprise an inverse domain transformation unit (206) and an overlap-and-save unit (208). The inverse domain transformation unit (206) may be configured to perform inverse transformation of each noise-reduced frame in one or more time-sequential series of noise-reduced frames in the one or more output signals (216). In some embodiments, the inverse domain transformation unit (206) may implement an Inverse Fast Fourier Transformation (IFFT) to convert noise-reduced frames in the output signals (216) from frequency domain to time domain, thereby, for an output signal in the one or more output signals (216), producing a time-sequential series of noise-reduced frames in the time domain. In some possible embodiments, numeric data in a noise-reduced frame in the time domain may comprise only real numbers without any imaginary part.

In some possible embodiments in which an analysis window function is used by the signal decomposition subsystem (210) to multiply with a signal frame in the time domain, the signal reconstruction subsystem (212) may be configured to multiply a noise-reduced frame in the output signals (216) with a corresponding synthesis window function. The choice for the synthesis window function may depend on the type of analysis window function used in the signal decomposition subsystem (210).

In some possible embodiments, the overlap-and-save unit (208) may be configured to reconstruct one or more time-sequential series of noise-reduced time-domain signal information, which forms the one or more VNC processed signals (224). For example, the overlap-and-save unit (208) may be configured to filter and concatenate noise-reduced frames in the output signals generated by the VNC unit (280) and converted into time domain by the inverse domain transformation unit (206). In some possible embodiments, a different reconstruction method other than an overlap-and-save method may be used. Thus, in these embodiments, the overlap-and-save unit (208) may be replaced with a unit implementing the different reconstruction method. Other reconstruction methods include, but are not limited to, overlap-and-add, overlap-and-save, load-and-add, concatenate, invert-and-add, etc., for the purpose of the present invention.

Additionally and/or optionally, the VNC processor (200) may comprise attenuators and amplifiers to attenuate and/or amplify intermediate signals. Additionally and/or optionally, the VNC processor (200) may comprise digital-to-analog conversion (D/A) to convert the one or more VNC processed signals (224) into analog signal data. The VNC processor (200) may provide either or both of the one or more VNC processed signals (224) and the corresponding analog signal data to other parts of the system or to one or more external systems or devices that are operatively linked to the VNC processor (200).

In alternative embodiments in which input sensor signals (222) received and processed by the VNC processor (200) may pass through a bank of band pass frequency discrimination filters (analog, digital, or a mix as appropriate) and may be thus decomposed into one, two, or more input signals (e.g., 214)) with different frequency ranges to the VNC unit (280), the one, two, or more input signals (214) may be processed by the VNC unit (280). The noise-reduced output signals (216) may be used to reconstruct the VNC processed signals (224) without inverse Fourier transformation.

6. VNC WITH SIGNAL MAGNITUDES

FIG. 3A shows an example VNC unit (e.g., 280 of FIG. 2B through FIG. 2E) in accordance with one or more possible embodiments. In the following discussion, reference may be made to the VNC unit (280) of FIG. 2B through FIG. 2E and the VNC processor (200) of FIG. 2A through FIG. 2E, in connection with FIG. 3A through FIG. 3C. In a possible embodiment, the VNC unit (280) generally represents a single circuit or multiple circuits that are configured to generate noise-reduced output signals based on input signals, relative to a target signal. As used herein, the term "target signal" refers to signal content, in the input signal, that is to be maintained or enhanced relative to other signal content in the input signal; the other signal content in the input signal are regarded as noises.

In a possible embodiment, the VNC unit (280) receives a first input signal $S_1$, a second input signal $S_2$ and generates an output signal $S_o$. In some embodiments in which microphones (or microphone elements) are used to generate input signals, the first input signal $S_1$ may be a left ear electric signal generated from a left-ear acoustic input while the second input signal $S_2$ may be a right ear electric signal generated from a right-ear acoustic input in a headset or in a pair of headphones. The VNC unit (280) as shown in FIG. 3A is configured to use a quieter signal as an output signal.

In some possible embodiments, a minimization block ("MIN") as shown in FIG. 3A may be configured to determine magnitude ratios based on the first input signal $S_1$ and the second input signal $S_2$ and to switch to provide the quieter input signal as output. Such switching can be controlled comparing the magnitudes of the two signals in a comparator system or circuit. In some possible embodiments, the minimization block may be configured to provide a control signal to a switch that determines one of the first input signal $S_1$, or the second input signal $S_2$ as the output signal $S_o$. In an embodiment, if the magnitude of the first input signal $S_1$ is less than the magnitude of the second input signal $S_2$, then the first input signal $S_1$ is switched to be the output signal $S_o$. Otherwise, if the magnitude of the first input signal $S_1$ is no less than the magnitude of the second input signal $S_2$, then the second input signal $S_2$ is switched to be the output signal $S_o$.

Figure 4B:
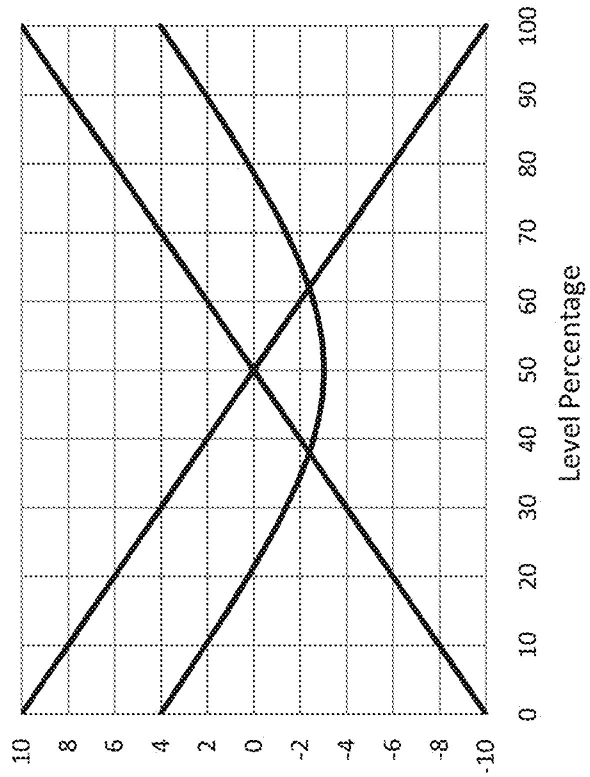
FIG. 4A through FIG. 4F illustrate example selection regions and a limit to these selection regions, according to possible embodiments of the present invention.

In some embodiments, as shown in FIG. 4B (graph drawn based on uncorrelated noises in the input signals), the VNC unit (280) of FIG. 3A achieves an SNR improvement over a 50/50 beamforming system whenever magnitudes in the two input signals differ significantly from each other.

Figure 4A:
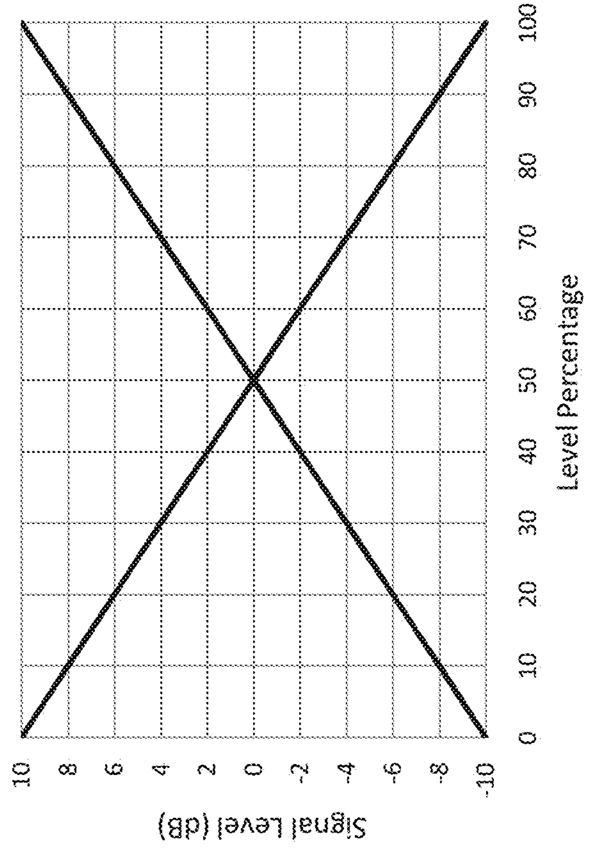

FIG. 4A-4F show graphs of signal level as a function of level expressed as a percentage of 20 dB. For example in FIG. 4A, at the left side of the graph, a first VNC input signal is shown as −10 dB while the second is shown as +10 dB, i.e. at this location there is a 20 dB difference, where the first signal is smaller than the second signal by 20 dB. At the right side of the graph, the signal level difference is reversed, i.e. at this location there is a 20 dB difference, where the first input signal is larger than the second signal by 20 dB. Thus, on the left side, the percentage of the first signal is minimum (expressed as 0%) and at the right side the percentage of the first signal is maximum (expressed as 100%). In the center of the graph, both signals are at the same level and each is at ½ of the 20 dB level range, i.e. at 50%/50%. Although the graph lines in FIG. 4A represent the level of input signals, they also represent the level of output signals for the two cases where α equals either 0 or 1 corresponding to the two switch positions in FIG. 3A. Thus, each graph line in FIG. 4A-4F shows the relative level of output noise, compared to input noise level in each input signal, given a particular value of a. For example, in FIG. 4B, the curved graph line shows the relative level of output signal noise, based on uncorrelated noises in the input signals, for a value of $\alpha$=0.5 and (1−$\alpha$)=0.5—a 50/50 mix of the input signals. This mix is also the same as that in the output of a delay-and sum 50/50 beamformer.

FIG. 3B illustrates an alternative configuration for a VNC unit (e.g., 280) as described herein. In some embodiments, the VNC unit (280) as shown in FIG. 3B may be used to outperform a 50/50 beamforming even when magnitudes in input signals do not significantly differ (e.g., with the corresponding $\alpha$ and (1−$\alpha$) values of 0.5), but especially when the magnitudes in input signals significantly differ (e.g., with the corresponding alpha values of 0 or 1). The VNC unit (280) as shown in FIG. 3B is configured to use a quieter signal as an output signal when the magnitudes in the input signals are significantly different, and to use a 50/50 beamforming as an output signal when the magnitude ratios in the input signals are not significantly different. In some possible embodiments, the minimization block may be configured to provide a control signal to a selector that determines one of the first input signal $S_1$, the second input signal $S_2$, or a mixture of $S_1$ and $S_2$ as the output signal $S_o$. Specifically, the VNC unit (280) as shown in FIG. 3B is configured to determine, based on a pair of magnitude ratio thresholds, whether the magnitude ratios in the input signals are significantly different, or not significantly different. The magnitude ratio threshold may be either dynamically configured or preset for the VNC unit (280). In a particular embodiment, the magnitude ratio thresholds are +/−4.77 dB (with corresponding non-logarithmic linear values of 0.577 and 1.73); if the absolute value of the difference between logarithmic values of the magnitudes exceeds the magnitude ratio threshold, then the magnitudes of the input signals are considered as significantly different. On the other hand, if the absolute value of the difference between logarithmic values of the magnitudes of the input signals does not exceed the magnitude ratio threshold, then the magnitudes of the input signals are considered as not significantly different. The thresholds of +/−4.77 dB may correspond to power ratios of the two input signals, e.g., the ratios 1/3 and three of the squares of the input signals, respectively. It should be noted that for the purpose of the present invention, other magnitude ratio threshold values and other ways of comparing magnitudes of input signals may be used to determine whether the magnitudes of the input signals are considered as significantly different or not. For example, some scaling factors or normalization factors may be used to calculate values before these values are compared with certain magnitude ratio thresholds. In some embodiments, ratios may be determined on the power values of the input signals, with appropriate changes in threshold values from the above mentioned.

The minimization block ("MIN") as shown in FIG. 3B may be configured to provide a control signal to a selector that determines one of (1) the first input signal $S_1$, (2) the second input signal $S_2$, and (3) a combination of $S_1$ and $S_2$ as the output signal $S_o$. The combination selected when the magnitudes of the input signals are not significantly different may use a 50-50 mixture of the two input signals, or some other mixing ratios. In an embodiment, if the magnitude of the first input signal $S_1$ is significantly different from the magnitude ratio in the second input signal $S_2$, then the input signal with the lower magnitude is switched to be the output signal $S_o$. Otherwise, if the magnitude of the first input signal $S_1$ is not significantly different from the magnitude of the second input signal $S_2$, then a combination of the input signals as described is switched to be the output signal $S_o$.

In some embodiments, as illustrated in FIG. 4B (graphs drawn based on uncorrelated noises in the input signals), a VNC unit (280) of FIG. 3B achieves an SNR improvement over a 50/50 beamforming system for practically all magnitude ratios in the two input signals. The improvement to SNR under the VNC techniques herein may be achieved in practically all cases where there is noise in the two input signals.

FIG. 3C illustrates an example general configuration for a VNC unit (280) as described herein. In some embodiments, the VNC unit (280) as shown in FIG. 3C may be configured to select from n linear combinations of the input signals $S_1$ and $S_2$ as the output signal $S_o$. In some embodiments, the VNC unit (280) as shown in FIG. 3C is configured with (n−1) magnitude ratio thresholds. Without loss of generality, the one, two or more magnitude ratio thresholds may be listed in an ordered sequence of threshold values in the ascending order. The magnitude ratios may be compared to the one, two or more magnitude ratio thresholds to determine the selected combination of the input signals $S_1$ and $S_2$ to be provided as the output signal $S_o$.

In some embodiments, one, two or more selection regions may be formed using the one, two or more magnitude ratio thresholds. The one, two or more selection regions may be defined with the one, two or more magnitude ratio thresholds. If the total number of magnitude ratio thresholds is n−1, then n selection regions may be defined. In some embodiments, for example, a first selection region in the one, two or more selection regions may be formed from—infinity to the first magnitude ratio threshold in the ordered sequence of threshold values. A second selection region in the one, two or more selection regions may be formed from the first magnitude ratio threshold to the second magnitude ratio threshold in the ordered sequence of threshold values. Similarly, other selection regions may be formed using other magnitude ratio thresholds in the ordered sequence of threshold values. Within a selection region, a corresponding combination of the input signals $S_1$ and $S_2$ is selected to be provided as the output signal $S_o$.

In some embodiments, the VNC processor (200) may be configured with two or more values of the weighting factor $\alpha$ in expression (1), each of which values is assigned to a different selection region in the one, two or more selection regions. Without loss of generality, the values of the weighting factor $\alpha$ may be denoted as a sequence of ($\alpha_1$, $\alpha_2$, . . . , $\alpha_{n-1}$, and $\alpha_n$. In some embodiments, the values $\alpha_i$ (i=1 . . . n) of the weighting factor $\alpha$ may be applied to (e.g., in one of mathematical operations which include, but are not limited to, multiplication with) the input signals for the purpose of producing the output signal $S_o$, for example, using expression (1). In some embodiments, weighting factors as described herein may be, but in general are not limited to, multiplicative factors; once a particular value, e.g., $\alpha_1$, is used, then the output signal, e.g., $S_o$(i) is given based on the first and second input signals, e.g., $S_1$(i) and $S_2$(i), with the following expression (9):

$$S_o(i)=\alpha_i*S_1(i)+(1-\alpha_i)*S_2(i) \qquad \text{expression (9)}$$

For example, when n=2, the VNC processor (200) may be configured with a magnitude ratio threshold of 0 dB, as shown in FIG. 3A and FIG. 4A. Two selection regions may be formed from −infinity to 0 dB, and from 0 dB to +infinity. Two weighting factors, $\alpha_1$ and $\alpha_2$, with values of 100% and 0% may be assigned to the two selection regions, respectively. In the first selection region where the difference between logarithmic values of the magnitude of $S_1$ and the magnitude of $S_2$ is no greater than 0 dB, the weighting factors for $S_1$ and $S_2$ are respectively 100% and 0%, as determined by $\alpha_1$ and $(1-\alpha_1)$. In the second selection region where the difference between logarithmic values of the magnitude of $S_1$ and the magnitude of $S_2$ is greater than 0 dB, the weighting factors for $S_1$ and $S_2$ are respectively 0% and 100%, as determined by $\alpha_2$ and $(1-\alpha_2)$.

When n=3, the VNC processor (200) may be configured with two magnitude ratio thresholds of −4.77 dB and 4.77 dB, as shown in FIG. 3B and FIG. 4B. Three selection regions may be formed from −infinity to −4.77 dB, from −4.77 dB to +4.77 dB, and from +4.77 dB to +infinity. Three values, $\alpha_1$, $\alpha_2$ and $\alpha_3$ (e.g., 100%, 50% and 0%), of the weighting factor $\alpha$ may be assigned to the three selection regions, respectively. In the first selection region where the difference between logarithmic values of the magnitude of $S_1$ and the magnitude of $S_2$ is from −infinity to −4.77 dB, the weighting factors for $S_1$ and $S_2$ are respectively 100% and 0%, as determined by $\alpha_1$. In the second selection region where the difference between logarithmic values of the magnitude of $S_1$ and the magnitude of $S_2$ is from −4.77 dB to +4.77 dB, the weighting factors for $S_1$ and $S_2$ are respectively 50% and 50%, as determined by $\alpha_1$. In the third selection region where the difference between logarithmic values of the magnitude of $S_1$ and the magnitude of $S_2$ is from +4.77 dB to +infinity, the weighting factors for $S_1$ and $S_2$ are respectively 0% and 100%, as determined by $\alpha_3$.

In some possible embodiments, a VNC process may be used to process two input signals, for example, a left input signal and a right input signal. For the purpose of generating an output signal, the VNC process may select the left input signal, the right input signal or a 50/50 mix of the left and right input signals, and attenuate the input signals (or equivalently the output signal) by a factor, based on the cosine squared of half the phase angle difference between the phases of the two input signals' phases.

For example, after determining the number of input signals and/or the sample rate of the input signals, the VNC process may generate or receive a window containing the non-zero weights for an N-sample audio window. After separating the left and right channels, the VNC process may apply the window and convert samples in the left and right input signals from the time domain to the frequency domain. For every sample bin in the frequency domain, the VNC process may calculate squared magnitudes of a sample pair in the frequency domain. The VNC process may compare the squared magnitudes against a pair of thresholds at ±4.77-dB, as previously discussed. Based on the results of the comparison, the VNC process may select the sample in the left input signal, the sample in the right input signal, or a 50/50 mix of the sample pair in the left and right input signals, as an output signal.

In some possible embodiments, the VNC process may calculate the cosine² of one half (½) of the phase difference of every sample pair in the frequency domain, either directly using the arguments of the input signal vectors, indirectly as follows:

$$\text{cosine}^2=0.5+0.5(R_1\cdot R_2+I_1\cdot I_2)/[(I_1^2+R_1^2)^{1/2}\cdot(I_2^2+R_2^2)^{1/2}] \quad \text{expression (10)}$$

where $R_1$ and $I_1$ are the real and imaginary parts of a sample in the left input signal of a sample pair, respectively, while $R_2$ and $I_2$ are the real and imaginary parts of a corresponding sample in the right input signal of the sample pair, respectively, or by any other means.

Figure 20:
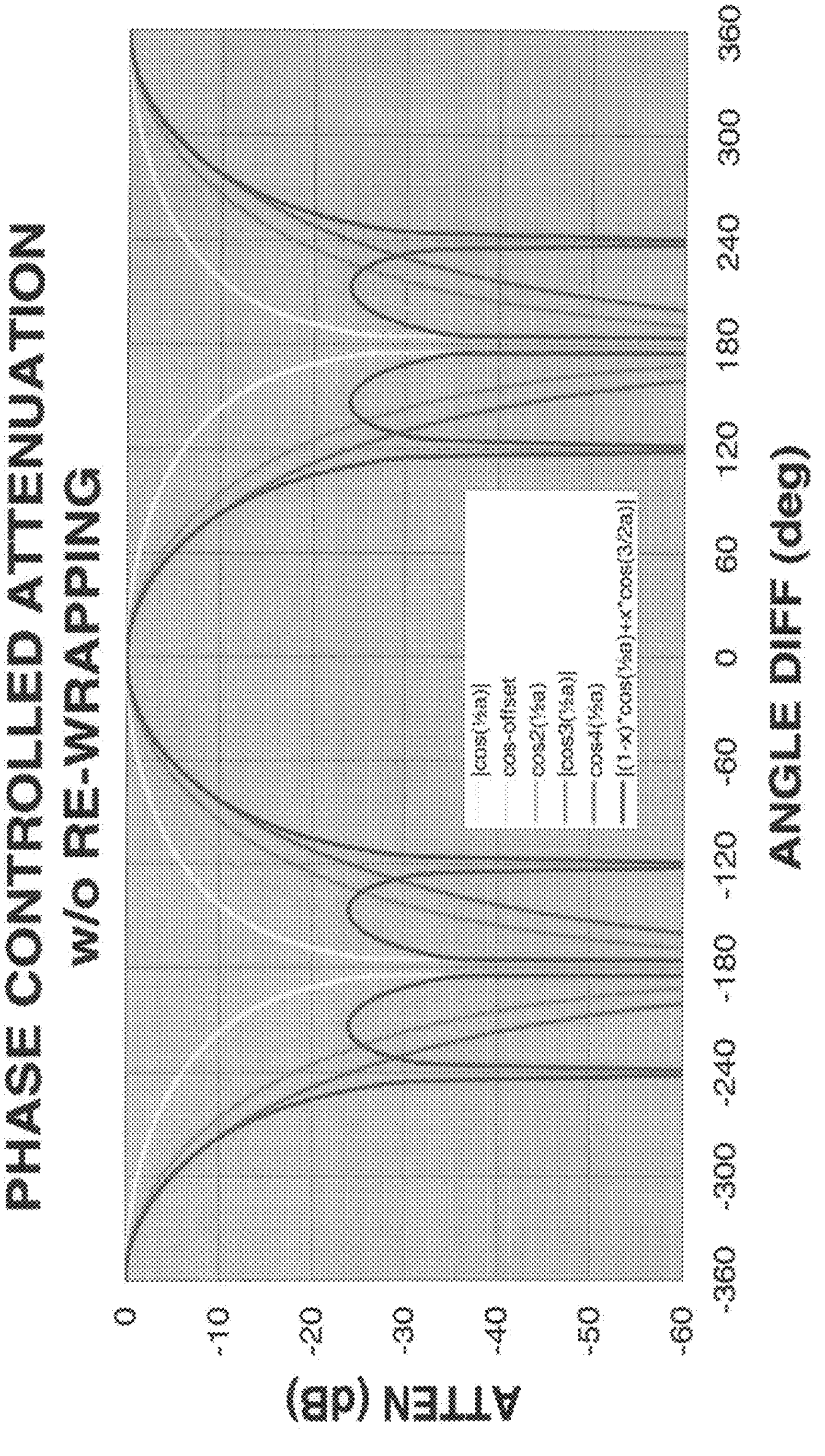
FIG. 20 illustrates example attenuation characteristics, as a function of phase difference, according a possible embodiment of the present invention.

An attenuation or amplification factor involving cosine² may be used to attenuate or amplify a sample for the output signal. An example is illustrated as follows:

$$FO_{att}=FO\cdot[\text{cosine}^2]^{\beta} \quad \text{expression (11)}$$

where $FO_{att}$ and FO are the attenuated magnitude and the pre-attenuated magnitude, respectively, of the sample for the output signal, and $\beta$ is an exponentiation value. When $\beta=0$ there is no attenuation. Alternatively, as discussed above, the cosine attenuation can be applied to both input signals prior to the weighted combining and selection steps of the VNC process. The cosine attenuation provides additional reduction for noise signals originating from "off-axis" locations, and where the target signal is located practically "on-axis". FIG. 20 illustrates the cosine² attenuation characteristic (as a function of the phase angle difference, a) as the third listed curve.

Subsequently, the VNC process may convert samples for the output signal in the frequency domain to the time domain, for example, using an overlap-and-add reconstruction method.

In some possible embodiments, a VNC process may substitute for the cosine attenuation/amplification, other phase difference based attenuation/amplification characteristics, for the purpose of generating a noise-reduced output signal from input signals. Five examples of such other phase difference based attenuation characteristics, here all based just upon the cosine function, are also listed and illustrated in FIG. 20. In some further possible embodiments, a VNC process may substitute for the cosine attenuation/amplification, dipole, Gaussian or other phase attenuation/amplification for the purpose of generating a noise-reduced output signal from input signals. In some possible embodiments, attenuation/amplification values may be a function of signal power and/or noise power as derived from the VNC process. In some possible embodiments, additionally and/or optionally, attenuation/amplification values may be determined from the phase difference of the input signals to the VNC process.

For example, after determining the number of input signals and/or the sample rate of the input signals, a VNC process may generate or receive a set of non-zero window weights for an N-sample audio window. After separating the left and right channels, the VNC process may apply the window and convert samples in the left and right input signals from the time domain to the frequency domain. For every sample bin in the frequency domain, the VNC process may calculate squared magnitudes and phase differences of a sample pair in the frequency domain. The VNC process may compare the squared magnitudes against a pair of thresholds at ±4.77-dB, as previously discussed. Based on the results of the comparison, the VNC process may select the sample in the left input signal, the sample in the right input signal, or a 50/50 mix of the sample pair in the left and right input signals, as an output signal, as given in expression (9).

In some possible embodiments, the VNC process may calculate a dipole noise template $F_{NT}$ of every sample pair in the frequency domain, as follows:

$$F_{NT}=|F_L-F_R|^2 \quad \text{expression (12)}$$

where $F_L$ and $F_R$ are the complex vector sample in the left input signal, and the complex vector sample in the right input signal, of the sample pair, respectively. The signal power, $F_{OM}$, of a sample for the output signal (which has been selected based on comparing input signal powers of the input signals against the above-mentioned thresholds) may be computed as follows:

$$F_{OM}=|F_O|^2 \quad \text{expression (13)}$$

where $F_O$ is the corresponding complex vector sample for the output signal.

In some possible embodiments, the VNC process sets the sample for the output signal to a new attenuated value, Foo, given as follows:

$$F_{OO}=(F_{OM}/(F_{NT}+F_{OM}))\cdot F_O \quad \text{expression (14)}$$

In some possible embodiments, the VNC process calculates a phase difference in the sample pair of the input signals as follows:

$$\Delta P=\arccos([Re(F_L)\cdot Re(F_R)+Im(F_L)\cdot Im(F_R)]/(|F_L|\cdot|F_R|)) \quad \text{expression (15)}$$

where Re( ) is the real part of a complex value while Im( ) is the imaginary part of a complex value.

In some possible embodiments, the VNC process sets the sample for the output signal to a further new Gaussian attenuated value, Fooo, given as follows:

$$F_{OOO}=F_{OO}\cdot e^{-[\beta\cdot(\Delta P\cdot 2/\pi)^{\wedge}2]}) \quad \text{expression (16)}$$

where $\beta$ is an attenuation factor. When $\beta$ is zero, no attenuation based on the phase difference occurs. Alternatively, the further attenuation demonstrated in expression (16) can be the only new attenuation applied, i.e. in substitution for the further attenuation of expression (14).

In some possible embodiments, the Gaussian attenuation shown in expression (16) can be controlled, not by the phase difference, ΔP, but by another signal difference, such as the magnitude ratio $MR=|F_L|/|F_R|$, for example. In this example embodiment, the attenuation may be:

$$\text{Attn}=e^{-[\beta\cdot(log(MR)\cdot 2/\pi)^{\wedge}2]}). \quad \text{expression (17)}$$

In various other example embodiments, control of the Gaussian attenuation can be accomplished with characteristics other than phase difference or magnitude ratio by using correlation, noise ratio, power ratio, coherence and/or other well known signal difference measures, and all such measures are contemplated for the purpose of the present invention.

Subsequently, the VNC process may convert samples (with values determined in expression (16)) for the output signal in the frequency domain to the time domain, for example, using an overlap-and-add reconstruction method.

FIG. 3C shows selecting between "intermediate" signals (weighted combinations of the input signals $S_1$ and $S_2$) using a number of selection regions created by different fixed alpha values. When the number of selection regions n=4, the VNC processor (200) may be configured with three magnitude ratio thresholds (or fixed alpha values) of −6.99 dB, 0 dB and 6.99 dB, as shown in FIG. 4C (graphs drawn based on uncorrelated noises in the input signals). Four selection regions may be formed from −infinity to −6.99 dB, from −6.99 dB to 0 dB, from 0 dB to +6.99 dB, and from +6.99 dB to +infinity. Four values, $\alpha_1$, $\alpha_2$, $\alpha_3$ and $\alpha_4$ (e.g., 100%, 66.67%, 33.33% and 0%), of the weighting factor $\alpha$ may be assigned to the four selection regions, respectively. In the first selection region where the difference between logarithmic values of the magnitude of $S_1$ and the magnitude of $S_2$ is from −infinity to −6.99 dB, the weighting factors for $S_1$ and $S_2$ are respectively 100% and 0%, as determined by $\alpha_1$. In the second selection region where the difference between logarithmic values of the magnitude of $S_1$ and the magnitude of $S_2$ is from −6.99 dB to 0 dB, the weighting factors for $S_1$ and $S_2$ are respectively 66.67% and 33.33%, as determined by $\alpha_2$. In the third selection region where the difference between logarithmic values of the magnitude of $S_1$ and the magnitude of $S_2$ is from 0 dB to +6.99 dB, the weighting factors for $S_1$ and $S_2$ are respectively 33.33% and 66.67%, as determined by $\alpha_3$. In the fourth selection region where the difference between logarithmic values of the magnitude of $S_1$ and the magnitude of $S_2$ is from +6.99 dB to +infinity, the weighting factors for $S_1$ and $S_2$ are respectively 0% and 100%, as determined by $\alpha_4$.

Figure 4D:
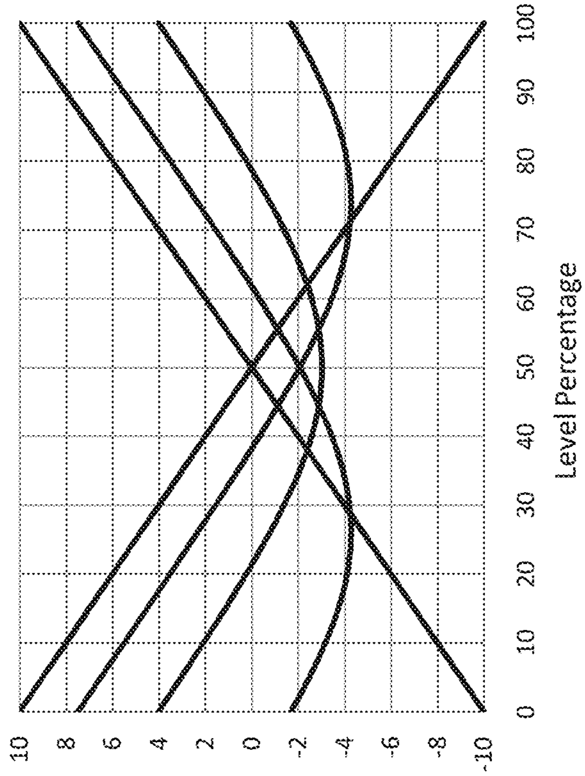
Figure 4C:
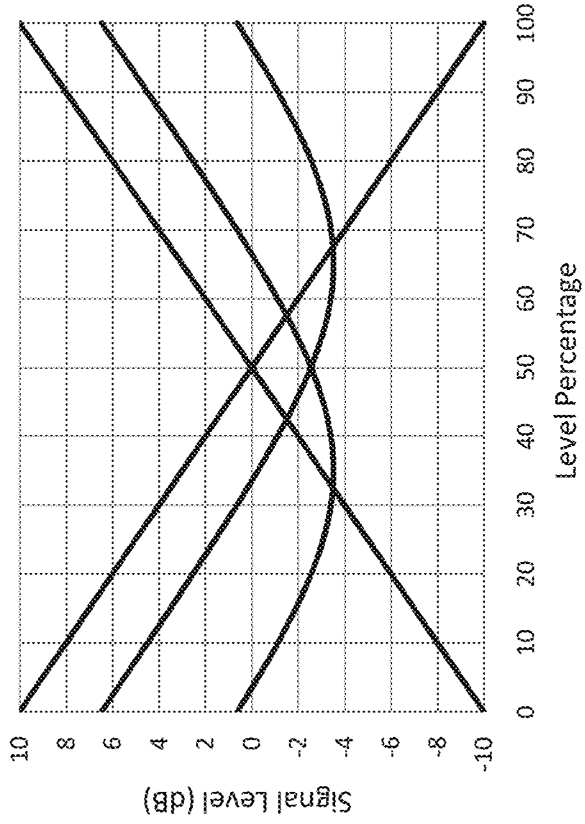

When n=5, the VNC processor (200) may be configured with four magnitude ratio thresholds of −8.45 dB, −2.22 dB, 2.22 dB and 8.45 dB, as shown in FIG. 4D (graphs drawn based on uncorrelated noises in the input signals). Five selection regions may be formed from −infinity to −8.45 dB, from −8.45 dB to −2.22 dB, from −2.22 dB to +2.22 dB, from +2.22 dB to +8.45 dB, and from +8.45 dB to +infinity. Five values, $\alpha_1$, $\alpha_2$, $\alpha_3$, $\alpha_4$ and $\alpha_5$ (e.g., 100%, 75%, 50%, 25% and 0%), of the weighting factor $\alpha$ may be assigned to the five selection regions, respectively. In the first selection region where the difference between logarithmic values of the magnitude of $S_1$ and the magnitude of $S_2$ is from −infinity to −8.45 dB, the weighting factors for $S^1$ and $S_2$ are respectively 100% and 0%, as determined by $\alpha_1$. In the second selection region where the difference between logarithmic values of the magnitude of $S_1$ and the magnitude of $S_2$ is from −8.45 dB to −2.22 dB, the weighting factors for $S_1$ and $S_2$ are respectively 75% and 25%, as determined by $\alpha_2$. In the third selection region where the difference between logarithmic values of the magnitude of $S_1$ and the magnitude of $S_2$ is from −2.22 dB to +2.22 dB, the weighting factors for $S_1$ and $S_2$ are respectively 50% and 50%, as determined by $\alpha_3$. In the fourth selection region where the difference between logarithmic values of the magnitude of $S_1$ and the magnitude of $S_2$ is from +2.22 dB to +8.45 dB, the weighting factors for $S_1$ and $S_2$ are respectively 25% and 75%, as determined by $\alpha_4$. In the fifth selection region where the difference between logarithmic values of the magnitude of $S_1$ and the magnitude of $S_2$ is from +8.45 dB to +infinity, the weighting factors for $S_1$ and $S_2$ are respectively 0% and 100%, as determined by $\alpha_5$.

Figure 4E:
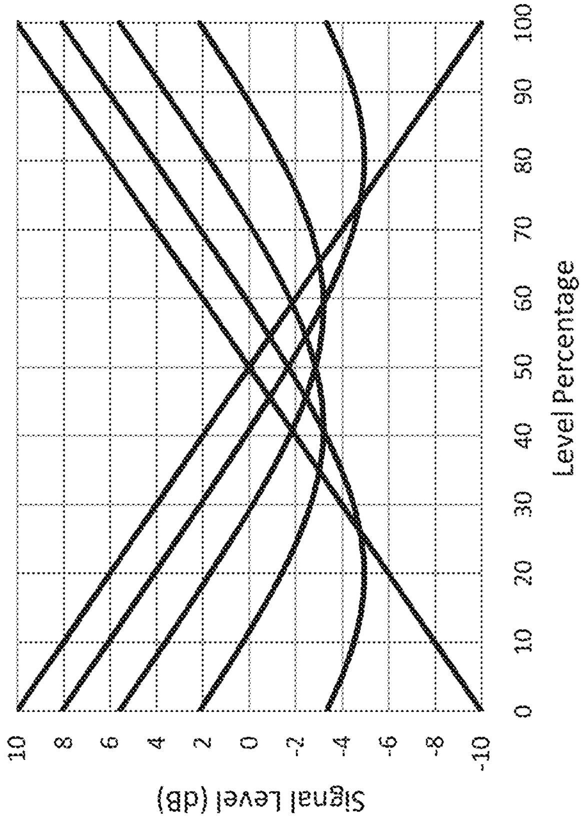

When n=6, the VNC processor (200) may be configured with four magnitude ratio thresholds of −9.54 dB, −3.68 dB, 0 dB, 3.68 dB and 9.54 dB, as shown in FIG. 4E (graphs drawn based on uncorrelated noises in the input signals). Five selection regions may be formed from −infinity to −9.54 dB, from −9.54 dB to −3.68 dB, from −3.68 dB to 0 dB, from 0 dB to +3.68 dB, from +3.68 dB to +9.54 dB, and from +9.54 dB to +infinity. Six values, $\alpha_1$, $\alpha_2$, $\alpha_3$, $\alpha_4$, $\alpha_5$ and $\alpha_6$ (e.g., 100%, 80%, 60%, 40%, 20% and 0%), of the weighting factor $\alpha$ may be assigned to the six selection regions, respectively. In the first selection region where the difference between logarithmic values of the magnitude of $S_1$ and the magnitude of $S_2$ is from −infinity to −9.54 dB, the weighting factors for $S_1$ and $S_2$ are respectively 100% and 0%, as determined by $\alpha_1$. In the second selection region where the difference between logarithmic values of the magnitude of $S_1$ and the magnitude of $S_2$ is from −9.54 dB to −3.68 dB, the weighting factors for $S_1$ and $S_2$ are respectively 80% and 20%, as determined by $\alpha_2$. In the third selection region where the difference between logarithmic values of the magnitude of $S_1$ and the magnitude of $S_2$ is from −3.68 dB to 0 dB, the weighting factors for $S_1$ and $S_2$ are respectively 60% and 40%, as determined by $\alpha_3$. In the fourth selection region where the difference between logarithmic values of the magnitude of $S_1$ and the magnitude of $S_2$ is from 0 dB to +3.68 dB, the weighting factors for $S_1$ and $S_2$ are respectively 40% and 60%, as determined by $\alpha_4$. In the fifth selection region where the difference between logarithmic values of the magnitude of $S_1$ and the magnitude of $S_2$ is from +3.68 dB to +9.54 dB, the weighting factors for $S_1$ and $S_2$ are respectively 20% and 80%, as determined by $\alpha_5$. In the sixth selection region where the difference between logarithmic values of the magnitude of $S_1$ and the magnitude of $S_2$ is from +9.54 dB to +infinity, the weighting factors for $S_1$ and $S_2$ are respectively 0% and 100%, as determined by $\alpha_6$.

Figure 4F:
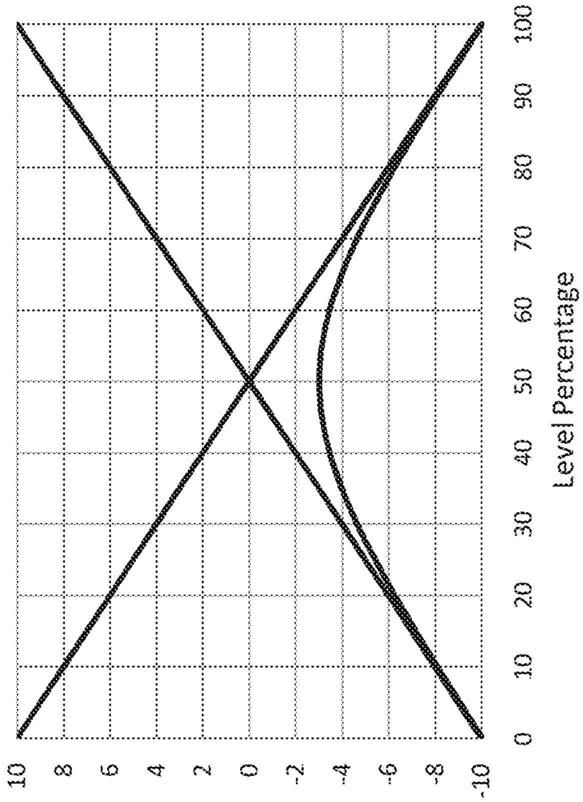

Two, three, four, five, six intermediate signal lines with different combinations of $S_1$ and $S_2$ are respectively illustrated in FIG. 4A through FIG. 4E. Each intermediate signal line ($S_o$ of FIG. 3C) represents a possible output signal as a function of $S_1$ and $S_2$ with a particular set of weighting factors. In some embodiments, the magnitude ratio thresholds may be determined by the intersections of output signal graph lines in these figures. In some embodiments, the output signals $S_o$ of FIG. 3C under VNC techniques as described herein is indicated as the lowest contour formed by line segments of these intersecting output signal lines in each of these figures. When the number of α values (e.g., n) approaches infinity, the lowest contour may approach that of a smooth curve as illustrated in FIG. 4F.

As can be seen from FIG. 3A through FIG. 3C and FIG. 4A through FIG. 4E, a VNC unit (280) as described herein utilizing one or more intermediate weighting factor values (e.g., those other than 100% and 0%) and one or more corresponding intermediate signals performs better than a beamforming system using multiple input signals. In various embodiments, optimal performance may be obtained with one, two, three or a large number of intermediate weighting factor values and corresponding intermediate signals. However, excellent noise cancellation performance may be accomplished by using a limited number such as one, two or three intermediate weighting factor values and by selecting an intermediate signal (e.g., a mixture of the input signals) based on simple comparison of input signal magnitudes. As a result, a VNC unit (280) as described herein may be implemented with significant low complexity, high performance, and low computation power consumption at system runtime by choosing a small n at design time.

7. VNC WITH OTHER SIGNAL DATA

It has been described that magnitudes of input signals may be used to select a particular selection region in a plurality of selection regions, and thus apply applicable weighting factors associated with the particular selection region selected with the particular magnitude ratio. However, it should be noted that the present invention is not so limited. Other quantities other than magnitudes may be used in selecting a particular combination of input signals for the purpose of creating an output signal.

In some possible embodiments, alternatively and/or optionally, the minimization block ("MIN") as shown in FIG. 3A through FIG. 3C may be configured to selecting and switching to a combination of the first input signal $S_1$ and the second input signal $S_2$ as the output signal $S_o$ without determining magnitude ratios in the first input signal $S_1$ and the second input signal $S_2$. For example, the minimization block ("MIN") may be configured to select and switch a combination of the first input signal $S_1$ and the second input signal $S_2$ as the output signal $S_o$ directly based on relative power levels in the first input signal $S_1$ and the second input signal $S_2$, as illustrated in FIG. 2D. A power level determination unit (282) may be configured to determine power levels in the input signals. In some embodiments, the power level of a wave signal such as the first input signal $S_1$ or the second input signal $S_2$ may be proportional to the square of the magnitude of the wave signal. If the power level of the first input signal $S_1$ is less than that of the second input signal $S_2$, then the output signal $S_o$ is the first input signal $S_1$. On the other hand, if the power level of the first input signal $S_1$ is no less than that of the second input signal $S_2$, then the output signal $S_o$ is the second input signal $S_2$.

In some possible embodiments, the minimization block ("MIN") as shown in FIG. 3A through FIG. 3C may be configured to select a selection region with its corresponding intermediate signal directly based on phase differences of the input signals. In some possible embodiments, input signals may be represented by complex numbers. The arguments of those numbers may be computed (for example, representing the electrical phase of those signals). The differences in phase angles between input signals (for example, one left and one right) may be calculated.

Because the phase angle of the target signal may be identical or substantially the same in all of the input signals, it is reasonable to deduce that a signal with a small phase difference comprises a smaller amount of noise. Thus, instead of using values (e.g., logarithmic values) of magnitudes of input signals, phase differences of the input signals may be used in an example VNC processor (200) that comprises a phase difference determination unit (284) as illustrated in FIG. 2E.

In some possible embodiments, phase differences in frames/bins may be used to:

a) compare with one or more thresholds to select among the quieter or quietest one of input signals and different combinations of those input signals;
b) calculate one or more linearly derived values of one or more weight factors for combining the input signals into a weighted combined signal as the output signal; or
c) calculate one or more non-linearly derived values of one or more weight factors for combining the input signals into a weighted combined signal as the output signal.

In some possible embodiments, a phase difference for a sample pair of two input signals as described herein may be calculated and rewrapped to within −180° to 180°, including either 180° or −180°. Further, one of the two original signals and the intermediate signals may be selected to be the output signal. More specifically, using the phase difference, a comparator determines when the absolute value of the phase difference exceeds a predetermined threshold (e.g., 60° or 30°). When the absolute value of the phase difference is less than the threshold, a VNC process may select and pass to the output an intermediate signal (e.g., a mean of the two input signals). When the phase difference exceeds the threshold, the VNC process may select and pass to the output the quieter signal (e.g., the lower of the two input signals in the present example, or the lowest of the three or more input signals otherwise). For more than one intermediate signal, the phase difference can be compared to more than one threshold to select between multiple intermediate signals.

In some possible embodiments, the minimization block ("MIN") as shown in FIG. 3A through FIG. 3C may be configured to selecting a selection region with corresponding weighting factors set based on both magnitudes and phase angles of the input signals. In some possible embodiments, a function of magnitudes and phase angles of the input signals may be used for the purpose of determining weighting factors for VNC processing. Such a function may also be normalized and/or scaled in various possible embodiments.

For example, the output signal $S_o$ may be determined by the following expression (18):

$$S_o=\alpha*S_A+(1-\alpha)*S_B \quad \text{expression (18)}$$

Here, based on the signal magnitude or squared signal magnitude, $S_A$ is the louder of the input signals $S_1$ and $S_2$, while $S_B$ is the less loud of the input signals $S_1$ and $S_2$. In some embodiments, the weighting factor α in expression (18) may be determined by the following expression (19):

$$\alpha=|\Delta\phi|2\pi \quad \text{expression (19)}$$

where Δϕ is the phase difference, as rewrapped if necessary, between the phase angles of the input signals $S_1$ and $S_2$. Since the phase difference Δϕ is limited to a region from −π to π, the weighting factor α may be limited to values between 0 and ½.

Alternatively, the weighting factor α does not have to be linearly dependent on the phase difference, and rather may be set by a nonlinear functional relationship such as given by the following expression (20):

$$\alpha=\tfrac{1}{2}(|\Delta\phi|/\pi)^{\beta} \quad \text{expression (20)}$$

where β is a scalar exponentiation value not equal to one, for example ½ or 2.

For example, after determining the number of input signals and/or the sample rate of the input signals, a VNC process may generate or receive a set of non-zero window weights for an N-sample audio window. After separating the left and right channels, the VNC process may window and convert samples in the left and right input signals from the time domain to the frequency domain. For every sample bin in the frequency domain, the VNC process may calculate squared magnitudes and phases of a sample pair in the frequency domain. Alternatively it may do this on a band by band basis. The VNC process may compare the squared magnitudes against a pair of thresholds, for example at ±4.77-dB, as previously discussed. Based on the results of the comparison, the VNC process may select the sample in the left input signal, the sample in the right input signal, or a 50/50 mix of the sample pair in the left and right input signals, as an output signal.

In some possible embodiments, the VNC process may calculate the unwrapped phase difference PD of every sample pair in the frequency domain. The phase difference PD may be used as a control to generate a sample for the output signal, as follows:

$$FO=(0.5+0.5\cdot(PD/\pi))\cdot F(SM_L,SM_R,F_L,F_R)+(0.5-0.5\cdot(PD/\pi))\cdot F(SM_L,SM_R,F_R,F_L) \quad \text{expression (21)}$$

where FO is the complex vector sample for the output signal; $F_L$ and $F_R$ are the complex vector sample in the left input signal, and the complex vector sample in the right input signal, in the input pair, respectively; $SM_L$ and $SM_R$ are the squared magnitude of the sample in the left input signal, and the squared magnitude of the sample in the right input signal, in the sample pair, respectively; and F( ) is a comparator function as follows:

$$F(S_1,S_2,U,V)=\text{if}(S_1\leq S_2,\text{ then } U,\text{ else } V) \quad \text{expression (22)}$$

In some possible embodiments, instead of being a linear control, the phase difference PD may be used as a non-linear control to generate a sample for the output signal, as follows:

$$FO=(0.5+0.5\cdot(PD/\pi)^{exp})\cdot F(SM_L,SM_R,F_L,F_R)+(0.5-0.5\cdot(PD/\pi)^{exp})\cdot F(SM_L,SM_R,F_R,F_L) \quad \text{expression (23)}$$

where exp is an exponential factor not equal to one.

Subsequently, the VNC process may convert samples for the output signal in the frequency domain to the time domain, for example, using an overlap-and-add reconstruction method.

It should be noted that other nonlinear expressions may be used in place of expression (23) to determine a nonlinear factor. In addition, in some possible embodiments, instead of rewrapping phase differences exceeding a certain range (e.g., from −180° to 180°), weighting factors for input signals with a first phase difference outside a certain range (e.g., from −180° to 180°) may repeat the same calculation using weighting factors at a second phase difference in the range (from −180° to 180°), where the second phase difference in the range may differ from the first phase difference by an integer times ½ length of the range, such as 180°.

In some possible embodiments, weighting factor values may be determined from signal power and/or energy measures. For example, using $SM_L$ and $SM_R$, the squared magnitude of the sample in the left input signal, and the squared magnitude of the sample in the right input signal, in the sample pair, respectively, a left weighting factor value, $V_L$, can be calculated as:

$$V_L=G(SM_R,SM_L,0,G(SM_L,SM_R,1,0.5)) \quad \text{expression (24)}$$

for each frequency bin or band, where G( ) is a conditional function defined as:

$$G(Sa,Sb,V,W)=\text{if}(Sa/(Sa+Sb)<\delta,\text{ then } V,\text{ else } W) \quad \text{expression (25)}$$

where δ is a threshold level between 0 and 0.5, and which can be, for example, 0.335. Thus, $V_L$ consists of one of three discrete values, 0, ½ or 1, depending upon the power or energy distribution between the two input signals. The weight value of $V_L$ is applied to the left input signal sample $F_L$, while $V_R=(1-V_L)$ is a weight value which is applied to the right input signal sample $F_R$, as follows:

$$Fo=V_L\cdot F_L+V_R\cdot F_R \quad \text{expression (26)}$$

to create the output signal sample, Fo. In some embodiments, the left weighting factor value, $V_L$, can be first smoothed over, time, frequency or other space using any known smoothing method, before calculating $V_R$ and applying the smoothed weighting factor values to create the output signal sample.

In another possible embodiment, the weighting factor values, $V_L$ and $V_R$, are determined from real and imaginary input signal component differences to produce continuous weight values. For example, if DR is the difference between the real parts of $F_L$ and $F_R$, and DI is the difference between the imaginary parts of FL and FR, i.e.:

$$DR=Re(F_L)-Re(F_R) \text{ and } DI=Im(F_L)-Im(F_R) \quad \text{expression (27)}$$

then the weight value, $V_R$, to be applied to the right input signal is found as:

$$V_R=(Re(F_L)+DI\cdot(Im(F_R)\cdot Re(F_L)-Im(F_L)\cdot Re(F_R)))/(DR\cdot(DR^2+DI^2)). \quad \text{expression (28)}$$

$V_R$ consists of a weight value which is applied to the right input signal sample $F_R$, while $V_L=(1-V_R)$ consists of a weight value which is applied to the left input signal sample $F_L$, as shown in expression (26), to create the output signal sample, Fo.

Thus, for the purpose of the present invention, these and other ways of establishing a relationship between magnitudes/phase differences and weighting factors for input signals may be used under the VNC techniques as described herein. In addition, various ways of establishing a relationship between magnitudes/phase differences and weighting factors for intermediate signals may be used under the VNC techniques as described herein.

In various possible embodiments, magnitudes, phase angles, or relations and functions of these quantities, may be used by a VNC unit (e.g., 280) to select an output signal with a certain combination of input signals as applied with certain values of weighting factors. The values of the weighting factors may be dynamically determined under some conditions, which may include, but are not limited to, expression (5) if it is complex signal comparisons or phase-only comparisons that are used to determine the weighting factors. In some possible embodiments, by using expression (6) and expression (7), the output signal can be determined in a continuous basis without ever using expression (5) to calculate the values of the weighting factors. In some possible embodiments, the weighting factors, $\alpha$, may use a value outside of the range from 0 to 1, for example may have a value of −½ or 3 or may be complex numbers. As used herein, input signals as applied with weighting factors may be amplified rather than attenuated for the purpose of producing a particular combination of the input signals as intermediate and/or output signals. For example, the VNC techniques used to determine attenuating weighting factors may be similarly used to determine amplifying weighting factors by VNC systems described herein. In some possible embodiments, for example, input signals of a particular wave type may be very weak or otherwise should be amplified. Under the VNC techniques, these input signals may be amplified rather than attenuated to produce output signals of the same type or a different wave type or a different physical quantity.

Figure 5:
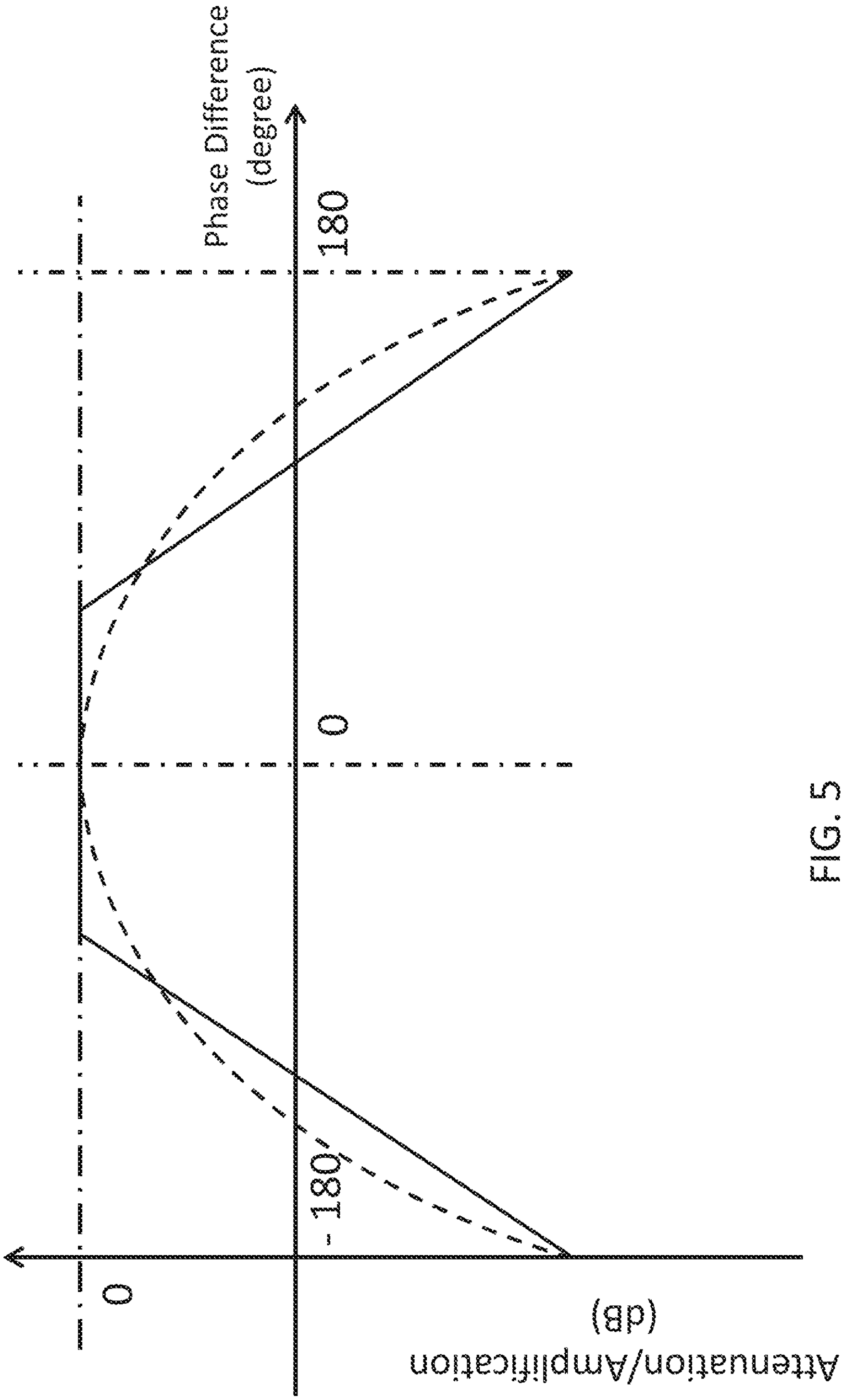
FIG. 5 illustrates example attenuation/amplification factors as functions of phase differences, according to possible embodiments of the present invention.

In some possible embodiments, the VNC processor (200) may be configured to determining phase angles of samples of a sample pair in input signals and thus determining a phase difference between the phase angles of the samples. Based on the phase difference, the VNC processor (200) may determine an attenuation or amplification factor based on a function of phase difference values from −180° to 180°, as illustrated in FIG. 5. In some possible embodiments, a sample for an output signal may be a selected combination of the samples in the input signals such as $S_1$ and $S_2$ based on weighting factors, for example, as given in expression (1). Once the attenuation or amplification factor is determined based on the phase difference of the phase angles of the input signals, the sample for the output signal may be attenuated or amplified using the attenuation or amplification factor. For the purpose of illustrations only, an attenuation factor may be used to describe subsequent signal processing operations on intermediate signals, wherein the intermediate signals have been selected as combinations of input signals based on weighting factors, as described above. However, it should be noted that an amplification factor may be used instead of an attenuation factor to perform subsequent signal processing operations on intermediate signals as described herein.

For the purpose of the present invention, other ways of selecting an attenuation or amplification factor for purposes of attenuating or amplifying an intermediate signal may be used. For example, instead of using a phase difference between phase angles of input signals, a phase difference between a phase angle of an input signal and a reference angle may be used. In a particular possible embodiment, a phase difference between a phase angle of an input signal and a reference angle such as +/−45° may be used to select an attenuation or amplification factor to attenuate or amplify the input signal. For example, if the phase angle of the input signal is within 45° of the reference angle, a minimal attenuation or amplification factor may be used. In a more specific example, if the phase angle of the input signal is within 45° of the reference angle, a minimal attenuation factor (e.g., 0 dB) may be used to attenuate the input signal. On the other hand, if the phase angle of the input signal is further way from a region from −45° to +45°, an attenuation factor may be used to attenuate the input signal to a relatively great extent. It should be noted that a region other than from −45° to +45° may be defined for the purpose of the present invention. For example, a wider region from −60° to +60° may be used to select attenuation values for purposes of attenuating or amplifying an intermediate signal. Likewise, a narrower region, for example from −30° to +30°, may be used to determine attenuation or amplification values, instead.

In some possible embodiments, attenuation or amplification values may be determined by any of a number of formulas or look-up tables that convert the phase differences to the associated attenuation or amplification to be applied. For example, attenuation values may be expressed as functions (for example, one for solid line, and another one for broken line, etc. as illustrated in FIG. 5) of phase angles. In some possible embodiments, input signals may be less attenuated or more amplified if the phase difference is in the vicinity of 0. Conversely, input signals (for example, for a different frequency or time slice) may be more attenuated or less amplified if the phase difference is in the vicinity of +/−180°.

Thus, an attenuation or amplification value may be calculated based upon the phase difference. The larger the phase difference, the greater the attenuation value and the less the amplification value may be. The resulting frequency representation of the signal is subsequently attenuated or amplified according to the attenuation or amplification values calculated above.

In some possible embodiments, two microphone sensors may be located at each ear of a talker whose voice (target signal) is to be sensed. The two signals from the two microphone sensors may be received, digitized, and broken into frames and converted to the frequency domain. In the frequency domain, the signals may be represented by complex numbers. The arguments of those numbers may be computed (representing the electrical phase of those signals) and the differences in phase between pairs of input signals (one left and one right) may be calculated. Then an attenuation value may be calculated based upon the magnitude of the phase difference, where the larger the phase difference, the greater the attenuation value. An output signal in the frequency domain may use one of the two input signals, or a combination of the two input signals in the frequency domain. The resulting frequency representation of the output signal may be subsequently attenuated according to attenuation values calculated as described above. In some possible embodiments, the attenuated frequency representation of the output signal may be noise-reduced and may be subsequently transformed to the time domain, for example, using an overlap-and-add reconstruction method.

The attenuation value may be determined by any of a number of formulas or look-up tables that convert the phase difference to the associated attenuation to be applied.

Additionally and/or optionally, when the phase difference is calculated, the result may be partially unwrapped (e.g., lies between −360° and 360°). This may result in redundant and non-continuous measurements of the phase difference. Re-wrapping the phase difference to lie between −180° and 180° may be performed. After re-wrapping, the calculated attenuation (in dB) to be applied may be of zero around a phase difference of zero, and of high values around −180° and 180°, as illustrated in FIG. 5. Any formula or look-up tables that provide the foregoing characteristics may be used for the purpose of the present invention.

In some possible embodiments, to handle the partial unwrapping, VNC techniques as described herein may use a function or formula (e.g., a half angle based function or formula) that inherently extends the attenuation calculation for phase difference values outside of +/−180°. FIG. 20 illustrates example functions or formulas that may be used to calculate attenuation factors without rewrapping.

In some possible embodiments, a VNC process may enhance the phase difference in input signals by adjusting phase in each of the input signals (frame/bin) prior to combining the input signals. In some possible embodiments, the phase difference is increased as a function of the pre-enhanced phase difference. This achieves improvement to intermediate signals that combine two or more of the input signals, but has insignificant impact on an output signal when the VNC process selects one of the two input signals as the output signal.

For example, after determining the number of input signals and/or the sample rate of the input signals, the VNC process may generate or receive a set of non-zero window weights for an N-sample audio window. After separating the left and right channels, the VNC process may window and convert samples in the left and right input signals from the time domain to the frequency domain. For every sample bin in the frequency domain, the VNC process may calculate squared magnitudes and phases of a sample pair in the frequency domain. The VNC process may compare the squared magnitudes against a pair of thresholds at ±4.77-dB, as previously discussed. Based on the results of the comparison, the VNC process may select the sample in the left input signal, the sample in the right input signal, or a 50/50 mix of the sample pair in the left and right input signals, as an output signal.

In some possible embodiments, the VNC process may calculate the unwrapped phase difference P( ) of every sample pair in the frequency domain, as follows:

$$P(P_1,P_2):=\text{if}(|P_1-P_2|\leq 180°,\ \text{then}\ |P_1-P_2|,\ \text{else}\ 360°-|P_1-P_2|) \quad \text{expression (29)}$$

where $P_1$ and $P_2$ are phases in degree units in the sample pair of the left and right input signals, respectively.

Using P( ) as computed, an attenuation factor A may be computed as follows:

$$A:=\text{if}(P\leq P_{ath},\ \text{then}\ 0,\ \text{else}(P-P_{ath})*S_a) \quad \text{expression (30)}$$

where $P_{ath}$ is a phase difference threshold, and $S_a$ is an attenuation slope for phase differences exceeding $P_{ath}$. In some possible embodiments, $P_{ath}$ and $S_a$ may vary with frequencies of frequency bins. In some possible embodiments, unwrapped phase differences P computed using expression (29) may be filtered with a low-pass filter. The filtered unwrapped phase differences are used to compute attenuation factors using expression (30).

This attenuation factor A may be used to attenuate a sample for the output signal, as follows:

$$FO_{att}=FO\cdot 10^{(-0.05\cdot A)} \quad \text{expression (31)}$$

where $FO_{att}$ and FO are the attenuated sample and the pre-attenuated sample, respectively, for the output signal.

Subsequently, the VNC process may convert samples for the output signal in the frequency domain to the time domain, for example, using an overlap-and-add reconstruction method.

8. LOW CORRELATION NOISES

As set forth herein, VNC techniques exploit low correlation between independent samples of noise. In their simplest forms, these techniques pass the quietest version of numerous intermediate mixtures of the input signals. Because the selection of signals with quietest noise portion may be implemented with minimal computational cost and without floating point multiplication or division operations, a system based on vector noise cancellation techniques is capable of fast adaptation to various signal fields with no unprocessed output, and may be flexibly implemented in DSP code, on a standard processor, in a gate array or even as an analog process. To select the quietest signal out of combinations of input signals, a VNC process may perform simple comparison operations between the input signals. For example, three selection regions for magnitudes of two input signals may be formed by two magnitude ratio thresholds. The thresholds may be used to select whether the output signal is one or the other of the two input signals, or a half-half combination of the two input signals. In the case of the half-half combination, each of the input signals is to be divided by two. This division may be made in a base 2 processor with merely a shift. These foregoing operations also can be performed on a frame-by-frame basis with no temporal averaging. With these simple comparison and shift operations, the selection of different combinations of the input signals can be done at a high speed with great computational efficiency.

In some possible embodiments, the VNC processor (200) may be configured to minimize the length of a finite time interval covered by a frame (e.g., a signal frame in the one, two, or more input signals (214)). A small time interval for the frames may reduce the possibility of correlation among contemporaneous frames. For example, with a small time interval, correlation among the contemporaneous frames due to reverberations, refraction, and reflection may be reduced. A choice of time interval may be dynamically made by the VNC processor (200) based on statistics and analysis of input signal data at runtime.

In some possible embodiments, the VNC processor (200) may be configured to partition the frequency domain (or an effective total range of frequencies) into frequency bins and/or regions that fall into independent frequency bands. The use of independent frequency bands may reduce correlation of noises with differing frequencies. A choice of partitioning of the frequency domain into frequency bins and/or bands may be dynamically made by the VNC processor (200) based on statistics and analysis of signal data at runtime.

9. EFFICACY OF VNC WITH UNCORRELATED NOISES

Take acoustic signal processing as an example. The VNC techniques may be configured to handle signal fields that comprise time independent noises, simple pure tone bursts, pink noise bursts, white noises including random and rapid white noise, bursts of varying lengths, complex series of clicks, tones, whistles and pops, frequency independent noises, swept sine waves, white noise in multiple alternating bands, pink noise in >120 separate narrow frequency bands, complex real-world in-band noises, stereo music, wind noises, male and female simultaneous talkers, etc. As used herein, a signal field is a time-varying signal distribution of a physical wave in spatial directions as received by a VNC system.

The VNC techniques may be compared with other noise cancellation or reduction techniques such as beamforming and spectral subtraction using the same input signals for efficacy in reducing uncorrelated or less correlated noises. In some possible embodiments, the input signals may have very low Signal-to-Noise Ratios (SNR).

In an example with simple noises of two pure tones (e.g., 440 Hz and 1200 Hz) occurring one at a time, the pre-processing input SNR of a target signal is −24 dB. A spectral subtraction system may easily remove the noises as the tones are in narrow bands. However, a beamforming system may reduce the noises only by ~6 dB. In contrast, the VNC techniques obtain a result that is analogous to that of spectral subtraction. Since the VNC techniques are not simple beamforming, pure tone noises may be easily removed under the VNC techniques.

In an example with complex noises comprising two pink noise bursts, the pre-processing input SNR of a target signal is −17 dB. The beamforming system may reduce the noises only by ~6 dB. Furthermore, the spectral subtraction system also fails to remove the noises since the bursts are in wide bands and the pre-processing SNR is poor. In contrast, the performance of the VNC techniques greatly exceeds that of either beamforming or spectral subtraction.

In an example with complex speech-like noises comprising white noise bursts of varying lengths and random, sometimes very rapid, repetition rate, the pre-processing SNR of a target signal is −18 dB. The beamforming system may reduce the noise only by ~6 dB. The spectral subtraction system fails to remove the noises and instead produce music-like tones because it cannot separate the voice signal from the noise. In sharp contrast, the VNC techniques remove all of the noises despite the speech-like nature, wide bandwidth, and short-duration bursts of the noises.

In this particular example, even when the pre-processing input SNR of the target signal averages −19 dB with "peaks" greater than −27 dB, the beamforming system still only reduces the noises by ~6 dB, while the spectral subtraction system in effect completely fails to separate the noises from the target voice and proceeds to remove both noises and target voice in the output signals. In contrast, the VNC techniques continue the high performance by removing all of the noises despite the speech-like nature, wide bandwidth, short-duration bursts of the noises.

10. PHASE MODIFICATION

Figure 2C:
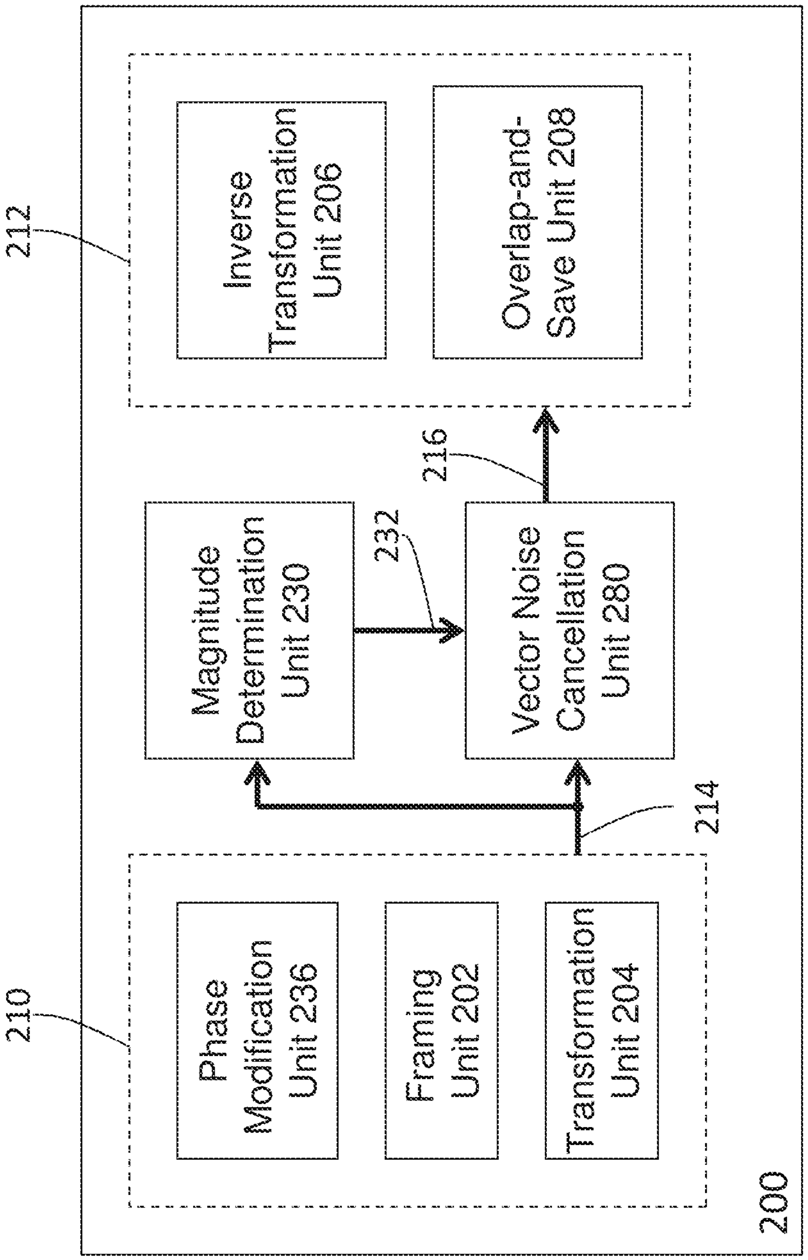
Figure 2D:
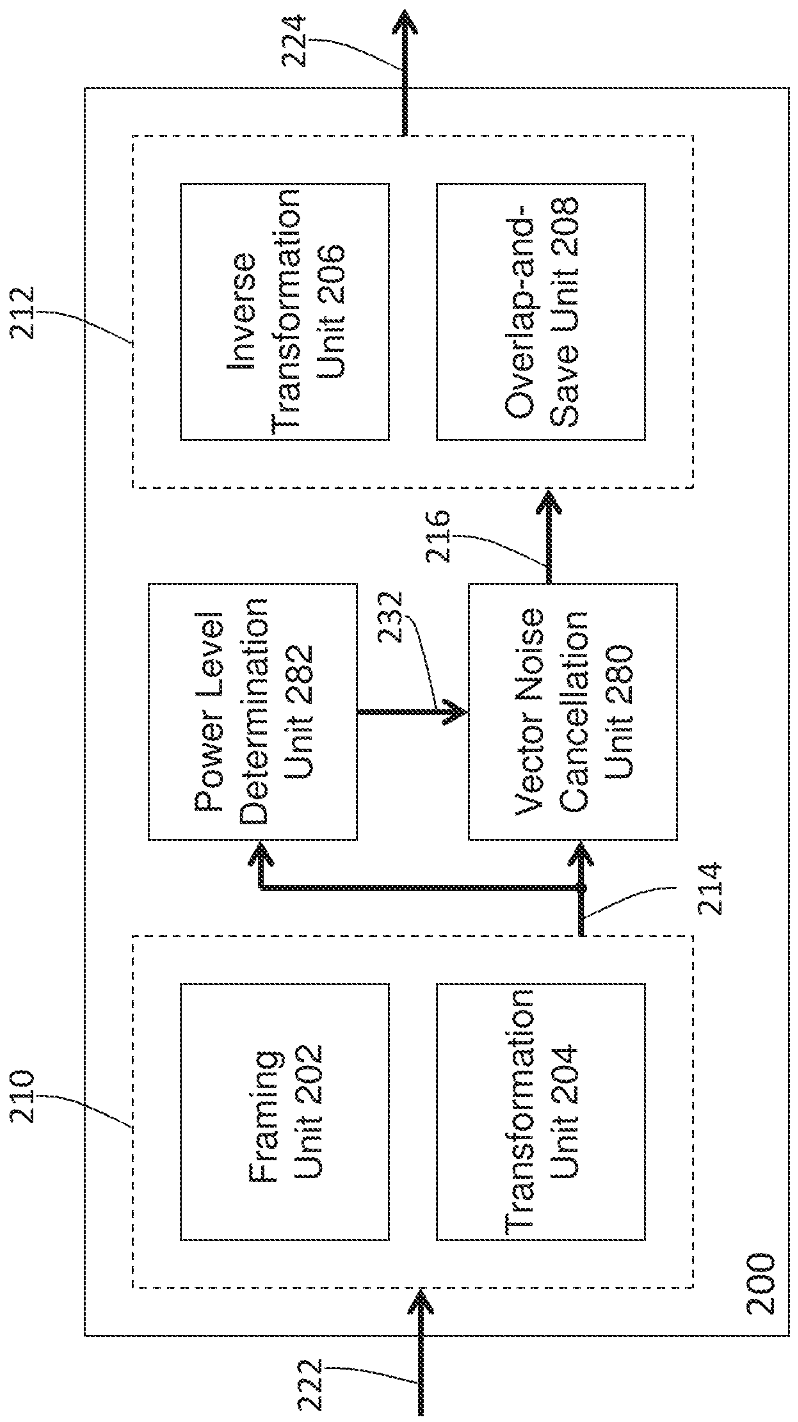
Figure 2E:
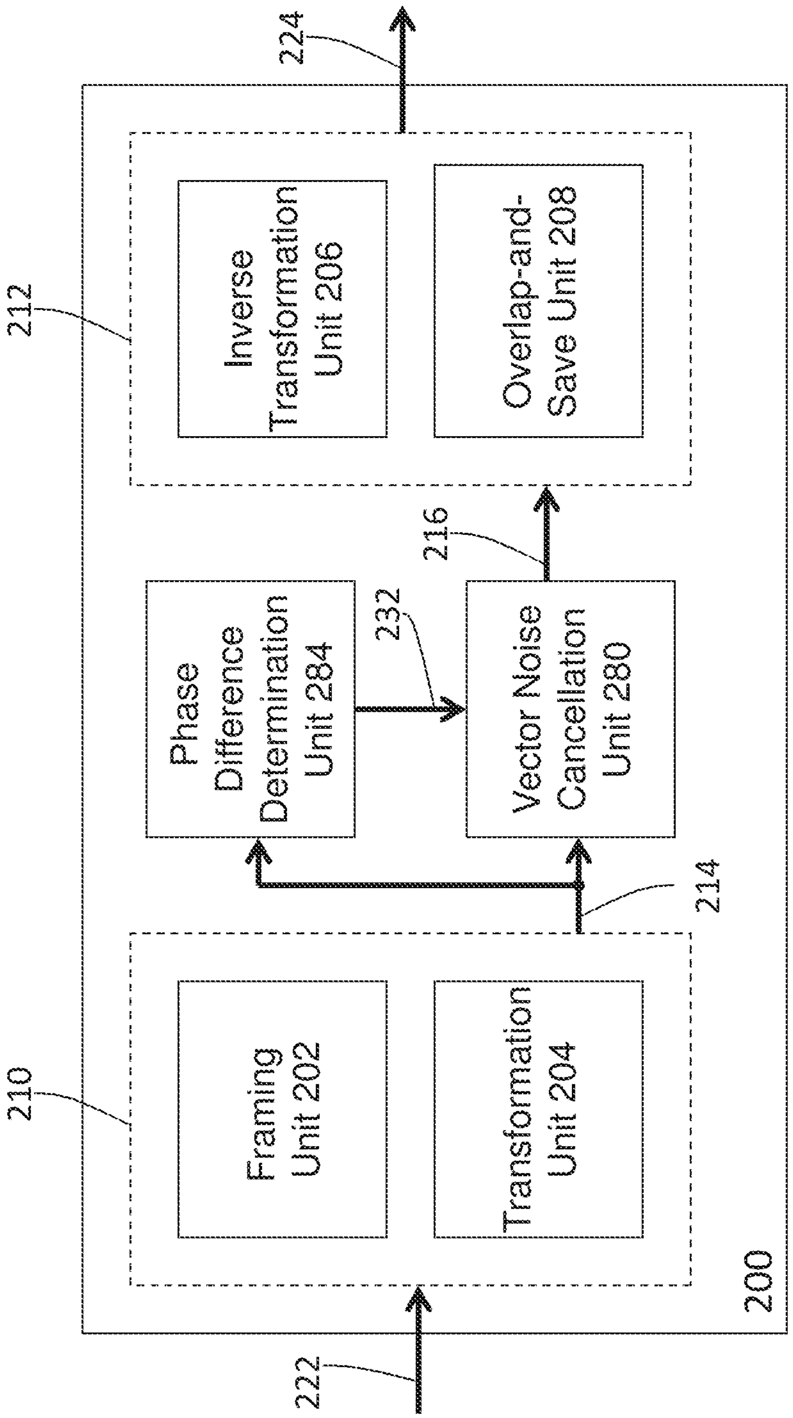

In some possible embodiments, as shown in FIG. 2C, the VNC processor (200) may comprise phase modification unit (236) configured to apply phase modification to signal frames processed by the system. The phase modification unit (236) may be configured to expand input signal phase differences between noises towards +/−180 degrees so that the noises may be less correlated and more readily canceled, especially among those with different, out-of-phase, noise sources. Since the target signal portions in different input signals, including their phases, may be identical or substantively the same or similar, the phases of the target signal portions in different input signals after phase modification may still be in phase, with identical or substantively the same or similar phase angles. In some possible embodiments, the phase modification unit (236) may be configured to constrain phase enhancement or modification such that phase differences between different portions of a target signal are maintained within an acceptable range.

In some possible embodiments, the phase modification unit (236) may be configured to expand the phase angles of input signals from different sensor elements in the same direction. For example, phase angles of input signals may be doubled while magnitudes of the input signals retain original values.

In some possible embodiments, the phase modification unit (236) may be configured to expand the phase angles from different sensor elements in opposite directions. This type of phase expansion may be limited with a configurable threshold such as +/−45 degrees in order to maintain coherence between different portions of a target signal in different input signals.

In some possible embodiments, phase angles in input signals may be a value in a range of one cycle such as from −180° to 180°. In phase modification or enhancement, these phase angles may be changed or unwrapped to be in a different range, for example, from −360° to 360°. In some embodiments, under the VNC techniques, these modified phase angles may be rewrapped to be in a range from −180° to 180°.

In some possible embodiments, phase angles as modified may be used to select a particular combination of input signals with a particular set of values for weighting factors by the techniques as described herein. In some possible embodiments, phase angles as modified may be used to determine attenuation/amplification factors to be applied to intermediate signals by the techniques as described herein.

11. CORRELATED NOISES

In some possible embodiments, noise portions of the input signals may be correlated to one another to small or large extents. For example, noises portions may be generated by the same noise source(s). Two noise vectors N1 and N2 in expression (8), for example, may be instantaneously in-phase and essentially at the same frequency and magnitude. Noises may be made less correlated under VNC techniques by implementing certain signal processing techniques in the system such as processing short time intervals and/or small frequency bin widths. However, there may still exist some noise portions that are highly "correlated", even after a selection of a short time interval and a small frequency bin width. To distinguish correlated noises from a target signal, the VNC system (260) may be configured to maximize the reduction of correlated noises based on overall directionality characteristics of the system. In some possible embodiments, the directionality characteristics of the VNC system (260), or the VNC sensor array (220) therein, or individual sensor elements therein, may be configured or optimized to be sensitive to a spatial direction from which a target signal may arrive, while insensitive to spatial directions from which noises may arrive.

Take acoustic signal processing as an example. In some possible embodiments, the VNC system (260) may beneficially comprise noise-canceling microphones, cardioid microphones, shotgun microphones, etc., as sensor elements where the microphone's acoustic characteristics are created, applying well known acoustic design methods, specifically with VNC processing in mind to maximize performance of the VNC system (260). Such synergistic optimization of the array's acoustic characteristics can be attained, for example, by maximizing signal pickup similarity for the desired target signal and simultaneously minimizing signal pickup similarity for other signals. Additionally and/or optionally, to achieve directionality characteristics that, when the sensor signals are processed by the VNC process (260), favor a target signal at the expenses of noises, the VNC system may comprise components such as delays, phase shifters, adders/ subtractors, attenuators/amplifiers, etc. Additionally and/or alternatively, the VNC system (260) may use broadside arrays, end-fire arrays, adaptive null-steering arrays, etc., which may comprise components as mentioned above to optimize the overall directionality characteristics of the system.

By way of simple example, in a two-microphone VNC array system, one microphone element could be designed to have a frequency compensated cardioid directionality pattern while the second element could have an omni-directional pattern. Thus, for sources along the main axis of the array, i.e. the direction of maximum cardioid sensitivity, both input signals $S_1$ and $S_2$ will have very similar characteristics, while for all off-axis source directions, the input signals will differ, especially in magnitude. Such input signal characteristics are very synergistic with VNC processing allowing for significant noise reduction to be achieved, yet with very closely spaced microphones and very small array size. Additionally and/or alternatively, to optimize the overall directionality characteristics, the VNC system (260) may use parabolic reflector microphones, boundary microphones (e.g., PZM®), etc., which may comprise components such as reflectors, refractors, absorbers, walls/structures, etc.

In some possible embodiments, VNC techniques may take advantage of a multiple sensor configuration to reduce the pickup of naturally occurring or man-made noises, and may be universally used with any type of signal field obeying wave equations. In contrast to many other array noise reduction technologies, such as delay-and-sum and gradient beamforming methods, when a multiple sensor configuration is used, the VNC techniques also do not require tight sensor matching between the signal sensitivities of multiple sensors, and thus may work with various types of sensors including less expensive ones. In other words, VNC is particularly robust against sensor mismatches.

In some possible embodiments, a directionality index (DI) may be used to measure directionality characteristics of systems that use VNC techniques and other non-VNC systems. As used herein, the directionality index refers to a spatial direction dependent measure that characterizes the dB improvement in signal-to-noise ratio (SNR) in a range of spatial directions for a system as compared to that of an omni-directional pickup system.

12. ARRAY TECHNOLOGIES

In some possible embodiments and for comparable noise reduction efficacy, a VNC sensor array system (e.g., 260) as described herein improves in the aspects of array size, frequency response and signal sensitivity, beam pattern (and pattern frequency sensitivity), directionality index, element mismatch sensitivity, etc. relative to other array noise reduction technologies. Comparing the performance of different array noise reduction technologies such as broadside array beamformer systems, endfire array beamformer systems, and VNC sensor array systems (e.g., 260) comprising comparable individual sensor elements, the VNC sensor array systems can substantially improve in the above characteristics. However, while a VNC sensor array (220) may use other array technologies, the VNC sensor array (220) also opens to a wider variety of sensor elements and spatial configurations than other array technologies.

Take acoustic signal processing as an example. In some possible embodiments, the maximum physical dimension for all array technologies for comparison purposes may, for example, be set to 51 mm or less in order to fit a certain application. For the purpose of illustration only, all array technologies may use two first-order microphones in a second-order, free-field array configuration. For comparison, all array technologies may be optimized for best DI by selecting spatial patterns and physical configurations of microphone elements, array delays (and magnitudes), etc. Source distances may be 1 meter.

Figure 6A:
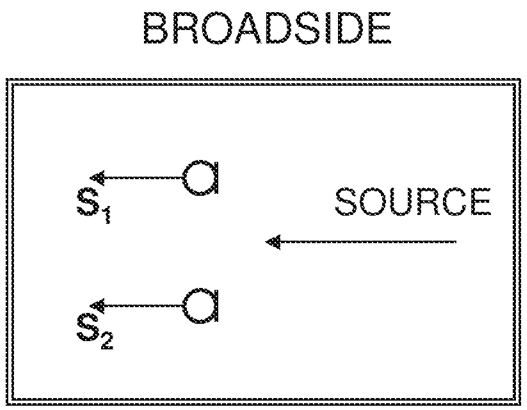
FIG. 6A through FIG. 6C illustrate example signal processing technologies, according to possible embodiments of the present invention.

A broadside array may comprise the two first-order microphones spatially set apart, along a transverse direction to waves arriving from a certain frontal target direction, at a half of the wavelength of a maximum operating frequency, such as 4 kHz. FIG. 6A illustrates an example broadside delay and sum beamforming process using a broadside array of two sensor elements that may generate, for example, two signals $S_1$ and $S_2$. The broadside array may have an element-to-element spacing of 43 mm, at which the array spacing becomes about ½ of the wavelength at a maximum operating frequency of 4 kHz, a relatively high frequency for achieving good operation for telecom applications. For optimizing for a lower frequency, the broadside array may require additional spacing. For example, to move the operating frequency to 2 kHz, the element-to-element spacing in the broadside array may need to be 86 mm, but the 51 mm maximum spacing for the exemplary application would prevent such optimization thereby reducing performance of the broadside array at such lower frequencies.

13. DIRECTIONALITY CHARACTERISTICS—BROADSIDE ARRAY

Figure 7A:
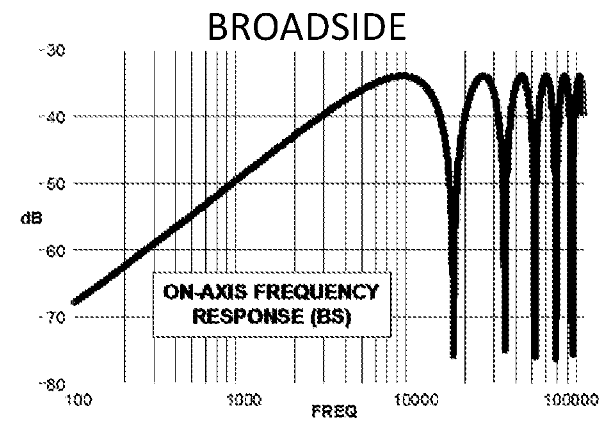
FIG. 7A through FIG. 7C illustrate example frequency responses, according to possible embodiments of the present invention.

FIG. 7A illustrates frequency responses and sensitivities to correlated signals for an example broadside delay and sum beamforming process of FIG. 6A. The frequency response rises at 6 dB/octave, when uncompensated first-order gradient sensor elements are used in the broadside delay and sum beamforming process.

Figure 8A:
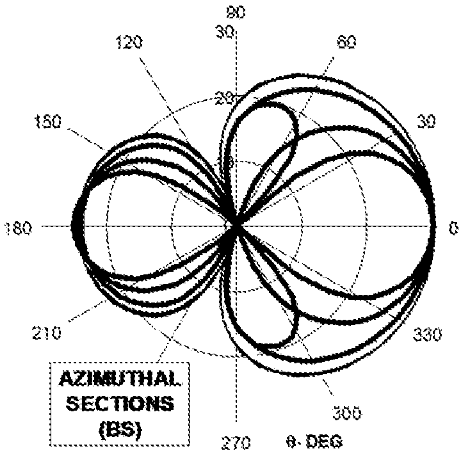
FIG. 8A through FIG. 8C illustrate example beam patterns, according to possible embodiments of the present invention.

FIG. 8A illustrates a beam pattern of an example broadside delay and sum beamforming process of FIG. 6A in connection with correlated signals. The broadside array produces a beam pattern with relatively significant frequency dispersion, i.e. the beam pattern of FIG. 8A varies significantly with respect to frequency. The broadside array exhibits a relatively ineffective, wide front lobe over most of the telecom frequency range and significant changes in beam pattern as a function of frequency. As expected, the beam pattern at 4 kHz, i.e. at the example maximum operating frequency, is optimized as expected, but such good performance is restricted to a very narrow band of frequencies around the optimization frequency of 4 kHz. At the example optimization frequency of 4 kHz, the broadside array system exhibits a "kidney bean" shaped front lobe. However, at frequencies lower than the optimization frequency, the front lobe becomes laterally wider than that of the front lobe at the optimization frequency, with comparable vertical dimensions and with comparable axial symmetry. An undesirably large back lobe of sensitivity is also formed for the broadside array at most frequencies in the operating frequency range.

Figure 9A:
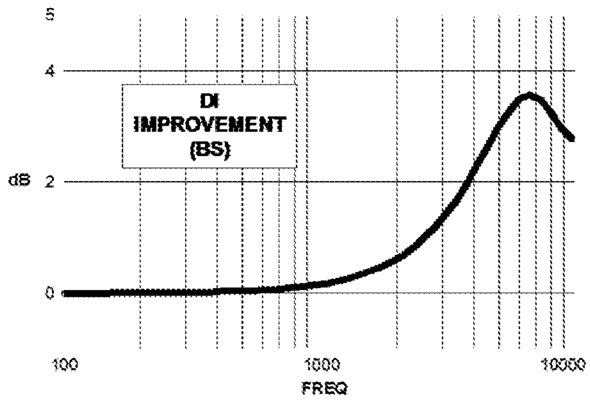
FIG. 9A through FIG. 9C illustrate example directionality improvements, according to possible embodiments of the present invention.

FIG. 9A illustrates directionality indexes of an example broadside delay and sum beamforming process of FIG. 6A as a function of frequency in connection with correlated signals. Delay and sum beamforming is sensitive to sensor mismatch, rapidly decreasing in performance when the array element sensitivities and/or phases are not matched. The broadside array has little SNR improvement within the telecom audio bandwidth, even when the microphones' sensitivities are matched. For example, most of the improvement is limited to a narrow band above the telecom range; the maximum improvement of only 3.5 dB occurs at 6.7 kHz, well above the maximum telecom frequency of 3.5 kHz. Of course this frequency of greatest improvement could be moved to a lower frequency within the range of telecom operation, but to do so would require that the microphone elements be spaced apart by an amount well in excess of the spacing limitation of 51 mm for this example application.

Figure 10A:
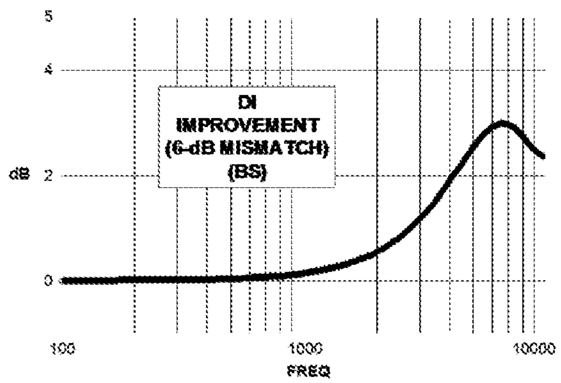
FIG. 10A through FIG. 10C illustrate example directionality improvement when sensor sensitivities are mismatched among sensor elements, according to possible embodiments of the present invention.

FIG. 10A illustrates mismatch sensitivities of an example broadside delay and sum beamforming process of FIG. 6A as a function of frequency in connection with correlated signals. The broadside array has relatively poor SNR improvement even when the microphone elements' sensitivities are perfectly matched (as illustrated in FIG. 9A). When the two microphones' sensitivities are mismatched by 6 dB, which is possible for standard off-the-shelf microphone elements (or sensor elements), the peak improvement at 6.7 kHz drops to 3 dB, less than half that of the matched-element broadside array.

14. DIRECTIONALITY CHARACTERISTICS—ENDFIRE ARRAY

Figure 6B:
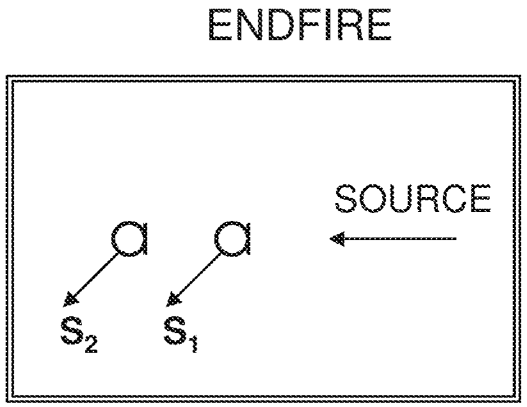

An endfire array delay and sum beamforming system may comprise the two first-order microphones spatially set apart, along a longitudinal direction to waves arriving from a certain frontal target direction, at a rational or irrational fraction of the wavelength of an operating frequency, such as 1000 Hz. FIG. 6B illustrates an example endfire delay and sum beamforming process using an endfire array of two sensor elements that may generate, for example, two signals $S_1$ and $S_2$. The endfire array may have an element-to-element spacing of 20 mm. As the elements are moved closer, signal sensitivity of the endfire array decreases. Thus, a balance must be struck between small size and good sensitivity.

Figure 7B:
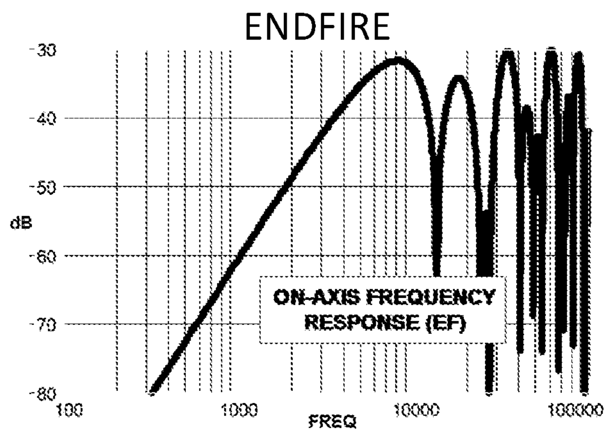

FIG. 7B illustrates frequency responses and sensitivities to correlated signals for an example endfire delay and sum beamforming process of FIG. 6B. The frequency response rises at a steep 12 dB/octave, due to the second-order differencing in this type of array technology. Therefore, signal sensitivity within a telecom audio bandwidth is significantly lower than in the other systems. The combination of low sensitivity and steep frequency slope makes the endfire array potentially noisy because of the need for additional gain, especially at low frequencies, and steep frequency compensation. In addition, the low signal sensitivity can adversely impact signal to noise ratio of the output signal.

Figure 8B:
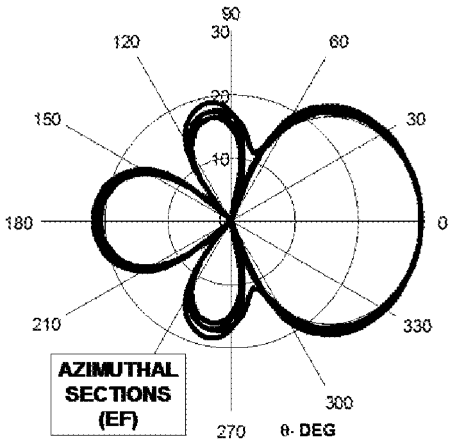

FIG. 8B illustrates a beam pattern of an example endfire process of FIG. 6B in connection with correlated signals. In comparison with the beam pattern of the broadside array as illustrated in FIG. 8A, the 2nd-order endfire array produces a nice beam pattern with medium sized front lobe and little frequency dispersion as can be seen in FIG. 8B. The endfire array inherently produces an axially symmetric beam, but with relatively narrow front and back lobes. However, a circular side lobe also develops which lowers the directionality index.

Figure 9B:
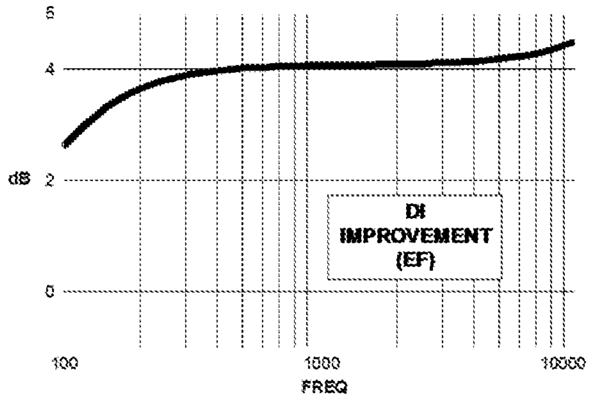

FIG. 9B illustrates directionality indexes of an example endfire process of FIG. 6B as a function of frequency in connection with correlated signals. As expected from the frequency independent beam pattern, the endfire array shows nearly constant improvement over most of the audio bandwidth—about 4.1 dB of SNR.

Figure 10B:
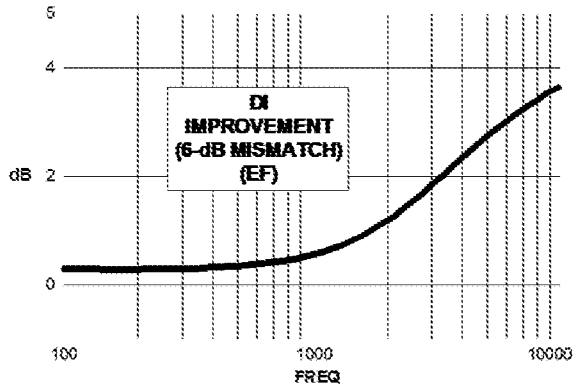

FIG. 10B illustrates mismatch sensitivities (which may be of a 6 dB range) of an example endfire delay and sum beamforming process of FIG. 6B as a function of frequency in connection with correlated signals. Because of the endfire array's 2nd-order differencing, sensitivity to mismatch is very high. The array's SNR improvement nearly disappears when the elements are mismatched.

Thus it should be appreciated that classical delay and sum broadside and endfire beamforming array processes have various benefits and drawbacks of size, directionality index, beam pattern, frequency response, sensitivity, inherent noise, mismatch sensitivity and frequency coloration, but that no such system can achieve all the benefits simultaneously.

15. DIRECTIONALITY CHARACTERISTICS—VNC SENSOR ARRAY

In some embodiments, a VNC sensor array (e.g., 220) as described herein may operate with at least two microphones or sensors that exhibit different directionality characteristics. As used herein, different directionality characteristics may refer to dissimilar beam patterns in sensitivity-against-spatial-angle graphs of microphones. In some possible embodiments, none, one, or two or more of the microphones may be omni-directional. In some possible embodiments, none, one, or two or more of the microphones may be directional. The microphones in the VNC sensor array (220) may be placed in any distance apart, including rational or non-rational fraction of a wavelength, zero distance, etc. Because of this flexibility, very good performance can be achieved in a smaller package than that required for the broadside or endfire array systems.

In some possible embodiments, the directionality characteristics of two microphones may be intrinsically similar. For example, two microphones, even though having different sensitivities, may be omni-directional. Thus, both beam pattern graphs of directionality indexes of the two microphones may be represented as similar circles. In some embodiments, the two microphones may have different configurations of physical barriers or virtual barriers. As a result of the different configuration of the barriers, the microphones, even though intrinsically similar, are operationally dissimilar in receiving sound or signal fields around the microphones. For example, if two similar sensitivity omni-directional microphones are flush mounted on opposite sides of a large flat vertical board, for example, a square piece of plywood 10' on a side, then each microphone will have an approximately hemispherical sensitivity pattern. However, one pattern will face to the left of the board, while the other will face to the right of the board. Only in the directions toward the edge of the board will the sensitivities match. Such an array is particularly effective when used with VNC processing.

In some possible embodiments in which two microphones may be first-order directional with possibly different sensitivities, the uni-directional patterns for the two microphones may be arranged to point to different spatial directions. As a result of the different directions, the microphones, whether or not intrinsically similar, are operationally dissimilar in perceiving sound or signal fields around the microphones. For example, if two similar cardioid pattern microphones are arranged into an array where the major axes of the microphones are separated by 90° in azimuth, one 45° to the left and the other 45° to the right of a direction toward a desired target signal source, then only at the azimuthal angle toward the target source will the array produce matched, or correlated, input signals $S_1$ and $S_2$. For all other arrival angles, the input signals will have lower correlation. If these input signals are used with VNC processing, then the target signal will be passed to the output unaffected, while the other signals, generally noise, arriving from "off-axis" will be attenuated resulting in noise reduction.

In some possible embodiments, microphones may be those of a different order with different lobes of sensitivity, including boundary microphones (for example, pressure zone microphones or PZM). In some possible embodiments, different types of microphones may be used in a same VNC sensor array (e.g., 220) as described herein. In some possible embodiments, microphones in a same VNC sensor array (e.g., 220) as described herein may be of different sensitivities. The differences in sensitivities of the microphones may be less than, about, or more than, 6 dB from one another, with very little loss of performance.

Figure 6C:
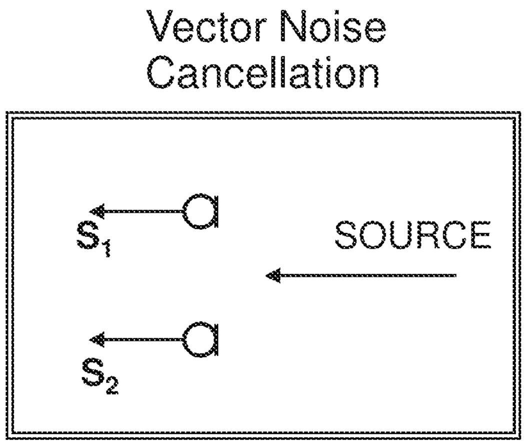

FIG. 6C illustrates an example configuration of the VNC sensor array (220) comprising of two sensor elements that may generate, for example, two signals $S_1$ and $S_2$. The VNC sensor array (220) may achieve optimum performance with a very small size—essentially the size of a single element.

Figure 7C:
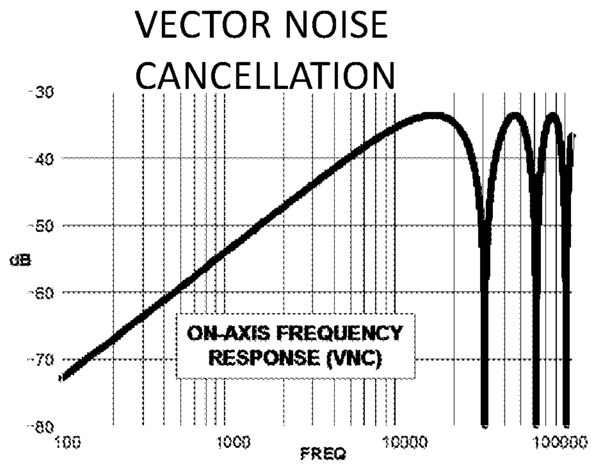

FIG. 7C illustrates frequency responses and sensitivities to correlated noise signals for the VNC sensor array (220) of FIG. 6C. The VNC sensor array (220) has a relatively wide bandwidth because the microphone elements in the VNC sensor array (220) need no spacing to form an optimum array beam pattern.

Figure 8C:
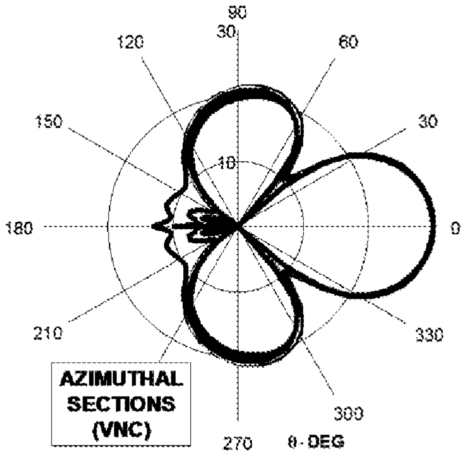

FIG. 8C illustrates a beam pattern of the VNC sensor array (220) of FIG. 6C in connection with correlated noise signals. The VNC sensor array (220) has a distinct pattern and shows the most complex effective beam pattern. The beam pattern has a front lobe that is "wedge" shaped and beneficially quite narrow, with vertically limited side lobes (as opposed to the circular side lobe of the end-fire array system) yet almost no back lobe. The VNC sensor array (220) exhibits the best performance of the array systems described herein, having a tight front lobe with no frequency dispersion and with almost no back sensitivity.

Figure 9C:
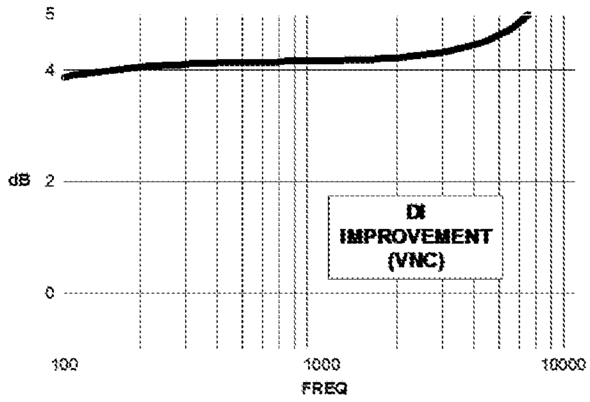

FIG. 9C illustrates directionality indexes of the VNC sensor array (220) of FIG. 6C as a function of frequency in connection with correlated signals. The VNC sensor array (220) exhibits the best performance of the array systems described herein, with a nearly flat 4.2 dB improvement in SNR. Unlike the endfire array, there is no low frequency drop off due to the low sensitivity of the VNC sensor array (220) to wavelength dependent phase effects.

Figure 10C:
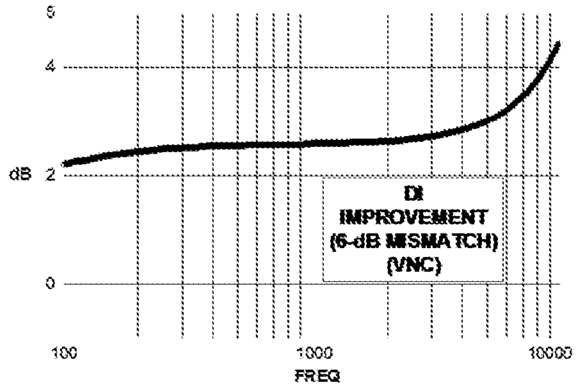

FIG. 10C illustrates mismatch sensitivities of the VNC sensor array (220) of FIG. 6C as a function of frequency in connection with correlated signals. As illustrated, with an example 6 dB mismatch in sensor sensitivity, the VNC sensor array (220) exhibits the best performance of the array systems described herein. Although there is a reduction of the SNR gain, the VNC sensor array (220) maintains over half of its SNR improvement over the entire telecom frequency range even with highly mismatched elements, because the VNC sensor array (220) does not depend upon signal phase or gradient subtraction methods.

In comparison with broadside and endfire array systems, a VNC system has a broader bandwidth and higher DI (i.e. noise reduction), beam patterns that are constant over frequency, with near immunity to element mismatch and with a minimum possible physical size.

16. NULL-STEERED ARRAY

Another comparable array system is the null-steered array. A VNC sensor array compares favorably with not only the broadside and endfire arrays, but also a null-steered array. A null-steered array attempts to adaptively aim the nulls of its beam pattern toward noise sources while keeping constant its sensitivity toward the source of a target signal. However, the practical implementation of null-steered arrays suffers from drawbacks such as long and perceptible adaptation time, difficulties in nulling out moving noise sources, numeric limitation of the number of nulls (N−1, where N is the number of elements in the array), problems in treating reverberations as additional noise sources, creation of unwanted high sensitivity off axis beam lobes, etc.

In comparison with a null-steered array system, a VNC system based on a VNC sensor array (e.g., 220) creates, for each frequency bin and frame, an individual set of intermediate weighted signals, each representing a different beam pattern, and selects the one of the different beams containing the least noise signal portion for each different frequency bin. A common property of these beam patterns is that they all have the same sensitivity and phase response for a target signal that arrives from the direction of the target signal's source. The VNC system selects the beam patterns that optimally aim low sensitivity portions of the beam patterns toward the centroid locations of maximal noises, and thereby adaptively steers the beam patterns away from the most intense noises. Furthermore, comparatively speaking, the VNC system is simple (for example, does not require the creation of N nulls for N noise sources), is capable of nearly instant adaptation to signal field conditions, is capable of tracking moving noise sources in real-time and handling reverberations without additional complexity, avoids creating high sensitivity off-axis beam lobes, etc.

17. BOUNDARY MICROPHONES

The benefits of a VNC system for correlated noises as described herein may be achieved in free-field array conditions. In some possible embodiments, a VNC sensor array (e.g., 220) may be configured to have boundary microphones as microphone elements (sensor elements). In some embodiments, the boundary microphones in the VNC sensor arrays may comprise those with high sensitivity, flat frequency response, excellent SNR and directional insensitivity.

In some possible embodiments, a VNC sensor array (e.g., 220) that comprises boundary microphones improves in the aspects of frequency response and signal sensitivity, beam pattern (and pattern frequency sensitivity), directionality index, element mismatch sensitivity, etc. relative to other array technologies. Different noise cancellation technologies using a boundary microphone based array, including a vector noise cancellation system comprising a VNC processor (e.g., 200) and a VNC sensor array (e.g., 220), may be compared relative to the aspects discussed above. Take acoustic signal processing as an example.

Figure 11:
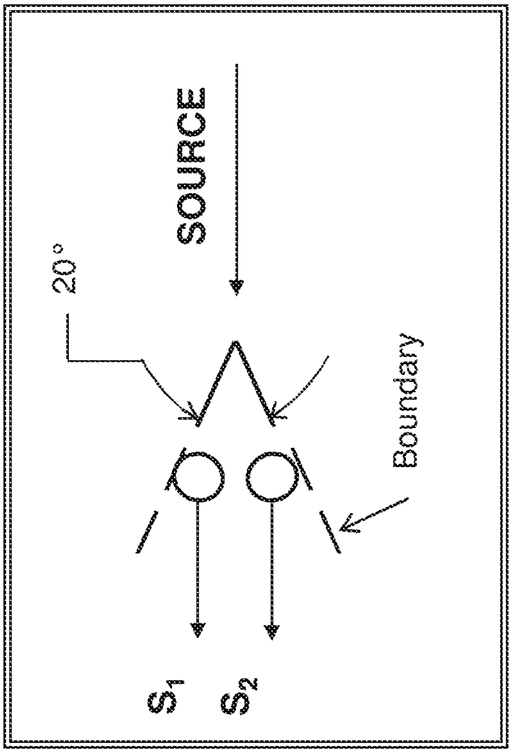
FIG. 11 illustrates an example boundary sensor element configuration, according to possible embodiments of the present invention.

FIG. 11 illustrates an example boundary microphone array that may be used by different types of noise cancellation technologies including a VNC system as described herein. In some possible embodiments, the boundary microphone array may comprise two 0th-order boundary microphones in a first-order, array configuration. Boundary diffraction effects may or may not be modeled in comparison. The boundary microphone array may be optimized for best DI by modifying boundary orientation to signal sources. Source distances may be 1 meter.

18. 3-DIMENSIONAL BEAM PATTERNS

Figure 12A:
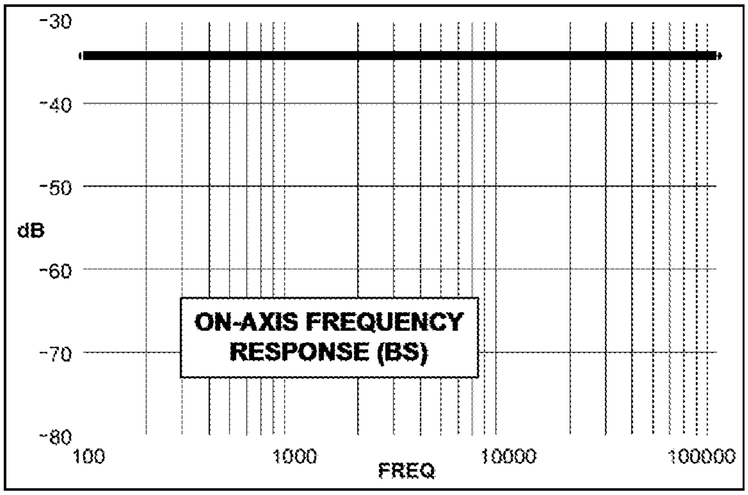
FIG. 12A and FIG. 12B illustrate example frequency responses and sensitivities to correlated signals using a boundary sensor element configuration, according to possible embodiments of the present invention.
Figure 12B:
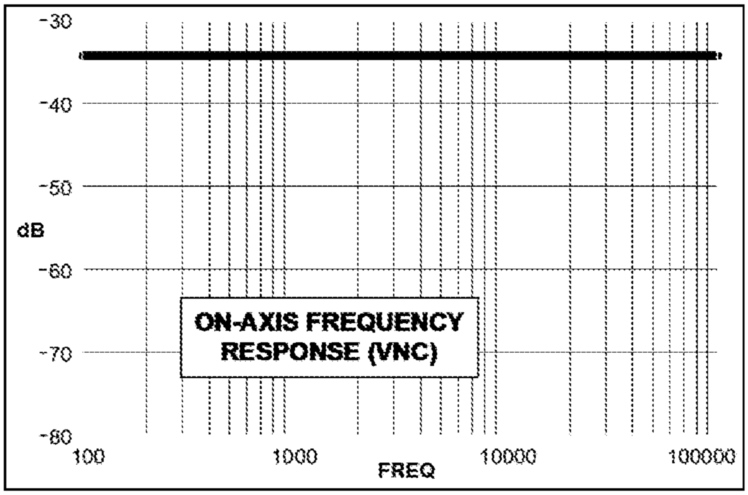

FIG. 12A and FIG. 12B illustrate frequency responses and sensitivities to correlated signals for broadside beamforming processing and VNC processing, respectively, of signals $S_1$ and $S_2$ of FIG. 11. The frequency responses of both systems are identical to the frequency response of their individual microphone elements. In this case, because the 0-th-order boundary microphone has a flat frequency response, the responses of both systems are also flat. Thus, there is no need for response compensation and no associated degradation in SNR. Sensitivity is very high across the entire frequency band.

Figure 13A:
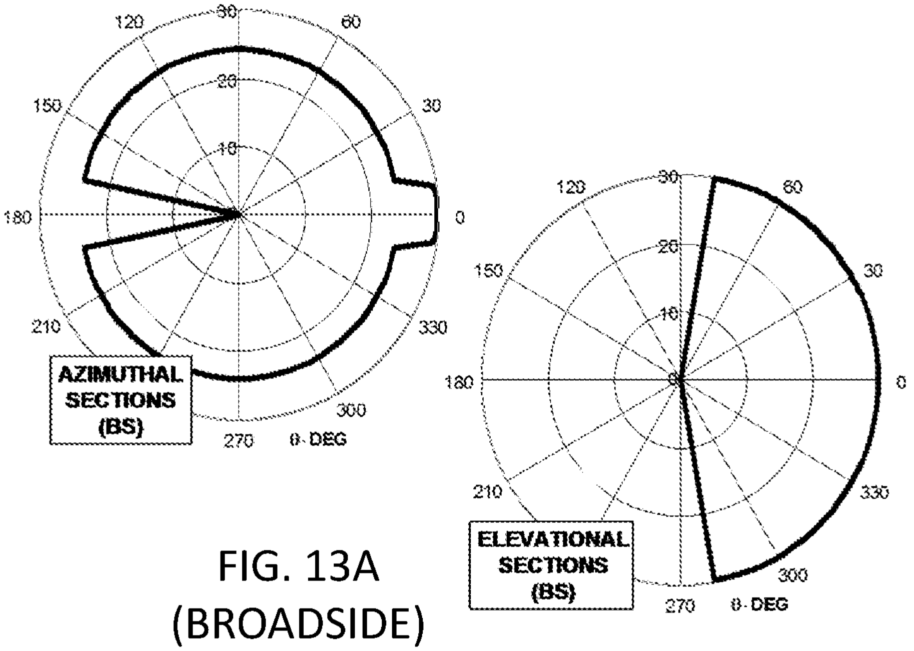
FIG. 13A and FIG. 13B illustrate example beam patterns in connection with correlated signals using a boundary sensor element configuration, according to possible embodiments of the present invention.
Figure 13B:
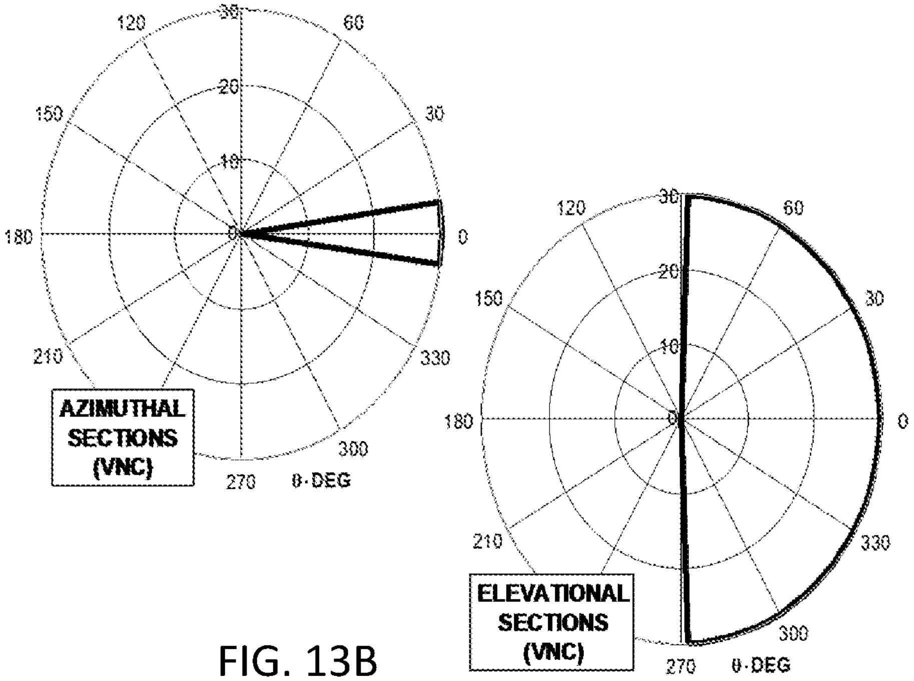

FIG. 13A and FIG. 13B (ignoring diffraction effects) illustrate beam patterns in connection with correlated noises for a broadside beamforming system and a VNC system, respectively. Both azimuthal and elevational sections are shown in the figures. Although the elevational sections are very similar for both systems using this array, the azimuthal sections of the two systems are very different. The broadside beamforming system exhibits a poor beam pattern that is nearly omni-directional except for an azimuthally narrow, but slightly increased sensitivity (+6 dB) front lobe. In comparison, the VNC system shows a very narrow and highly directional front lobe with excellent signal suppression at all other azimuthal angles. With the tight front lobe, no frequency dispersion and no back sensitivity, the performance of the VNC system is very high.

In terms of 3-D beam patterns, the broadside beamforming system has an almost omni-directional beam pattern. Superimposed on that pattern are a small front lobe and a wedge-shaped rearward null. Although the null is beneficial, it is too narrow to be practically useful. In comparison, the VNC system has a very different beam pattern shaped like a "lemon wedge". The VNC system shows the simplest effective beam pattern with only a very narrow front lobe and no other structure. Notably, there is no back or side lobe sensitivity in the beam pattern of the VNC system meaning that from most directions, noise signals are greatly reduced.

Figure 14A:
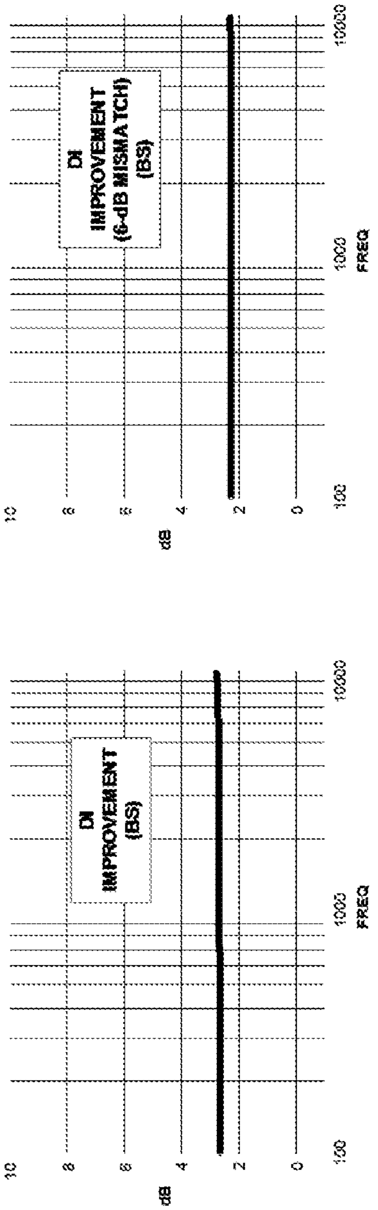
FIG. 14A and FIG. 14B illustrate directionality indexes and mismatch sensitivities in connection with correlated signals using a boundary sensor element configuration, according to possible embodiments of the present invention.
Figure 14B:
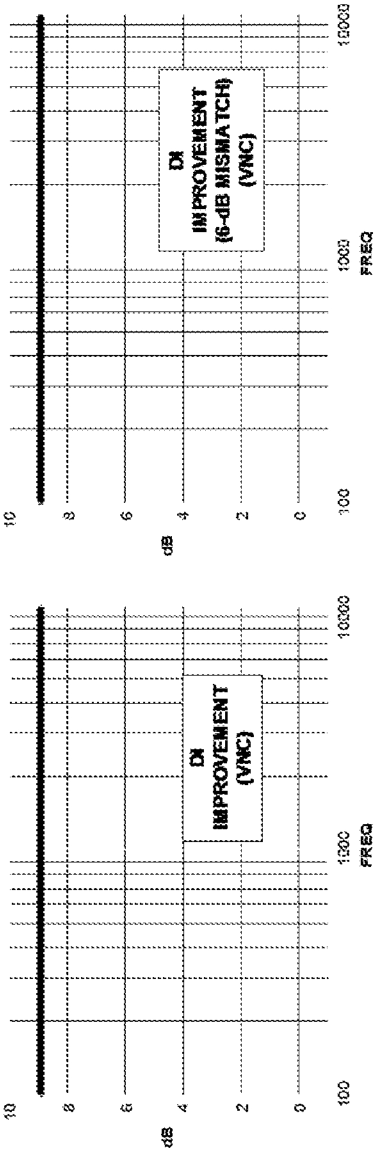

FIG. 14A and FIG. 14B illustrate directionality indexes and mismatch sensitivities in connection with correlated signals for a broadside beamforming system and a VNC system, respectively. As compares with a broadside beam system that uses first-order microphone elements discussed earlier, this broadside beamforming system using boundary microphones performs slightly better, but still creates little SNR improvement within the telecom audio bandwidth. Furthermore, a 6 dB sensitivity mismatch between microphone elements still degrades performance slightly. In comparison, the VNC system exhibits the best performance of all the systems discussed so far, with a nearly flat 9 dB improvement in directionality SNR. Unlike the results with the free-field array, a 6 dB element mismatch creates no degradation in performance, because the mismatch produces little change in the beam pattern's shape for the VNC system that employs boundary microphones.

A VNC system operates on input signals in a different manner than do phased array beamforming systems. Boundary microphone systems are particularly synergistic with VNC techniques and can form a signal pickup system with superior results in all performance categories. In some possible embodiments in which a signal field is a sound field, each microphone in a VNC sensor array (e.g., 220) receives free-field sound energy according to similar azimuthal directionality and head-diffraction constraints as does a human ear. This is because the human hearing system is essentially a dual sensor boundary array system where the surface of the head forms the boundary.

Figure 15B:
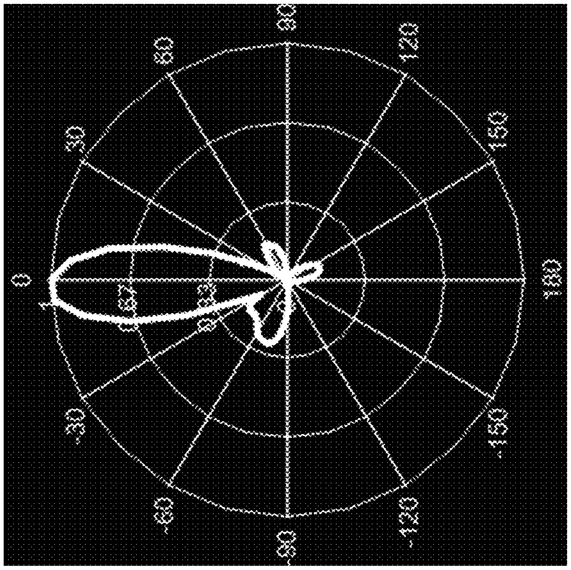
FIG. 15A and FIG. 15B illustrate example reduction of sensitivity to noises, according to possible embodiments of the present invention.
Figure 15A:
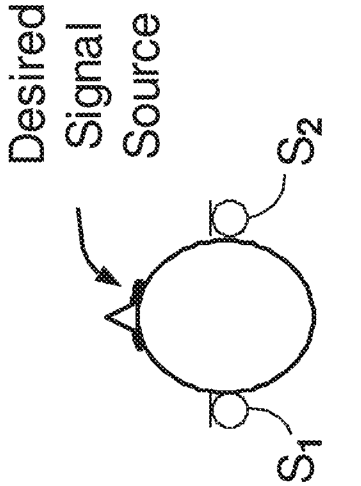

When mounted above the ear as shown in FIG. 15A, each microphone (e.g., one of a pair of hyper-cardioid microphones) equally receives the target signal, for example, a user's own speech, while unequally receiving (environmental) noises. A VNC system uses this spatial directional difference between the target signal and noises to produce a reduction in sensitivity to the off-axis noises thereby creating an effective beam pattern with a very narrow front lobe and virtually no back lobe, although the individual hyper-cardioid microphone elements themselves have substantial front lobe width and back-lobe sensitivity. The measured in-situ effective 1 kHz intensity-sensitivity beam pattern for a VNC system using the two-microphone array of FIG. 15A is shown in FIG. 15B. Note that the user's head effectively forms a boundary such that the measured azimuthal sensitivity pattern of FIG. 15B approximates the predicted azimuthal section sensitivity pattern of FIG. 13B, understanding that the measured pattern of FIG. 15B includes all real world diffraction effects ignored in FIG. 13 B.

19. EXAMPLE VNC APPLICATIONS

In some possible embodiments, a VNC system as described herein may be used in an automobile cabin environment. In such an extremely adverse condition with intense wind noises, road noises, traffic noises, engine noises, passenger "noises", entertainment system sounds and fan noises, the VNC system may be configured to track a target (for example, a speech) signal and maintain integrity of the speech signal in the VNC processed output signals, even though much of the input waveform may be badly clipped due to the intense wind noise and voice peaks.

In some possible embodiments, a VNC system as described herein may be used in an extreme noise environment with in-band (voice) noise such as in a video arcade. In such a very high noise conditions (>90 dB) with raised player voices, game sounds, highly reverberant space, loud pop music and machine noises, the VNC system may be configured to track a target (for example, a speech) signal and maintain integrity of the speech signal in VNC processed output signals. In this environment, noises are highly complex and contain significant in-band sounds, including other voices. With the microphone array of FIG. 15A, the VNC system makes nearly a 6 dB improvement in SNR and increases the SNR above zero, thereby allowing additional follow-on (e.g. single- or multi-channel) noise reduction techniques to be effective. Thus, this 6 dB improvement in SNR may increase a negative SNR to greater than zero, and may enable the use of additional noise reduction processes, that would otherwise be ineffective.

Figure 16:
FIG. 16 illustrates example sensor element configurations for rejecting noises in both vertical and lateral directions, according to possible embodiments of the present invention.

A VNC system may be used as an alternative or, addition, to other noise cancellation systems such as a beamformer system. For example, a set of beamformer systems can provide synergistic directional pickup signals that feed into a VNC system. Alternatively, one or more VNC systems can be used ahead of one or more beamformer systems to provide the beamformer systems with relatively quiet input signals. Multiple VNC processes may be performed on multiple arrays. The output of these VNC processes may be combined in multiple stages using either beamforming processes, or additional stages of VNC processing. Similarly, beamforming processes may be performed on multiple arrays, and the outputs of those processes may be used to provide the "input" signals for stages of the VNC process. As previously noted, a VNC system also works synergistically with single-channel noise reduction techniques to enhance the latter performance. Additionally and/or alternatively, VNC systems can easily be extended to two-dimensional operations, providing both lateral and vertical spatial noise rejection, as illustrated in FIG. 16.

In some possible embodiments, VNC systems may use signal phases and digital (or analog) delays to track or follow dynamically and adaptively the source of a target signal as it moves relative to the sensor array. The VNC systems may be used with a PC-monitor mounted microphone sensor array, auto cabin microphone sensor array, etc.

In various embodiments, one or more VNC systems may be configured to work in telecommunications, command and control systems, factory floors, automotive, computer systems, speech recognition, entertainment systems, toys, speaker identification, home appliances, active sound control systems, etc.

In some possible embodiments, VNC techniques as described herein may be used in mobile devices (e.g., headsets) that are subject to wind noise. Wind noise is typically significantly independent in spaced apart sensors and as such may be very successfully removed by a VNC process.

20. ENHANCEMENTS INCLUDING VIRTUAL BARRIERS

In some possible embodiments, VNC systems may use "crossed" or "splayed" uni-directional sensor elements or systems for noise reduced signal pickup.

Figure 17A:
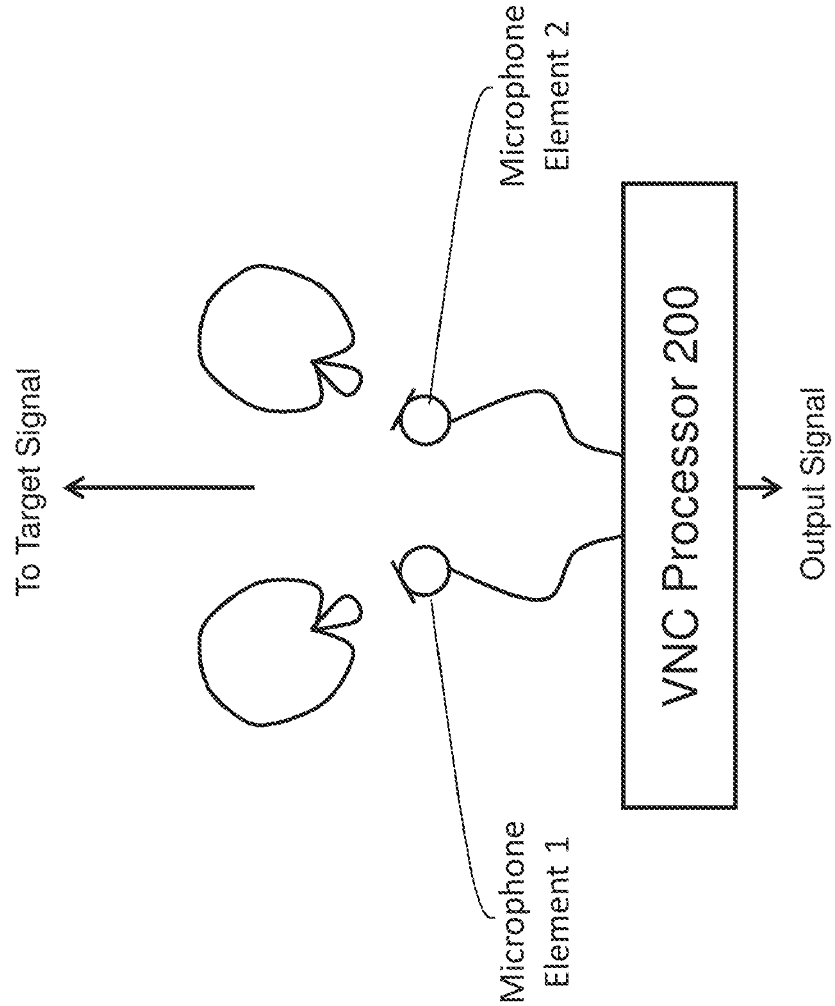
FIG. 17A through FIG. 17E illustrate additional example system configurations under vector noise cancellation techniques, according to possible embodiments of the present invention.

In some embodiments, VNC techniques as described herein may be used with directionality and/or beam patterns of a sensor array to build virtual barriers. For example, a VNC processor (e.g., 200) may be configured to be operatively linked to a sensor array with two microphone elements (1 and 2) as illustrated in FIG. 17A. The two microphone elements may have cardioid shaped directionality patterns that are each oriented to a different spatial direction. Taking advantage of the resulting different sensitivities of the microphone elements to off-axis source signals due to their different orientations, the process of the VNC processor (200) may be configured to reject these off-axis noises. For example, since any off-axis noises take spatially distinct paths to the individual microphone elements, the intensity of the noises at one microphone element may be measurably different from that at the other microphone. This difference in intensities of the noises to different microphone elements may be further amplified and exploited to reject signal portions with large differences of intensities as sensed by the different microphone elements. This "virtual barrier" approach of rejecting noises based on the differences in the intensities of the noises as sensed by the microphone elements has noise reduction characteristics that are the same as, or similar to, an approach of rejecting noises by erecting a physical barrier between the microphone elements. Similarly, it is likely that the phases of the input signals as sensed by the different microphone elements are dissimilar, and VNC will also exploit that difference to distinguish, and reduce, noise signals arriving from directions other than the target direction.

For example, individual directional microphones of a sensor array have individual axes. A sensor array with VNC processing may exhibit directional properties that are a combination of those of the individual directional microphones. A virtual barrier may be implemented under the VNC techniques such that two (or more) directional microphones may be configured to have the same sensitivity to the desired source, but different sensitivities to other sources in other directions. This difference in sensitivity in other directions results from the microphones' sensitivity patterns and positioning, not necessarily from the placement of a physical barrier. As a result, the effects of the virtual barrier under the VNC techniques may be the same as the preceding descriptions of signals with a physical barrier between the microphones. For example, the desired (or target) signal produces similar desired input signal portions in magnitude and phase from each microphone, while noises produce different signal portions in the input signals from the two or more microphones. A VNC process as described herein may use this information to minimize noise in the same way as with a physical barrier.

Figure 17B:
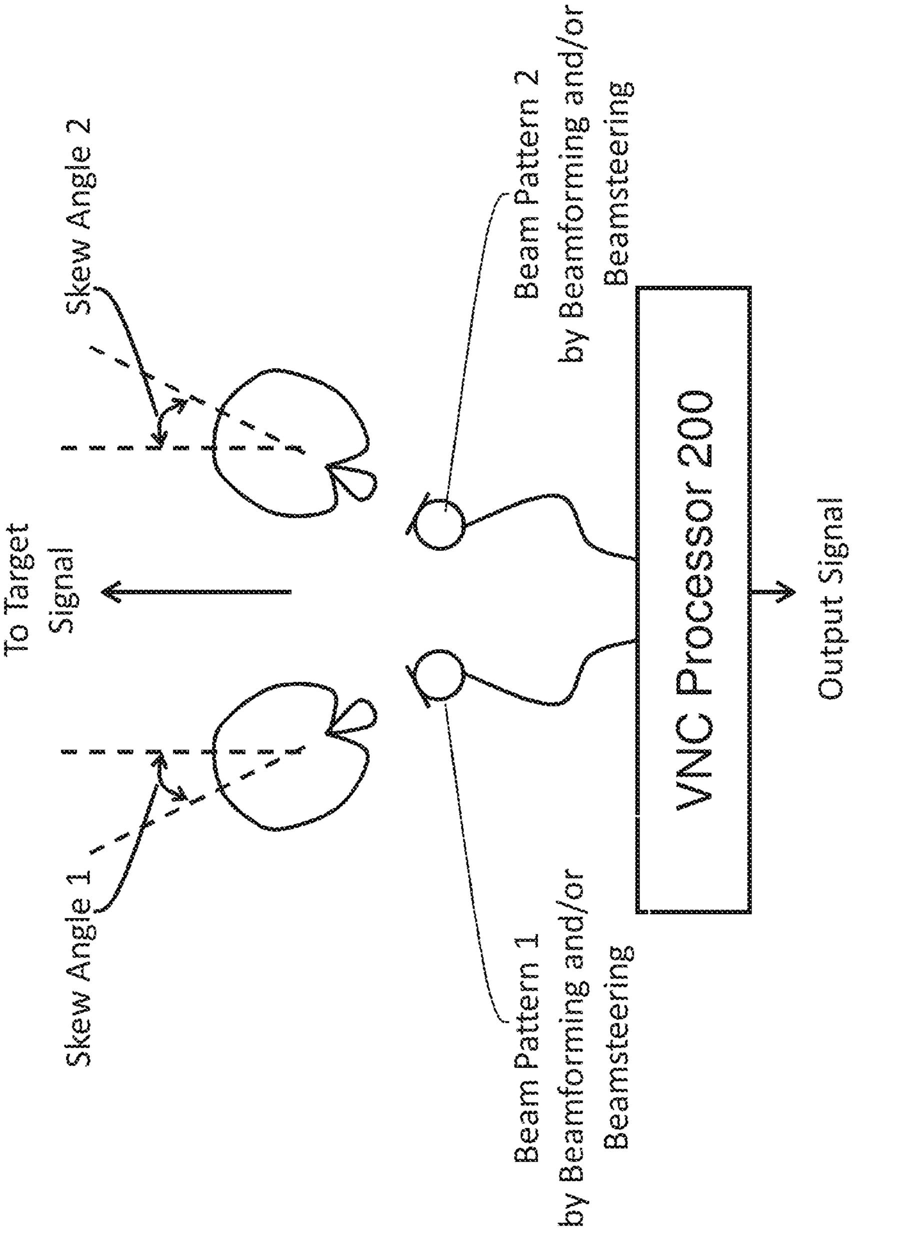

In some embodiments, the crossed or splayed directionality patterns used in the virtual barrier configuration as illustrated in FIG. 17A may be created by the directionality characteristics of microphone elements. In some embodiments, beamforming and/or beamsteering methods may be used to create these two discrete uni-directional beam patterns (1 and 2) in a virtual barrier configuration, as illustrated in FIG. 17B. The directionality pattern as created by the microphone elements in FIG. 17A may be emulated by the uni-directional beam patterns with two different skew angles (1 and 2) produced by a suitable beamforming and/or beamsteering system in FIG. 17B.

Figure 17C:
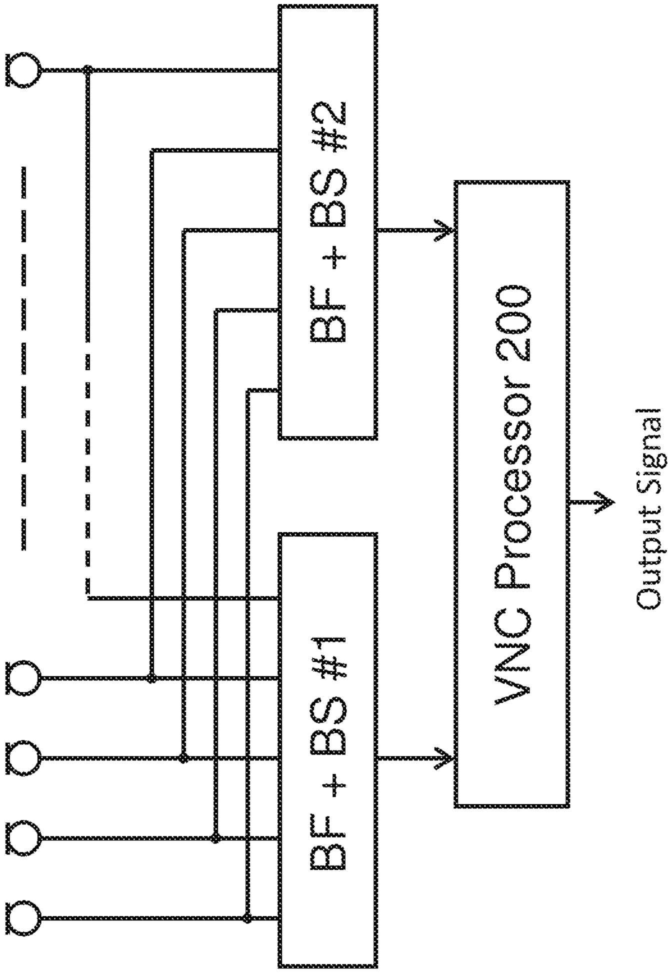

In some embodiments, as illustrated in FIG. 17C, an array of N sensors (sensors for the particular energy of interest as in the case of microphone for sound energy) may be operatively connected with two or more beamforming/beamsteering systems. Each beamforming/beamsteering system forms a beam of sensitivity at an angle away from the main axis, which is taken to be towards the target signal direction. The two beams may be optimized for the VNC performance by adjustment of the skew angles and pattern shapes of the beams. In some embodiments, optimum patterns may be narrow and overlap approximately at the −3 dB down point on the patterns. In some embodiments, two separate beamforming/beamsteering systems need not be used. For example, a single system may be used such that it is programmed to form two simultaneous beams at opposite angles to the main axis. Since there may be many intermediate signals inside the beamforming/beamsteering system that may be shared by both beamforming/beamsteering #1 and #2 of FIG. 17C, a simple combine system with two or more input signals to a VNC processor (200) may be used for less complexity and low cost reasons. These input signals from the sensor array and beamforming/beamsteering system may be weighted and combined using the VNC processing previously described. In some embodiments, the beamforming and/or beamsteering system may be incorporated into DSP code, for example, as a part of a VNC system.

In some embodiments, even if the target signal is not on a perpendicular axis to the sensor array, but at an angle from the perpendicular axis, the beamforming and/or beamsteering system may "swing" both unidirectional beam patterns to the side, still keeping the beam patterns equal and symmetric about the target signal direction. Indeed, by incorporating a signal sensor, the beams can be dynamically and adaptively made to follow a source that emits the target signal, such as a person who walks around in a conference room or office. The signal sensor for the source may use a feature of the target signal, such as intensity and/or statistical characteristics, to separate and detect the direction towards the target signal.

Figure 17D:
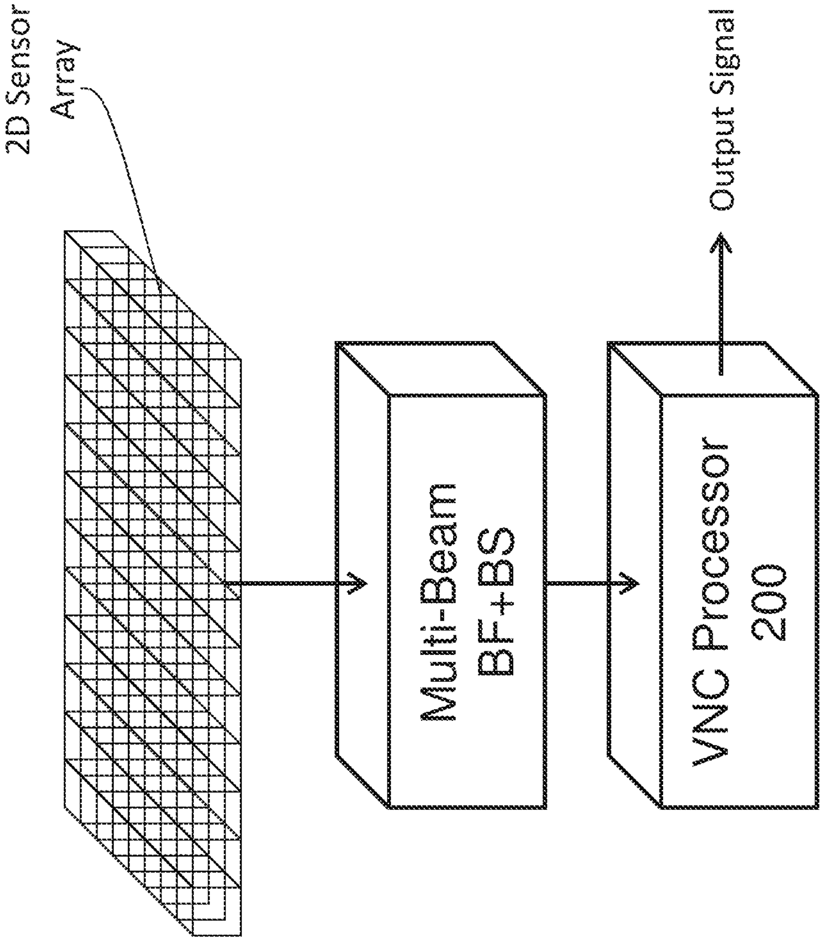

In some embodiments, as illustrated in FIG. 17D, a 2-D sensor array may be used to generate multiple beams distributed in more than one dimensions. Input signals created by a corresponding beamforming and/or beamsteering system may be processed by a 3-dimensional VNC system. In some embodiments, the front-to-back ratio of a beam may be improved for the purpose of statically, dynamically, or adaptively tracking a source of the target signal in a 3-dimensional space by sensor array processing (e.g., by use of one or more sensors behind or in front of the first sensor), by use of uni-directional elements in the sensor array, or by physical barriers or (sound) absorbers behind the sensor array.

Figure 17E:
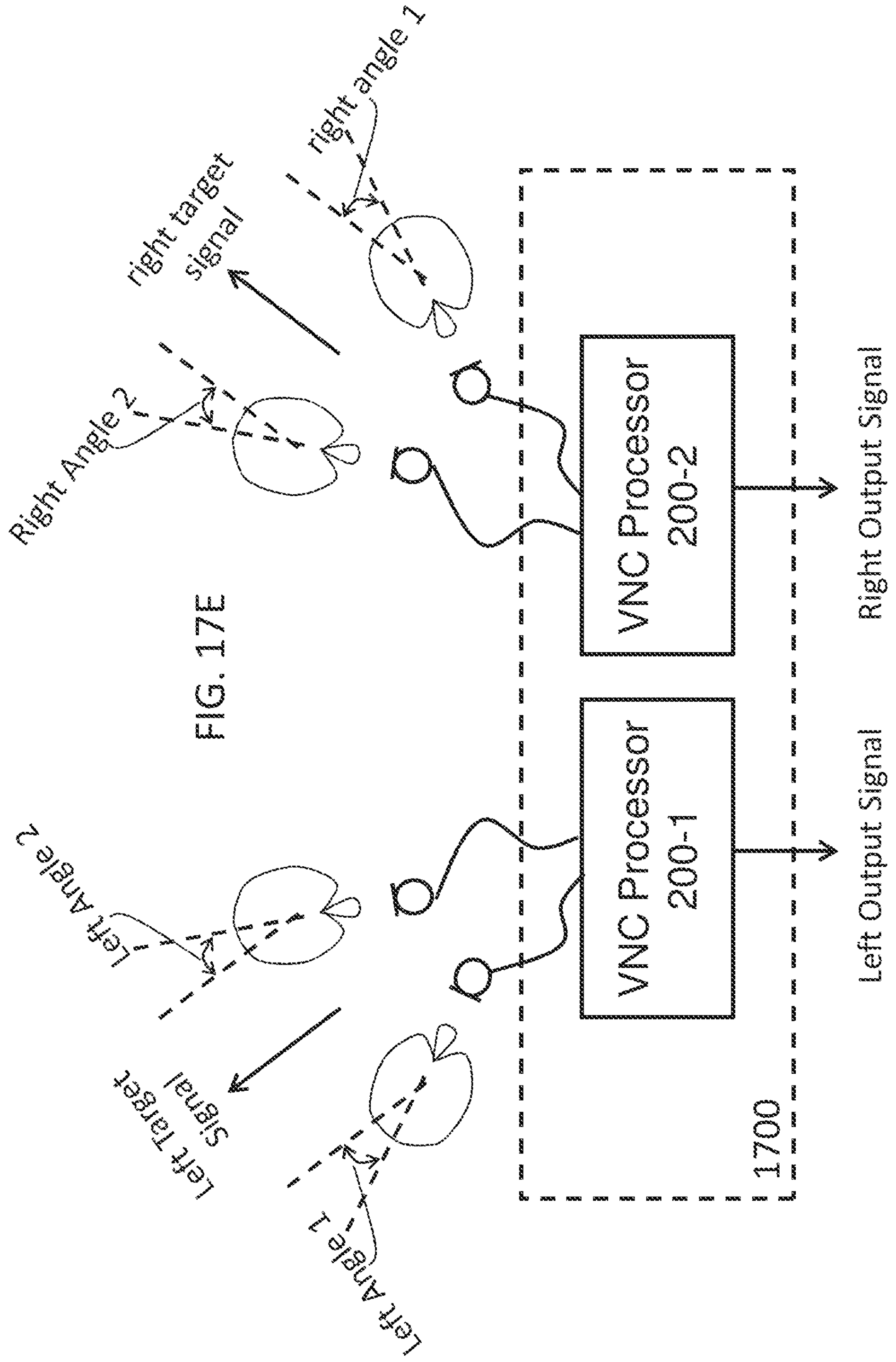

In some possible embodiments, a stereo pickup system may be built using VNC techniques as described herein, in other words, a VNC system with two output signals carrying stereophonic information. For example, an array of microphone elements may be arranged in a row configuration. Directional microphone elements or beam patterns may be used to form four simultaneous beams directed at four divergent angles, such as left angles 1 and 2 and right angles 1 and 2 illustrated in FIG. 17E. A VNC processor (200-1) may be used to process left input signals picked up from two left beams directed to left angles 1 and 2 to produce a left output signal that is optimized at a left target signal direction, while another VNC processor (200-2) may be used to process right input signals picked up from two right beams directed to right angles 1 and 2 to produce a right output signal that is optimized at a right target signal direction. In some possible embodiments, several discrete systems may be involved to produce these output signals. In some other possible embodiments, some or all of the devices used to generate these output signals using the VNC techniques may be combined into a single system. For example, the VNC processors (200-1 and 200-2) as illustrated in FIG. 17E may be in a single system (1700), e.g. a digital VNC signal processing system.

In some embodiments, the left target signal direction and the right target signal direction may form an angle of 90°. Left signal 1 may be 10°, 20°, 25°, 30°, etc., further left from the left target signal direction, while left signal 2 may be 10°, 20°, 25°, 30°, etc., to the right from the left target signal direction. Similarly, right signal 1 may be 10°, 20°, 25°, 30°, etc., further right from the right target signal direction, while right signal 2 may be 10°, 20°, 25°, 30°, etc., to the left from the right target signal direction.

In some possible embodiments, a different configuration other than the row configuration may be used to arrange the microphone elements. Any configuration that generates disparity between input signals (e.g., from the same source or sources) as perceived by different microphone elements may be used. For example, omni-directional or uni-directional microphone elements may be used together with physical or virtual barriers to generate beam patterns some of which may be used to generate one output signal (e.g., the left output signal as shown in FIG. 17E) while some other of which may be used to generate a different output signal (e.g., the right output signal as shown in FIG. 17E). In some possible embodiments, one, two, three, or more VNC processors along with their microphone elements or beam patterns may generate one, two, three, or more output signals. In some possible embodiments, physical or virtual barriers that enhance disparity between sensed signals may be configured to enhance disparity between the noise parts of the sensed signals while maintaining parity between the target signal portions in the sensed signals.

22. BOOMLESS HEADSETS

VNC techniques as described herein may be used to create boomless headsets. For example, in a small-office-home-office or receptionist application, a headset is typically configured with a headband, one or two speaker earcups for reception and a boom microphone for transmission. A similar, but boomless, headset that provides microphone elements, which may be omni-directional or uni-directional, at both ears of a user, and uses VNC techniques to combine the signals from the microphones such that the signal received from the user's mouth is enhanced, and other signals are either reduced, or less enhanced that the signal from the user's mouth (as contrasted with a single microphone at one ear) can approach the signal to noise ratio of a microphone supported by a boom in close proximity to the mouth.

As compared with a headset having a boom microphone, the headset under the VNC techniques supports non-obtrusive two-way communications. Multiple, for example, two, signals in a vector space may be acquired from the boomless microphone elements and processed into output signals in the vector space with minimum residual noise power and nearly perfect voice fidelity. The VNC processing may be performed simultaneously and independently at many individual frequencies with an instantaneous adaptation time.

In some possible embodiments, microphone elements for a boomless headset application may be placed in other locations other than at the ears. For example, microphone elements may optionally and/or alternatively be placed at other locations about the head, torso, etc. They need not be placed in the horizontal plane, but may be placed at other angles, such as in a vertical configuration in a motorcycle/military helmet application.

In some possible embodiments, dual microphones in ear buds, such as those used with walkmans, MP3 players, cellular phones, etc. may be used by a VNC system (e.g., an embedded VNC system) to provide clean voice control of the player, phone or other device.

In some possible embodiments, a VNC system may be implemented inside or in conjunction to, a Bluetooth headset (e.g., used in a vehicular environment) to reduce and/or remove wind noise from signals.

23. HIGH AVAILABILITY OPERATIONS

A sensor element in a sensor array may go dead for a variety of reasons including a wire break, a fault in the sensor element, etc. In some possible embodiments, a system implementing VNC techniques may be configured to avoiding outputting a dead (i.e. quieter) input signal as the only output signals. In some possible embodiments, the VNC system may act in a failsafe manner, especially, in certain critical applications, such as airplane pilots, military, etc. The VNC system may be configured to using the remaining sensor elements when one element fails, including only one sensor element, in the sensor array. In some possible embodiments, redundancy of sensor elements in the sensor array may be used by the VNC system to provide more robust, resilient, and highly reliable signal processing operations in a failsafe manner as compared to that of a single sensor configuration used for the same purpose.

In some possible embodiments, if the total signal energy (e.g., the square of the magnitude of a wave signal) from any sensor element drops below a certain predetermined (or, optionally and/or alternatively, real-time adaptive) threshold for a certain predetermined (or, optionally and/or alternatively, real-time adaptive) time interval, then the VNC system may be configured to switching the signal selection processing to include only those remaining active input signals while ignoring the input signal that is deemed dead (e.g., below the signal energy threshold for the time interval). For example, in a telecom application with acoustic voice pickup from two microphones at the ears, a fixed threshold can be used to determine whether a microphone is dead and thus to be ignored. For the purpose of illustration only, when one microphone's signal drops to below −25 dB, −30 dB, −35 dB, −40 dB, etc. relative to the other signal, then the VNC system switches to use the remaining louder signal in this telecom application. In this way, the reliability of the VNC system is significantly improved over one with a single microphone by the redundancy of multiple microphones. In some possible embodiments, detecting a failure in an input signal may include sensing a loss of bias voltage in a microphone (which may be a sensor element herein) or detecting a loss of voice signal in one or more of the input signals as determined by the use of a Voice Activity Detector.

24. MULTIPLE SIGNALS

In some embodiments, VNC techniques as described herein may work with more than two input signals (e.g., $S_1$ and $S_2$ of Expression (1)). Expression (1) may be extended into the following expression (32) for the purpose of producing one (e.g., j-th) of m output signals from n input signals:

$$S_{output,j}=\alpha_{j,1}*S_{input,1}+\alpha_{j,2}*S_{input,2}+\dots+\alpha_{j,n-1}*S_{input,n-1}+\alpha_{j,n}*S_{input,n} \quad \text{expression (32)}$$

where $S_{output,j}$ is the j-th output signal, $S_{input,1}$, $S_{input,2}$, . . . , $S_{input,n-1}$, and $S_{input,n}$ are respectively $1^{st}$, $2^{nd}$, (n−1)-th, and n-th input signals, $\alpha_{j,1}$, $\alpha_{j,2}$, . . . , $\alpha_{j,n-1}$, and $\alpha_{j,n}$ are the j-th array of weighting factors that produces the j-th output signal from the n number of the input signals. In some embodiments, the weighting factors may, but not necessarily in some other embodiments, satisfy the following expression (33):

$$\alpha_{j,1}+\alpha_{j,2}+\dots+\alpha_{j,n-1}+\alpha_{j,n}=1 \quad \text{expression (33)}$$

Expression (33) is a constraint that ensures that the output signals maintain the integrity of a target signal that exists as a substantially same vector in all the input signals. As used herein, two vectors are substantially the same, if BOTH their magnitudes are within a small range (which may be, e.g., 1%, 5%, or another value in various possible embodiments) AND their phases are within a small range (which may be, e.g., 1°, 5°, or another value in various possible embodiments).

In some possible embodiments, the input signals' complex vectors may be weighted using one of various weighting methods, before they are summed, for example, as in expression (32). In an example, the lowest magnitude among magnitudes of all the input signals' complex vectors may be used as weighted magnitudes while their individual angles are maintained. The weighted input signals' complex vectors having the previous angles but new magnitudes (e.g., the same magnitude) may then be vectorially summed by the VNC techniques using expression (32), for the purpose of producing the output signals' complex vectors. In another example, a mean magnitude among magnitudes of all the input signals' complex vectors may be used as weighted magnitudes while their angles are maintained. The weighted input signals' complex vectors having the previous angles but new magnitudes (e.g., the same magnitude) may then be vectorially summed by the VNC techniques using expression (32), for the purpose of producing the output signals' complex vectors. The mean magnitude may be an arithmetic average, geometric mean, harmonic mean or other mean.

Another possible weighting method is to multiply a magnitude of an input signal vector with a ratio of a geometric mean of magnitudes of all other input signals divided by an arithmetic average of magnitudes of all input signals. Thus, in the case of two input signals, the magnitude of the first input signal $S_1$ may be multiplied with $|S_2|/(|S_1|+|S_2|)$ to produce a first weighted input signal, while the magnitude of the second input signal $S_2$ may be multiplied with $|S_1|/(|S_1|+|S_2|)$ to produce a second weighted input signal.

Yet another possible weighting method is to set the magnitudes of all the input signal vectors to a square root of averages of the sum of squares of the input signal vectors. Thus, in the case of two input signals, the magnitude of each of weighted input signals may be set to $((|S_1|^2+|S_2|^2)/2)^{1/2}$.

By equalizing the energy (or magnitude), the vector sum may produce a better estimate of the target signal and may reject the noises more optimally. Further, at angles where the phase difference is 180°, noise signal waves (e.g., electric current) may cancel among themselves, thus producing deep nulls in the sensitivity pattern and reducing noise pickups from those null angles and near those null angles to nearly zero.

25. VNC WITH POWER OR ENERGY

In some possible embodiments, input signals and output signals as described herein are physical wave signals the squares of which represent energies or powers. In some possible embodiments, physical wave signals are summed vectorially, while their energies or powers are summed as scalars. Since some perception systems such as human auditory systems hear loudness as the sum of the powers of all signals, adding energies or powers as scalar values makes sense, especially for wideband signals.

In some embodiments, the energies or power (e.g., the squares of the wave signals) may be summed vectorially (e.g., in complex number domains). For narrow band signals that may be processed by a VNC process, phase cancellation may occur for energies or powers prior to detection of them by the perception systems, thereby resulting in output signals with less noise content.

In some possible embodiments, signal wave quantities such as $S_o$, $S_1$, $S_2$, $S_{output}$, and $S_{input}$ in the previous expressions (e.g., expressions (2) and (4)) may be replaced with the squares of these signal wave quantities. In some embodiments, only the magnitudes of the signal wave quantities are squared to give rise to the corresponding energy or power quantities to be used in the vector summation. In the case of two input signals $S_1$ and $S_2$, the corresponding energy quantity of the first input signal $S_1$ may be multiplied with a factor of $(|S_1|^2+|S_2|^2)/2|S_1|^2$, while the corresponding energy quantity to the second input signal $S_2$ may be multiplied with a factor of $(|S_1|^2+|S_2|^2)/2|S_2|^2$.

In some other embodiments, both the magnitudes and the phase expression ($e^{i\Phi}$, where $\Phi$ is a phase angle) of the signal wave quantities are squared to give rise to the corresponding energy or power quantities to be used in the vector summation. In these latter embodiments, the phase angles are doubled, thereby increasing the probability of canceling noises that are out of phase to a certain extent.

26. EXAMPLE PROCESS FLOW

Figure 18:
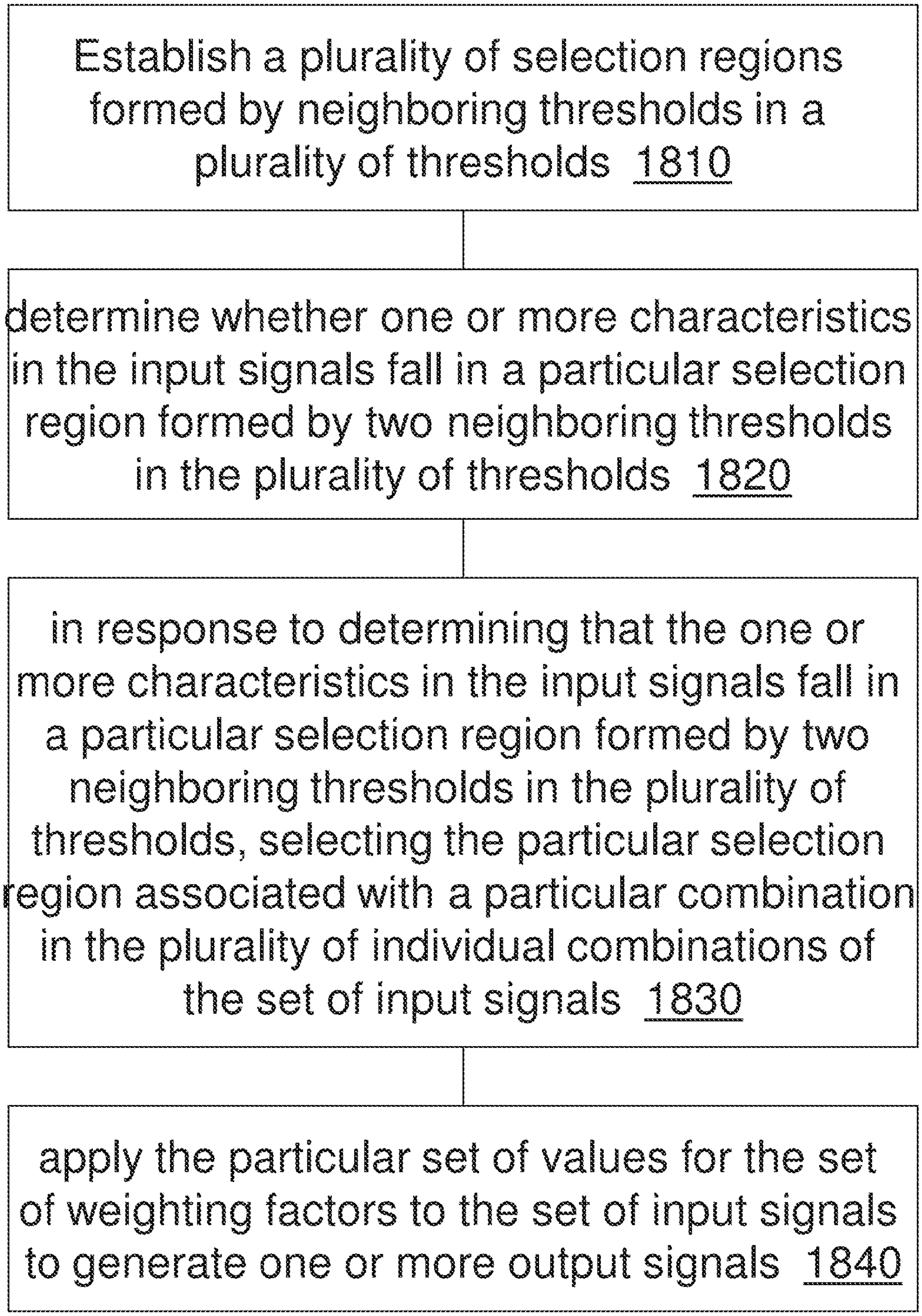
FIG. 18 illustrates an example process flow, according to a possible embodiment of the present invention.

FIG. 18 illustrates an example process flow according to a possible embodiment of the present invention. In some possible embodiments, one or more computing devices or components in a signal processing system (e.g., the VNC system (260)) may perform this process flow. In block 1810, the VNC system (260) establishes a plurality of selection regions formed by neighboring thresholds in a plurality of thresholds. Each selection region in the plurality of selection regions may be associated with an individual combination in a plurality of individual combinations of a set of input signals. Each individual combination in the plurality of individual combinations of the set of input signals corresponding to a different set of values for a set of weighting factors.

In block 1820, the VNC system (260) determines whether one or more characteristics in the input signals fall in a particular selection region formed by two neighboring thresholds in the plurality of thresholds.

In block 1830, in response to determining that the one or more characteristics in the input signals fall in a particular selection region formed by two neighboring thresholds in the plurality of thresholds, the VNC system (260) selects the particular selection region associated with a particular combination in the plurality of individual combinations of the set of input signals. The particular combination may correspond to a particular set of values for the set of the weighting factors.

In block 1840, the VNC system (260) applies the particular set of weighting factor values to the set of input signals to generate one or more intermediate weighted signals from which an output signal is selected.

27. ADDITIONAL FEATURES

In some possible embodiments, the set of input signals may comprise two, three, or more input signals. The set of weighting factors may comprise two, three or more weighting factors.

In some possible embodiments, the plurality of thresholds comprises a plurality of thresholds related to at least one of power levels, magnitudes, correlations, coherences, frequencies or phases, of the input signals.

In some possible embodiments, the plurality of thresholds may comprise a plurality of magnitude ratio thresholds. A magnitude ratio threshold in the plurality of magnitude ratio thresholds may be compared with a ratio of a first magnitude measured for a first input signal in the input signals and a second magnitude measured for a second input signal in the input signals. The magnitude ratio threshold may be an integer times one of (a) 0 dB, (b) ±2.22 dB, (c) ±3.68 dB, (d) ±4.77 dB, (e) ±6.99 dB, (f) ±8.45 dB, or (g) ±9.54 dB. In some possible embodiments, the magnitude ratio threshold may be a finite non-zero value. A second magnitude ratio threshold, in the plurality of magnitude ratio thresholds, neighboring to the magnitude ratio threshold may be an upper limit for all relative magnitude values. In some possible embodiments, the second magnitude ratio threshold may be a lower limit for all relative magnitude values. The magnitude ratio threshold and the second magnitude ratio threshold define the particular selection region.

In some possible embodiments, a target signal in the input signals is preserved in the one or more output signals. A source that is generating the one or more signal portions may be being adaptively steered towards by a sensor array that generates the signals in the input signals.

In some possible embodiments, the input signals are sensory responses to physical quantities. In some possible embodiments, signals in the input signals are driven by one or more sensors that respond to one or more of acoustic waves, ultrasound waves, atomic radiation waves, light waves, neutrino waves, gravitational waves, and radiofrequency waves.

In some possible embodiments, at least one of the one, two, or more input signals is inputted by a system that employs spectral subtraction for noise reduction.

In some possible embodiments, at least one of the one, two, or more input signals is inputted by a system that employs beamforming for noise reduction.

In some possible embodiments, the VNC system uses phase difference enhancement in generating the at least one of the one, two, or more input signals in the input signals.

In some possible embodiments, noise portions in at least two of the input signals are correlated. In some possible embodiments, noise portions in at least two of the input signals are non-correlated.

In some possible embodiments, the input signals are sourced from a sensor array comprising two, three, or more sensor elements. The two, three, or more sensor elements may comprise at least one directional sensor element. In some possible embodiments, at least two of the two, three, or more sensor elements may be separated by a physical barrier. In some possible embodiments, at least two of the two, three, or more sensor elements may be placed with substantially no spatial gap in between. In some possible embodiments, two of the two, three, or more sensor elements may be directional sensor elements pointing to two different directions.

In some possible embodiments, two of the two, three, or more sensor elements may be boundary sensor elements. In some possible embodiments, the two, three, or more sensor elements may be first-order sensor elements. In some possible embodiments, the signals in the input signals may be responses to acoustic signals. The two, three, or more sensor elements may be placed on a boomless headset, helmet or other head worn device. The signals in the input signals may be responses to acoustic signals, and wherein the two, three, or more sensor elements are placed adjacent to a pair of earphones.

In some possible embodiments, the VNC system (260) may detect that a particular signal in the signals in the input signals has failed, and remove the particular signal from the signals in the input signals. The detection of a failed input signal may be made by sensing loss of bias voltage to a sensor element or loss of voice signal portion of the input signal.

In some possible embodiments, the input signals are sourced from a sensor array comprising three or more sensor elements not arranged on a straight line. In some possible embodiments, the input signals comprise samples having short time windows. In some possible embodiments, the input signals comprise samples having narrow frequency bands.

In some possible embodiments, the output signals comprise samples with narrow frequency bands.

For the purpose of illustration only, it has been described that signal samples from bins of data in the frequency domain may be processed by VNC techniques as described herein. It should be noted that the present invention is not so limited. For the purpose of the present invention, signal information in other domains and/or in other data divisions may be processed by VNC techniques as described herein. For examples, instead of signal samples in bins of data, signal information in one or more bands may be processed by VNC techniques as described herein. In some possible embodiments, a band may comprise multiple bins, or may be derived in a way that does not use bins, for example by bandpass filtering. Thus, signal information in these and other data divisions and/or in other domains may be processed by VNC techniques as described herein for the purpose of the present invention.

28. IMPLEMENTATION MECHANISMS—HARDWARE OVERVIEW

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, analog circuits, mixed signal devices, handsets, networking devices or any other device that incorporates hard-wired and/or program logic to implement the techniques.

Figure 19:
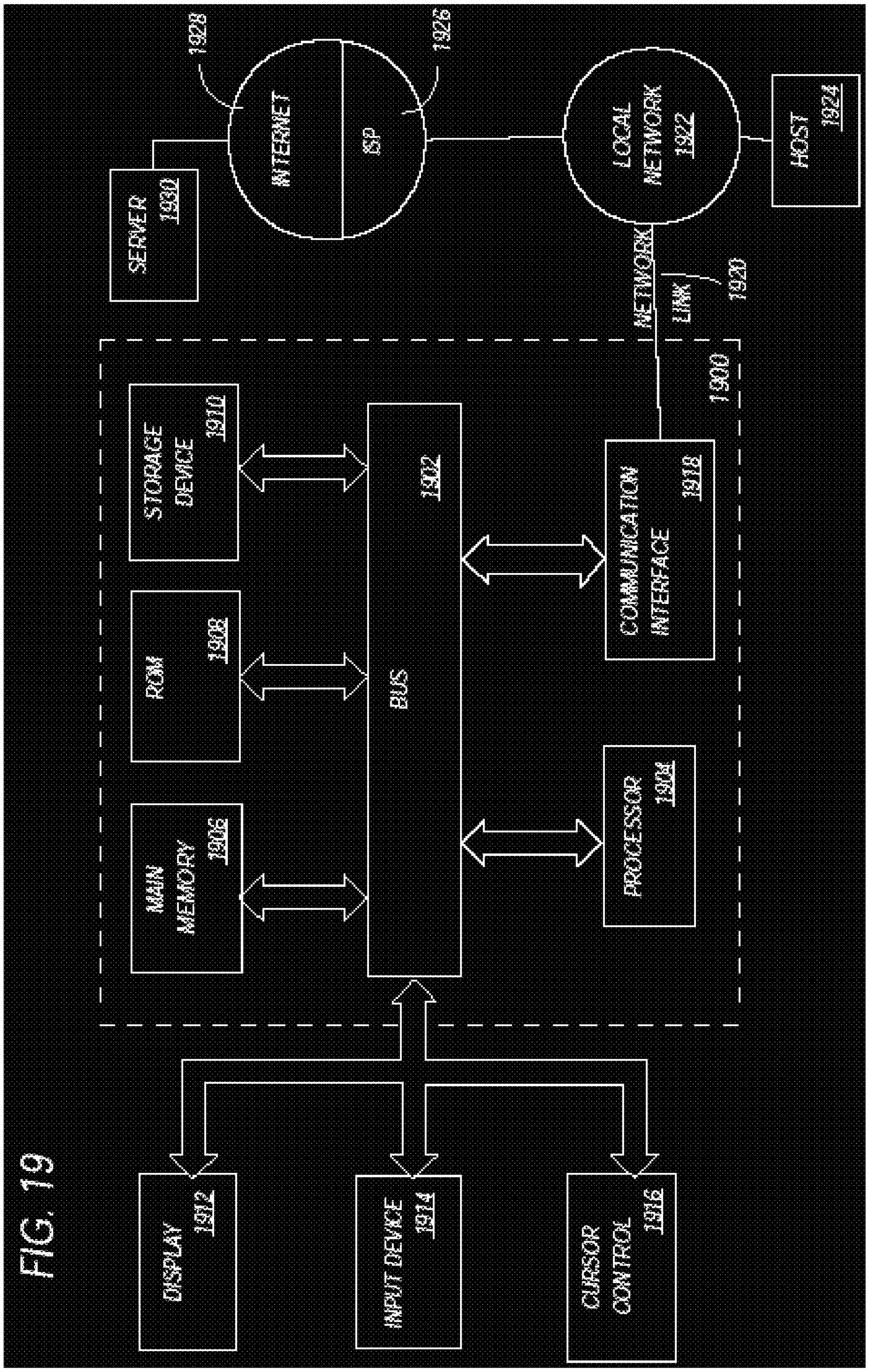
FIG. 19 illustrates an example hardware platform on which a computer or a computing device as described herein may be implemented, according a possible embodiment of the present invention.

For example, FIG. 19 is a block diagram that illustrates a computer system 1900 upon which a possible embodiment of the invention may be implemented. Computer system 1900 includes a bus 1902 or other communication mechanism for communicating information, and a hardware processor 1904 coupled with bus 1902 for processing information. Hardware processor 1904 may be, for example, a general purpose microprocessor, digital signal processor, or other processor.

Computer system 1900 also includes a main memory 1906, such as a random access memory (RAM) or other dynamic storage device, coupled to bus 1902 for storing information and instructions to be executed by processor 1904. Main memory 1906 also may be used for storing temporary variables or other intermediate information during execution of instructions to be executed by processor 1904. Such instructions, when stored in storage media accessible to processor 1904, render computer system 1900 into a special-purpose machine that is customized to perform the operations specified in the instructions.

Computer system 1900 further includes a read only memory (ROM) 1908 or other static storage device coupled to bus 1902 for storing static information and instructions for processor 1904. A storage device 1910, such as a magnetic disk or optical disk, is provided and coupled to bus 1902 for storing information and instructions.

Computer system 1900 may be coupled via bus 1902 to a display 1912, such as a cathode ray tube (CRT), for displaying information to a computer user. An input device 1914, including alphanumeric and other keys, is coupled to bus 1902 for communicating information and command selections to processor 1904. Another type of user input device is cursor control 1916, such as a mouse, a trackball, or cursor direction keys for communicating direction information and command selections to processor 1904 and for controlling cursor movement on display 1912. This input device typically has two degrees of freedom in two axes, a first axis (e.g., x) and a second axis (e.g., y), that allows the device to specify positions in a plane.

Computer system 1900 may implement the techniques described herein using customized hard-wired logic, one or more ASICs or FPGAs, firmware and/or program logic which in combination with the computer system causes or programs computer system 1900 to be a special-purpose machine. According to one embodiment, the techniques herein are performed by computer system 1900 in response to processor 1904 executing one or more sequences of one or more instructions contained in main memory 1906. Such instructions may be read into main memory 1906 from another storage medium, such as storage device 1910. Execution of the sequences of instructions contained in main memory 1906 causes processor 1904 to perform the process steps described herein. In alternative embodiments, hard-wired circuitry may be used in place of or in combination with software instructions.

The term "storage media" as used herein refers to any media that store data and/or instructions that cause a machine to operation in a specific fashion. Such storage media may comprise non-volatile media and/or volatile media. Non-volatile media includes, for example, optical or magnetic disks, such as storage device 1910. Volatile media includes dynamic memory, such as main memory 1906. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1902. Transmission media can also take the form of acoustic or light waves, such as those generated during radio-wave and infra-red data communications.

Various forms of media may be involved in carrying one or more sequences of one or more instructions to processor 1904 for execution. For example, the instructions may initially be carried on a magnetic disk or solid state drive of a remote computer. The remote computer can load the instructions into its dynamic memory and send the instructions over a telephone line using a modem. A modem local to computer system 1900 can receive the data on the telephone line and use an infra-red transmitter to convert the data to an infra-red signal. An infra-red detector can receive the data carried in the infra-red signal and appropriate circuitry can place the data on bus 1902. Bus 1902 carries the data to main memory 1906, from which processor 1904 retrieves and executes the instructions. The instructions received by main memory 1906 may optionally be stored on storage device 1910 either before or after execution by processor 1904.

Computer system 1900 also includes a communication interface 1918 coupled to bus 1902. Communication interface 1918 provides a two-way data communication coupling to a network link 1920 that is connected to a local network 1922. For example, communication interface 1918 may be an integrated services digital network (ISDN) card, cable modem, satellite modem, or a modem to provide a data communication connection to a corresponding type of telephone line. As another example, communication interface 1918 may be a local area network (LAN) card to provide a data communication connection to a compatible LAN. Wireless links may also be implemented. In any such implementation, communication interface 1918 sends and receives electrical, electromagnetic or optical signals that carry digital data streams representing various types of information.

Network link 1920 typically provides data communication through one or more networks to other data devices. For example, network link 1920 may provide a connection through local network 1922 to a host computer 1924 or to data equipment operated by an Internet Service Provider (ISP) 1926. ISP 1926 in turn provides data communication services through the world wide packet data communication network now commonly referred to as the "Internet" 1928. Local network 1922 and Internet 1928 both use electrical, electromagnetic or optical signals that carry digital data streams. The signals through the various networks and the signals on network link 1920 and through communication interface 1918, which carry the digital data to and from computer system 1900, are example forms of transmission media.

Computer system 1900 can send messages and receive data, including program code, through the network(s), network link 1920 and communication interface 1918. In the Internet example, a server 1930 might transmit a requested code for an application program through Internet 1928, ISP 1926, local network 1922 and communication interface 1918. The received code may be executed by processor 1904 as it is received, and/or stored in storage device 1910, or other non-volatile storage for later execution.

29. EQUIVALENTS, EXTENSIONS, ALTERNATIVES AND MISCELLANEOUS

In the foregoing specification, possible embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:

receiving a sample pair comprising a first input sample in a first input signal and a second input sample in a second input signal, the first input sample being in a plurality of first input samples derived from the first input signal, and the second input sample being in a plurality of second input samples derived from the second input signal;

wherein at least one of the first input signal or the second input signal comprises responses to one or more of physical force, pressure, sound, electromagnetic wave, electric current, radiation, or light;

calculating (a) a first power value based on the first input sample, and (b) a second power value based on the second input sample;

selecting, based on a plurality of thresholds and a power-dependent value computed from the first power value and the second power value, a specific selection region in a finite number of non-overlapping selection regions, wherein each selection region in the finite number of non-overlapping selection regions is located in between two corresponding neighboring thresholds in the plurality of thresholds;

using a weight factor that is fixed within the specific selection region to derive an intermediate sample as a weighted combination of the first input sample and the second input sample;

determining a phase difference from complex-domain representations of the first input sample and the second input sample; and applying an amplification or attenuation to the intermediate sample to generate an output sample in an output signal, the output sample being in a plurality of output samples in the output signal, the amplification or attenuation being monotonically related to the phase difference;

wherein the generated output sample in the output signal comprises reduced noise as compared with the first and second input samples in the first and second input signals;

wherein the method is performed by one or more processors comprised in one or more computing devices.

2. The method of claim 1, wherein the plurality of thresholds comprises one or more of (a) a plurality of power ratio thresholds, (b) a plurality of phase based thresholds, (c) a plurality of phase-and-power based thresholds, (d) a plurality of power-level based thresholds, (e) a plurality of signal-correlation based thresholds, (f) a plurality of signal-coherence based thresholds, or (g) a plurality of thresholds related to at least one of power levels or phases, of the input signals.

3. The method of claim 1, further comprising comparing a threshold in the plurality of thresholds with a ratio of a first value measured for a first input signal in the input signals and a second value measured for a second input signal in the input signals.

4. The method of claim 1, further comprising performing one or more of (a) generating at least one of the input signals and the output signal with a phase-difference enhancement, or (b) continuously determining a value for the weight factor to be applied to the input signals.

5. The method of claim 1, wherein the one or more characteristics include at least one phase difference among the input signals or intermediate signals, and wherein the at least one phase difference is used in selecting at least one of the output signal or intermediate signals.

6. The method of claim 1, wherein the input signals comprise at least one of (a) signals inputted by a system that employs spectral subtraction for noise reduction, (b) signals inputted by a system that employs one or more types of noise reduction techniques, (c) signals with correlated noise portions, (d) signals with non-correlated noise portions, (e) signals sourced from a sensor array comprising two, three, or more sensor elements, (f) signals containing samples with narrow time windows, (g) signals containing samples with short frequency bands, (h) signals derived from sensory responses to physical quantities, (i) signals derived from a pair of microphones each being at each ear of a user to pick up the user's voice similarly and having different amounts of head shadow as determined by an Inter-Aural Difference (IAD) with respect to noises not directly in front of or behind the user; or G) signals generated by an all-at-the-ear voice pickup system which selectively picks up a user's own voice as a target signal while rejecting background noise through multi-microphone sensing and signal processing for minimum residual noise.

7. The method of claim 1, wherein the input signals are derived from two or more sensor elements comprising at least one of (a) directional sensor elements pointing to one or more directions, (b) sensor elements separated by a physical barrier, (c) sensor elements placed with substantially no spatial gap in between, (d) boundary sensor elements, (e) first-order sensor elements, (f) second-order sensor elements, (g) sensor elements placed on a boomless headset, (h) sensor elements placed adjacent to a pair of earphones, (i) sensor elements not arranged on a straight line, or (j) microphone elements.

8. The method of claim 1, further comprising:

detecting that a particular signal in the signals in the input signals has failed; and removing the particular signal from the signals in the input signals.

9. The method of claim 8, wherein the particular signal is from a microphone element, and wherein detecting that the particular signal has failed includes sensing loss of bias voltage to the microphone element.

10. The method of claim 1, further comprising:

representing at least two of the input signals as vectors;

deriving at least one of the output signal as a resultant vector, based on the at least two of the input signals, with a minimum residual noise power.

11. The method of claim 10, wherein the resultant vector belongs to a set of resultant vectors that are formed with instantaneous adaptation time simultaneously and independently at a plurality of individual frequencies.

12. The method of claim 1, further comprising:

calculating differences between two real parts and between two imaginary parts of the sample pair;

computing a first weighting factor value for the first input signal; smoothing over the first weighting factor value;

determining a second weighting factor value for the second input signal; and applying the first and second weighting factor values to the first and second input signals to generate at least one output signal.

13. The method of claim 1, further comprising performing at least one of (a) time aligning between signal samples from at least two of the input signals, (b) attenuating/amplifying at least one of the output signal using a half-angle function of a phase difference between at least two of the input signals, or (c) attenuating/amplifying at least one of the output signal using one or more of dipole, phase-difference, or Gaussian based expressions.

14. The method of claim 1, wherein a phase difference between two of the input signals is used in one or more of (a) comparing with one or more thresholds to select among the quieter or quietest one of the input signals or different combinations of the input signals, (b) calculating one or more linearly derived values of the weight factor for combining the input signals into a weighted combined signal as the output signal, or (c) calculating one or more non-linearly derived values of the weight factor for combining the input signals into a weighted combined signal as the output signal.

15. The method of claim 1, further comprising modifying a phase of at least one of the input signals or intermediate signals.

16. A method comprising:

receiving a sample pair comprising a first input sample in a first input signal and a second input sample in a second input signal, the first input sample being in a plurality of first input samples derived from the first input signal, and the second input sample being in a plurality of second input samples derived from the second input signal;

wherein at least one of the first input signal or the second input signal comprises responses to one or more of physical force, pressure, sound, electromagnetic wave, electric current, radiation, or light;

calculating (a) a first power value based on the first input sample, and (b) a second power value based on the second input sample;

selecting, based on a plurality of thresholds and a power-dependent value computed from the first power value and the second power value, a specific selection region in a finite number of non-overlapping selection regions, wherein each selection region in the finite number of non-overlapping selection regions is located in between two corresponding neighboring thresholds in the plurality of thresholds;

using a weight factor that is fixed within the specific selection region to derive an intermediate sample as a weighted combination of the first input sample and the second input sample;

determining a phase difference from complex-domain representations of the first input sample and the second input sample;

calculating, based on the phase difference, an unwrapped phase difference; and applying an amplification or attenuation to the intermediate sample to generate an output sample in an output signal, the output sample being in a plurality of output samples in the output signal, the amplification or attenuation being dependent on the unwrapped phase difference;

wherein the generated output sample in the output signal comprises reduced noise as compared with the first and second input samples in the first and second input signals;

wherein the method is performed by one or more processors comprised in one or more computing devices.

17. An apparatus, comprising:

a subsystem, at least implemented in part in hardware, that receives a sample pair comprising a first input sample in a first input signal and a second input sample in a second input signal, the first input sample being in a plurality of first input samples derived from the first input signal, and the second input sample being in a plurality of second input samples derived from the second input signal;

wherein at least one of the first input signal or the second input signal comprises responses to one or more of physical force, pressure, sound, electromagnetic wave, electric current, radiation, or light;

a subsystem, at least implemented in part in hardware, that calculates (a) a first power value based on the first input sample, and (b) a second power value based on the second input sample;

a subsystem, at least implemented in part in hardware, that selects, based on a plurality of thresholds and a power-dependent value computed from the first power value and the second power value, a specific selection region in a finite number of non-overlapping selection regions, wherein each selection region in the finite number of non-overlapping selection regions is located in between two corresponding neighboring thresholds in the plurality of thresholds;

a subsystem, at least implemented in part in hardware, that uses a weight factor that is fixed within the specific selection region to derive an intermediate sample as a weighted combination of the first input sample and the second input sample;

a subsystem, at least implemented in part in hardware, that determines a phase difference from complex-domain representations of the first input sample and the second input sample; and a subsystem, at least implemented in part in hardware, that applies an amplification or attenuation to the intermediate sample to generate an output sample in an output signal, the output sample being in a plurality of output samples in the output signal, the amplification or attenuation being monotonically related to the phase difference;

wherein the generated output sample in the output signal comprises reduced noise as compared with the first and second input samples in the first and second input signals.

18. The apparatus of claim 17, wherein the plurality of thresholds comprises one or more of (a) a plurality of power ratio thresholds, (b) a plurality of phase based thresholds, (c) a plurality of phase-and-power based thresholds, (d) a plurality of power-level based thresholds, (e) a plurality of signal-correlation based thresholds, (f) a plurality of signal-coherence based thresholds, or (g) a plurality of thresholds related to at least one of power levels or phases, of the input signals.

19. The apparatus of claim 17, further comprising a subsystem, at least implemented in part in hardware, that performs one or more of (a) generating at least one of the input signals and the output signal with a phase-difference enhancement, or (b) continuously determining a value for the weight factor to be applied to the input signals.

20. The apparatus of claim 17, wherein the input signals comprise at least one of (a) signals inputted by a system that employs spectral subtraction for noise reduction, (b) signals inputted by a system that employs one or more types of noise reduction techniques, (c) signals with correlated noise portions, (d) signals with non-correlated noise portions, (e) signals sourced from a sensor array comprising two, three, or more sensor elements, (f) signals containing samples with narrow time windows, (g) signals containing samples with short frequency bands, (h) signals derived from sensory responses to physical quantities, (i) signals derived from a pair of microphones each being at each ear of a user to pick up the user's voice similarly and having different amounts of head shadow as determined by an Inter-Aural Difference (IAD) with respect to noises not directly in front of or behind the user; or G) signals generated by an all-at-the-ear voice pickup system which selectively picks up a user's own voice as a target signal while rejecting background noise through multi-microphone sensing and signal processing for minimum residual noise.

21. The apparatus of claim 17, wherein the input signals are derived from two or more sensor elements comprising at least one of (a) directional sensor elements pointing to one or more directions, (b) sensor elements separated by a physical barrier, (c) sensor elements placed with substantially no spatial gap in between, (d) boundary sensor elements, (e) first-order sensor elements, (f) second-order sensor elements, (g) sensor elements placed on a boomless headset, (h) sensor elements placed adjacent to a pair of earphones, (i) sensor elements not arranged on a straight line, or (j) microphone elements.

22. The apparatus of claim 17, further comprising:

a subsystem, at least implemented in part in hardware, that represents at least two of the input signals as vectors;

a subsystem, at least implemented in part in hardware, that derives at least one of the output signal as a resultant vector, based on the at least two of the input signals, with a minimum residual noise power.

23. The apparatus of claim 17, further comprising a subsystem, at least implemented in part in hardware, that modifies a phase of at least one of the input signals or intermediate signals.

24. An apparatus, comprising:

a subsystem, at least implemented in part in hardware, that receives a sample pair comprising a first input sample in a first input signal and a second input sample in a second input signal, the first input sample being in a plurality of first input samples derived from the first input signal, and the second input sample being in a plurality of second input samples derived from the second input signal;

wherein at least one of the first input signal or the second input signal comprises responses to one or more of physical force, pressure, sound, electromagnetic wave, electric current, radiation, or light;

a subsystem, at least implemented in part in hardware, that calculates (a) a first power value based on the first input sample, and (b) a second power value based on the second input sample;

a subsystem, at least implemented in part in hardware, that selects, based on a plurality of thresholds and a power-dependent value computed from the first power value and the second power value, a specific selection region in a finite number of non-overlapping selection regions, wherein each selection region in the finite number of non-overlapping selection regions is located in between two corresponding neighboring thresholds in the plurality of thresholds;

a subsystem, at least implemented in part in hardware, that uses a weight factor that is fixed within the specific selection region to derive an intermediate sample as a weighted combination of the first input sample and the second input sample;

a subsystem, at least implemented in part in hardware, that determines a phase difference from complex-domain representations of the first input sample and the second input sample;

a subsystem, at least implemented in part in hardware, that calculates, based on the phase difference, an unwrapped phase difference; and a subsystem, at least implemented in part in hardware, that applies an amplification or attenuation to the intermediate sample to generate an output sample in an output signal, the output sample being in a plurality of output samples in the output signal, the amplification or attenuation being dependent on the unwrapped phase difference;

wherein the generated output sample in the output signal comprises reduced noise as compared with the first and second input samples in the first and second input signals.

25. A non-transitory computer readable storage medium, comprising software instructions, which when executed by one or more processors cause performing:

receiving a sample pair comprising a first input sample in a first input signal and a second input sample in a second input signal, the first input sample being in a plurality of first input samples derived from the first input signal, and the second input sample being in a plurality of second input samples derived from the second input signal;

wherein at least one of the first input signal or the second input signal comprises responses to one or more of physical force, pressure, sound, electromagnetic wave, electric current, radiation, or light;

calculating (a) a first power value based on the first input sample, and (b) a second power value based on the second input sample;

selecting, based on a plurality of thresholds and a power-dependent value computed from the first power value and the second power value, a specific selection region in a finite number of non-overlapping selection regions, wherein each selection region in the finite number of non-overlapping selection regions is located in between two corresponding neighboring thresholds in the plurality of thresholds;

using a weight factor that is fixed within the specific selection region to derive as a weighted combination of the first input sample and the second input sample;

determining a phase difference from complex-domain representations of the first input sample and the second input sample; and applying an amplification or attenuation to the intermediate sample to generate an output sample in an output signal, the output sample being in a plurality of output samples in the output signal, the amplification or attenuation being monotonically related to the phase difference;

wherein the generated output sample in the output signal comprises reduced noise as compared with the first and second input samples in the first and second input signals.

26. A non-transitory computer readable storage medium, comprising software instructions, which when executed by one or more processors cause performing:

receiving a sample pair comprising a first input sample in a first input signal and a second input sample in a second input signal, the first input sample being in a plurality of first input samples derived from the first input signal, and the second input sample being in a plurality of second input samples derived from the second input signal;

wherein at least one of the first input signal or the second input signal comprises responses to one or more of physical force, pressure, sound, electromagnetic wave, electric current, radiation, or light;

calculating (a) a first power value based on the first input sample, and (b) a second power value based on the second input sample;

selecting, based on a plurality of thresholds and a power-dependent value computed from the first power value and the second power value, a specific selection region in a finite number of non-overlapping selection regions, wherein each selection region in the finite number of non-overlapping selection regions is located in between two corresponding neighboring thresholds in the plurality of thresholds;

using a weight factor that is fixed within the specific selection region to derive as a weighted combination of the first input sample and the second input sample;

determining a phase difference from complex-domain representations of the first input sample and the second input sample;

calculating, based on the phase difference, an unwrapped phase difference; and applying an amplification or attenuation to the intermediate sample to generate an output sample in an output signal, the output sample being in a plurality of output samples in the output signal, the amplification or attenuation being dependent on the unwrapped phase difference;

wherein the generated output sample in the output signal comprises reduced noise as compared with the first and second input samples in the first and second input signals.

* * * * *